US006747946B1

(12) United States Patent
Kaneko et al.

(10) Patent No.: US 6,747,946 B1
(45) Date of Patent: Jun. 8, 2004

(54) METHOD AND APPARATUS FOR TRANSMITTING ORTHOGONAL-MULTI-CARRIER SIGNAL

(75) Inventors: Keiichi Kaneko, Atsugi (JP); Katsumi Takaoka, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 771 days.

(21) Appl. No.: 09/714,260

(22) Filed: Nov. 17, 2000

(30) Foreign Application Priority Data

Dec. 27, 1999 (JP) .......................................... 11-369615
Dec. 27, 1999 (JP) .......................................... 11-369616

(51) Int. Cl.$^7$ ................................................ H04J 11/00
(52) U.S. Cl. ...................... 370/206; 370/210; 370/480; 375/260; 708/404
(58) Field of Search ................................ 370/203, 204, 370/206, 208, 210, 211, 537, 480, 481; 375/298, 303, 308, 326, 329, 334, 260; 708/403, 404, 405

(56) References Cited

U.S. PATENT DOCUMENTS 5,191,576 A * 3/1993 Pommier et al. ........... 370/312
5,228,025 A * 7/1993 Le Floch et al. ........... 370/206
5,274,629 A * 12/1993 Helard et al. ............... 370/208

(List continued on next page.)

FOREIGN PATENT DOCUMENTS

JP  9-266466   10/1997
JP  2000-115115  4/2000

OTHER PUBLICATIONS

U.S.S.N. 09/370,889 (corres. to JP 2000–115115).

Lassalle R et al: "Principles of Modulation and Channel Coding for Digital Broadcasting for Mobile Receivers" EBU Review–Technical, European Broadcasting Union. Brussels, BE, No. 224, Aug. 1, 1987, pp. 168–190, XP000560523 ISSN: 0251–0936.

Sari H et al: "Transmission Techniques for Digital Terrestrial TV Broadcasting" IEEE Communications Magazine, IEEE Service Center. Piscataway, N.J, US, vol. 33, No. 2, Feb. 1, 1995, pp. 100–109, XP000505677 ISSN: 0163–6804.

*Primary Examiner*—Seema S. Rao
*Assistant Examiner*—Michael J. Moore, Jr.
(74) *Attorney, Agent, or Firm*—Louis Woo

(57) ABSTRACT

An apparatus for transmitting an orthogonal-multi-carrier signal includes a first device for subjecting an information signal to first inverse discrete Fourier transform to convert the information signal into an orthogonal-multi-carrier signal. The ortogonal-multi-carrier signal generated by the first device is outputted to a transmission line. The orthogonal-multi-carrier signal is received from the transmission line. The received orthogonal-multi-carrier signal is subjected to discrete Fourier transform to recover the information signal from the received orthogonal-multi-carrier signal. A second device contained in the first device operates for subjecting the information signal to M-point inverse discrete Fourier transform and thereby implementing a first stage of the first inverse discrete Fourier transform, and for generating a transform result signal representative of results of the M-point inverse discrete Fourier transform, where M denotes a predetermined natural number greater than 2. A third device contained in the first device operates for subjecting the transform result signal generated by the second device to N-point inverse discrete Fourier transform and thereby implementing a second stage of the first inverse discrete Fourier transform to generate the orthogonal-multi-carrier signal, wherein N denotes a predetermined natural number greater than twice M. The second stage follows the first stage.

14 Claims, 41 Drawing Sheets

U.S. PATENT DOCUMENTS

| | | | | |
|---|---|---|---|---|
| 6,005,900 A | * | 12/1999 | Zangi | 375/350 |
| 6,134,268 A | * | 10/2000 | McCoy | 375/229 |
| 6,240,141 B1 | * | 5/2001 | Long | 375/260 |
| 6,317,409 B1 | * | 11/2001 | Murakami | 370/203 |
| 6,351,759 B1 | * | 2/2002 | Moretti et al. | 708/405 |
| 6,393,451 B2 | * | 5/2002 | Leyonhjelm et al. | 708/420 |
| 6,411,653 B1 | * | 6/2002 | Arunachalam et al. | 375/260 |
| 6,449,244 B1 | * | 9/2002 | Loseke | 370/208 |
| 6,456,654 B1 | * | 9/2002 | Ginesi et al. | 375/229 |
| 6,529,472 B1 | * | 3/2003 | Kaneko et al. | 370/208 |
| 6,549,592 B1 | * | 4/2003 | Jones | 375/354 |
| 6,590,871 B1 | * | 7/2003 | Adachi | 370/307 |
| 6,611,855 B1 | * | 8/2003 | Hellberg et al. | 708/420 |

* cited by examiner

| CHANNEL NUMBER | USED CARRIER NUMBER |
|---|---|
| 0 | 0,4,8,12,16,20,24,28,32,36,40,44,48,52,56,60 |
| 1 | 2,6,10,14,18,22,26,30,34,38,42,46,50,54,58,62 |
| 2 | 1,5,9,13,17,21,25,29,33,37,41,45,49,53,57,61 |
| 3 | 3,7,11,15,19,23,27,31,35,39,43,47,51,55,59,63 |

FIG. 18

| CHANNEL NUMBER | USED CARRIER NUMBER |
|---|---|
| 0 | 0,32,16,48,8,40,24,56,4,36,20,52,12,44,28,60 |
| 1 | 2,34,18,50,10,42,26,58,6,38,22,54,14,46,30,62 |
| 2 | 1,33,17,49,9,41,25,57,5,37,21,53,13,45,29,61 |
| 3 | 3,35,19,51,11,43,27,59,7,39,23,55,15,47,31,63 |

$x = Re1 + jIm1$ $y = Re2 + jIm2$ $W$ $X = (Re1 + Re2) + j(Im1 + Im2)$ $Y = ((Re1 - Re2) + j(Im1 - Im2)) * W$

FIG. 26

| FIRST STAGE | SECOND STAGE | THIRD STAGE | FOURTH STAGE | FIFTH STAGE | SIXTH STAGE | |
|---|---|---|---|---|---|---|
| 0 | 0 | 0 | 0 | 0 | 0 | 0 |
| 1 | 1 | 2 | 4 | 8 | 16 | 0 |
| 2 | 2 | 4 | 8 | 16 | 0 | 0 |
| 3 | 3 | 6 | ⋮ | 24 | 16 | 0 |
| 4 | ⋮ | ⋮ | 28 | 0 | 0 | 0 |
| 5 | ⋮ | ⋮ | | 8 | 16 | 0 |
| ⋮ | ⋮ | 30 | | 16 | 0 | 0 |
| ⋮ | 31 | | | 24 | 16 | 0 |
| ⋮ | | | 0 | 0 | 0 | 0 |
| ⋮ | | | 4 | 8 | 16 | 0 |
| ⋮ | | | 8 | 16 | 0 | 0 |
| ⋮ | | | ⋮ | 24 | 16 | 0 |
| ⋮ | | | 28 | 0 | 0 | 0 |
| ⋮ | | | | 8 | 16 | 0 |
| ⋮ | | | | 16 | 0 | 0 |
| ⋮ | 0 | | | 24 | 16 | 0 |
| ⋮ | | 0 | 0 | 0 | 0 | 0 |
| ⋮ | | 2 | 4 | 8 | 16 | 0 |
| ⋮ | | 4 | 8 | 16 | 0 | 0 |
| ⋮ | | 6 | ⋮ | 24 | 16 | 0 |
| ⋮ | | ⋮ | 28 | 0 | 0 | 0 |
| ⋮ | | ⋮ | | 8 | 16 | 0 |
| ⋮ | | ⋮ | | 16 | 0 | 0 |
| ⋮ | | 30 | | 24 | 16 | 0 |
| ⋮ | | | 0 | 0 | 0 | 0 |
| ⋮ | | | 4 | 8 | 16 | 0 |
| ⋮ | | | 8 | 16 | 0 | 0 |
| ⋮ | | | ⋮ | 24 | 16 | 0 |
| ⋮ | | | 28 | 0 | 0 | 0 |
| ⋮ | | | | 8 | 16 | 0 |
| ⋮ | | | | 16 | 0 | 0 |
| 63 | | | | 24 | 16 | 0 |

Right side labels: 0, 32, 16, 48, ⋮, 63

FIG. 39

| CHANNEL NUMBER | | | | | |
|---|---|---|---|---|---|
| 0 | 0 | 0 | 0 | 0 | 0, 32, 16, 48, ... |
| | | | | 16 | |
| | | | | 8 | |
| | | | 16 | 24 | |
| | | 16 | 8 | 4 | |
| | | | | 20 | |
| | | | | 12 | |
| | | | 24 | 28 | |
| 1 | 16 | 8 | 4 | 2 | 2, 34, 18, 50, ... |
| | | | | 18 | |
| | | | | 10 | |
| | | | 20 | 26 | |
| | | 24 | 12 | 6 | |
| | | | | 22 | |
| | | | | 14 | |
| | | | 28 | 30 | |
| 2 | 8 | 4 | 2 | 1 | 1, 33, 17, 49, ... |
| | | | | 17 | |
| | | | | 9 | |
| | | | 18 | 25 | |
| | | 20 | 10 | 5 | |
| | | | | 21 | |
| | | | | 13 | |
| | | | 26 | 29 | |
| 3 | 24 | 12 | 6 | 3 | 3, 35, 19, 51, ... |
| | | | | 19 | |
| | | | | 11 | |
| | | | 22 | 27 | |
| | | 28 | 14 | 7 | |
| | | | | 23 | |
| | | | | 15 | |
| | | | 30 | 31 | |

FIG. 40

| CHANNEL NUMBER | FIRST STAGE | SECOND STAGE | THIRD STAGE | FOURTH STAGE | FIFTH STAGE | SIXTH STAGE | |
|---|---|---|---|---|---|---|---|
| 0 | 0 | 0 | 0 | 0 | 0 | 0 | 0 |
|  | 1 | 2 | 4 | 8 | 16 | 0 | 32 |
|  | 2 | 4 | 8 | 16 | 0 | 0 | 16 |
|  | 3 | 6 | ⋮ | 24 | 16 | 0 | 48 |
|  | 4 | ⋮ | 28 | 0 | 0 | 0 | ⋮ |
|  | 5 | ⋮ |  | 8 | 16 | 0 |  |
|  | ⋮ | ⋮ |  | 16 | 0 | 0 |  |
|  | ⋮ | 30 |  | 24 | 16 | 0 |  |
| 1 | 31 | 0 | 0 | 0 | 0 | 0 |  |
|  |  |  | 4 | 8 | 16 | 0 |  |
|  |  |  | 8 | 16 | 0 | 0 |  |
|  |  |  | ⋮ | 24 | 16 | 0 |  |
|  |  |  | 28 | 0 | 0 | 0 |  |
|  |  |  |  | 8 | 16 | 0 |  |
|  |  |  |  | 16 | 0 | 0 |  |
|  |  |  |  | 24 | 16 | 0 |  |
| 2 | 0 | 0 | 0 | 0 | 0 | 0 |  |
|  |  | 2 | 4 | 8 | 16 | 0 |  |
|  |  | 4 | 8 | 16 | 0 | 0 |  |
|  |  | 6 | ⋮ | 24 | 16 | 0 |  |
|  |  | ⋮ | 28 | 0 | 0 | 0 |  |
|  |  | ⋮ |  | 8 | 16 | 0 |  |
|  |  | 30 |  | 16 | 0 | 0 |  |
|  |  |  |  | 24 | 16 | 0 |  |
| 3 |  | 16 DATA PIECES | 0 (0) | 0 (0) | 0 (0) | 0 (0) |  |
|  |  |  | 4 (1) | 8 (2) | 16 (4) | 0 (0) |  |
|  |  |  | 8 (2) | 16 (4) | 0 (0) | 0 (0) |  |
|  |  |  | ⋮ | 24 (6) | 16 (4) | 0 (0) |  |
|  |  |  | 28 (7) | 0 (0) | 0 (0) | 0 (0) |  |
|  |  |  |  | 8 (2) | 16 (4) | 0 (0) |  |
|  |  |  |  | 16 (4) | 0 (0) | 0 (0) |  |
|  |  |  |  | 24 (6) | 16 (4) | 0 (0) | 63 |

FIG. 41

| CHANNEL NUMBER | | FIRST STAGE | SECOND STAGE | THIRD STAGE | FOURTH STAGE | FIFTH STAGE | SIXTH STAGE | |
|---|---|---|---|---|---|---|---|---|
| 0 | 0<br>32<br>16<br>48<br>⋮ | 0 | 0 | 0 | 0 | 0 | 0 | 0 |
| | | 0 | 16 | 8 | 4 | 2 | 1 | 1 |
| | | 0 | 0 | 16 | 8 | 4 | 2 | 2 |
| | | 0 | 16 | 24 | | 6 | 3 | 3 |
| | | 0 | 0 | 0 | ⋮ | ⋮ | ⋮ | 4 |
| | | 0 | 16 | 8 | 28 | | | 5 |
| | | 0 | 0 | 16 | | | | ⋮ |
| | | 0 | 16 | 24 | | 30 | | |
| 1 | | 0 | 0 | 0 | 0 | | 31 | |
| | | 0 | 16 | 8 | 4 | | | |
| | | 0 | 0 | 16 | 8 | | | |
| | | 0 | 16 | 24 | ⋮ | | | |
| | | 0 | 0 | 0 | 28 | | | |
| | | 0 | 16 | 8 | | | | |
| | | 0 | 0 | 16 | | | | |
| | | 0 | 16 | 24 | | | | |
| 2 | | 0 | 0 | 0 | 0 | 0 | | |
| | | 0 | 16 | 8 | 4 | 2 | | |
| | | 0 | 0 | 16 | 8 | 4 | | |
| | | 0 | 16 | 24 | ⋮ | 6 | | |
| | | 0 | 0 | 0 | 28 | ⋮ | | |
| | | 0 | 16 | 8 | | | | |
| | | 0 | 0 | 16 | | 30 | | |
| | | 0 | 16 | 24 | | | | |
| 3 | | 0 | 0 | 0 | 0 | | | |
| | | 0 | 16 | 8 | 4 | | | |
| | | 0 | 0 | 16 | 8 | | | |
| | | 0 | 16 | 24 | ⋮ | | | |
| | | 0 | 0 | 0 | 28 | | | |
| | | 0 | 16 | 8 | | | | |
| | | 0 | 0 | 16 | | | | |
| | | 0 | 16 | 24 | | | | 63 |

FIG. 44 x  
y  
  X = x+y*W  
  W  
  Y = x−y*W

FIG. 45 x1  
y1  $\phantom{x}$ 1  
  x1+y1  
  x1−y1  
x2  
y2  $\phantom{x}$ 1  
  x2+y2  
  x2−y2  
  1  
  −j  
  z0 = (x1+y1)+(x2+y2)  
  z1 = (x1−y1)−j(x2−y2)  
  z2 = (x1+y1)−(x2+y2)  
  z3 = (x1−y1)+j(x2−y2)

FIG. 47

| CHANNEL NUMBER | FIRST STAGE | SECOND STAGE | THIRD STAGE | FOURTH STAGE | FIFTH STAGE | SIXTH STAGE | |
|---|---|---|---|---|---|---|---|
| 0 | 0 | | | | | | 0 |
| | 32 | 16 | 0 | | | | 1 |
| | 16 | 8 | | | | | 2 |
| | 48 | 24 | 16 | 0 | | | 3 |
| | 4 | | | | | | 4 |
| | 20 | 8 | 16 | | | | 5 |
| | 12 | | | | | | ... |
| | 28 | 24 | | 0 | | | |
| 1 | 2 | | | | | | |
| | 18 | 4 | 8 | | | | |
| | 10 | | | | | | |
| | 26 | 20 | | 16 | | | |
| | 6 | | | | | | |
| | 22 | 12 | 24 | | | | |
| | 14 | | | | | | |
| | 30 | 28 | | | 0 | | |
| 2 | 1 | | | | | | |
| | 17 | 2 | 4 | | | | |
| | 9 | | | | | | |
| | 25 | 18 | | 8 | | | |
| | 5 | | | | | | |
| | 21 | 10 | 20 | | | | |
| | 13 | | | | | | |
| | 29 | 26 | | | 16 | 0 | |
| 3 | 3 | | | | | | |
| | 19 | 6 | 12 | | | | |
| | 11 | | | | | | |
| | 27 | 22 | | 24 | | | |
| | 7 | | | | | | |
| | 23 | 14 | 28 | | | | |
| | 15 | | | | | | |
| | 63 | 31 | 28 | | | | 63 |

METHOD AND APPARATUS FOR TRANSMITTING ORTHOGONAL-MULTI-CARRIER SIGNAL

BACKGROUND OF THE INVENTION

1. Field of the Invention

This invention relates to an apparatus for transmitting an orthogonal-multi-carrier signal (an orthogonal frequency division multiplexed signal or an OFDM signal). In addition, this invention relates to a method of transmitting an orthogonal-multi-carrier signal.

2. Description of the Related Art

Orthogonal frequency division multiplexing (OFDM) employs multiple carriers which are orthogonal with respect to each other. The "orthogonal" multiple carriers mean that the spectrums of carriers neighboring one carrier are null at the frequency of the latter carrier. The multiple carriers are modulated in accordance with digital information pieces to be transmitted, respectively. For example, phase modulation (phase shift keying or PSK) or quadrature amplitude modulation (QAM) is used by the modulation of each carrier. The modulation-resultant multiple carriers are combined into an OFDM signal which has a form as a random signal. Since the multiple carriers are orthogonal, they do not interfere with each other. Accordingly, during transmission, the digital information pieces assigned to the respective multiple carriers are prevented from interfering with each other.

In general, OFDM employs a lot of carriers. Thus, the modulation rate for one carrier in OFDM can be lower than that in a transmission system using only one carrier. Therefore, an OFDM signal is less affected by multi-path signal distortions occurring in a spatial transmission line. Since the spectrum of an OFDM signal can be rectangular, the frequency band occupied thereby can be narrow. Thus, OFDM can provide efficient frequency use.

In OFDM-based signal transmission, a guard interval is added to every symbol interval related to an OFDM signal. During the guard interval, a redundant signal is transmitted. The guard interval is a buffer time for absorbing lags of delayed waves from a non-delayed wave and thereby reducing multi-path signal distortions. The transmitted redundant signal is remarkably smaller in bit rate than a main transmitted information signal. Therefore, the redundant signal causes only a small decrease in transmission efficiency.

Terrestrial digital broadcasting uses OFDM. A transmitter side of the terrestrial digital broadcasting implements IDFT (inverse discrete Fourier transform) for generating an OFDM signal. Information pieces to be transmitted are used as frequency-domain signals being phase and amplitude modulating signals with respect to multiple carries. The DFT converts the frequency-domain signals into time-domain signals composed of the multiple carries modulated with the information pieces. The time-domain signals are added and combined into a baseband OFDM signal. The baseband OFDM signal is up-converted into a radio-frequency (RF) OFDM signal. The RF OFDM signal is radiated by an antenna.

A receiver side of the terrestrial digital broadcasting down-converts an RF OFDM signal into a baseband OFDM signal. The receiver side implements DFT (discrete Fourier transform) for converting time-domain signals in the baseband OFDM signal into frequency-domain signals. Transmitted information pieces are recovered from the frequency-domain signals. In general, DFT is implemented by a signal processing circuit including a DSP (digital signal processor) or an LSI (large-scale integration circuit)

The terrestrial digital broadcasting uses an assigned frequency band divided into channels each having a width of 6 MHz and a predetermined number of carriers. The channels are separated by guard frequency bands. For example, the channels are distributed to a plurality of different users.

Data transmission based on OFDM is executed symbol by symbol. Each OFDM transmission symbol period is composed of a window interval and a guard interval. The window interval is assigned to IDFT. Multiple carriers are spaced at frequency intervals corresponding to the reciprocal of the symbol period. In general, all the multiple carriers are used for the transmission of information.

In the terrestrial digital broadcasting, multiple carriers are spaced at frequency intervals of about 1 kHz to 4 kHz. All the multiple carriers are used for the transmission of information.

OFDM is used in not only broadcasting but also communications and wireless LAN. Specifically, OFDM is widely used in radio communications because of its ability to reduce multi-path signal distortions.

In a prior-art OFDM signal transmission system, a signal processing circuit for implementing IDFT has a complicated structure. Also, a signal processing circuit for implementing DFT has a complicated structure.

SUMMARY OF THE INVENTION

It is a first object of this invention to provide a simple apparatus for transmitting an orthogonal-multi-carrier signal (an orthogonal frequency division multiplexed signal or an OFDM signal).

It is a second object of this invention to provide a simple method of transmitting an orthogonal-multi-carrier signal.

A first aspect of this invention provides an apparatus for transmitting an orthogonal-multi-carrier signal. The apparatus comprises first means for subjecting an information signal to first inverse discrete Fourier transform to convert the information signal into an orthogonal-multi-carrier signal; second means for outputting the orthogonal-multi-carrier signal generated by the first means to a transmission line; third means for receiving the orthogonal-multi-carrier signal from the transmission line; fourth means for subjecting the orthogonal-multi-carrier signal received by the third means to discrete Fourier transform to recover the information signal from the received orthogonal-multi-carrier signal; fifth means contained in the first means for subjecting the information signal to M-point inverse discrete Fourier transform and thereby implementing a first stage of the first inverse discrete Fourier transform, and for generating a transform result signal representative of results of the M-point inverse discrete Fourier transform, wherein M denotes a predetermined natural number greater than 2; and sixth means contained in the first means for subjecting the transform result signal generated by the fifth means to N-point inverse discrete Fourier transform and thereby implementing a second stage of the first inverse discrete Fourier transform to generate the orthogonal-multi-carrier signal, the second stage following the first stage, wherein N denotes a predetermined natural number greater than twice M.

A second aspect of this invention provides an apparatus for transmitting an orthogonal-multi-carrier signal. The apparatus comprises first means for subjecting a multi-channel information signal to first inverse discrete Fourier transform to convert the multi-channel information signal into an orthogonal-multi-carrier signal; second means for outputting the orthogonal-multi-carrier signal generated by the first means to a transmission line; third means for receiving the orthogonal-multi-carrier signal from the transmission line; fourth means for subjecting the orthogonal-multi-carrier signal received by the third means to discrete Fourier transform to recover the multi-channel information signal from the received orthogonal-multi-carrier signal; a plurality of fifth means contained in the first means for subjecting the multi-channel information signal to M-point inverse discrete Fourier transforms and thereby implementing a first stage of the first inverse discrete Fourier transform, and for generating transform result signals representative of results of the M-point inverse discrete Fourier transforms, wherein M denotes a predetermined natural number greater than 2; and sixth means contained in the first means for subjecting the transform result signals generated by the fifth means to N-point inverse discrete Fourier transform and thereby implementing a second stage of the first inverse discrete Fourier transform to generate the orthogonal-multi-carrier signal, the second stage following the first stage, wherein N denotes a predetermined natural number greater than twice M.

A third aspect of this invention provides an apparatus for transmitting an orthogonal-multi-carrier signal. The apparatus comprises first means for subjecting an information signal to first inverse discrete Fourier transform to convert the information signal into an orthogonal-multi-carrier signal; second means for outputting the orthogonal-multi-carrier signal generated by the first means to a transmission line; third means for receiving the orthogonal-multi-carrier signal from the transmission line; fourth means for subjecting the orthogonal-multi-carrier signal received by the third means to discrete Fourier transform to recover the information signal from the received orthogonal-multi-carrier signal; fifth means contained in the first means for subjecting the information signal to M-point inverse discrete Fourier transform responsive to rotation factors depending on a desired transmission channel and thereby implementing a first stage of the first inverse discrete Fourier transform, and for generating a transform result signal representative of results of the M-point inverse discrete Fourier transform, wherein M denotes a predetermined natural number greater than 2; and sixth means contained in the first means for subjecting the transform result signal generated by the fifth means to N-point inverse discrete Fourier transform and thereby implementing a second stage of the first inverse discrete Fourier transform to generate the orthogonal-multi-carrier signal, the second stage following the first stage, wherein N denotes a predetermined natural number greater than twice M.

A fourth aspect of this invention provides an apparatus for transmitting an orthogonal-multi-carrier signal. The apparatus comprises first means for subjecting an information signal to first inverse discrete Fourier transform to convert the information signal into an orthogonal-multi-carrier signal; second means for outputting the orthogonal-multi-carrier signal generated by the first means to a transmission line; third means for receiving the orthogonal-multi-carrier signal from the transmission line; fourth means for subjecting the orthogonal-multi-carrier signal received by the third means to discrete Fourier transform to recover the information signal from the received orthogonal-multi-carrier signal; fifth means contained in the first means for subjecting the information signal to M-point inverse discrete Fourier transform and thereby implementing a first stage of the first inverse discrete Fourier transform, and for generating a transform result signal representative of results of the M-point inverse discrete Fourier transform, wherein M denotes a predetermined natural number greater than 2; and sixth means contained in the first means for feeding the transform result signal from the fifth means to input terminals of N-point inverse discrete Fourier transform and subjecting the transform result signal to the N-point inverse discrete Fourier transform, and thereby implementing a second stage of the first inverse discrete Fourier transform to generate the orthogonal-multi-carrier signal, the second stage following the first stage, the input terminals depending on a desired transmission channel, wherein N denotes a predetermined natural number greater than twice M.

A fifth aspect of this invention provides a method of transmitting an orthogonal-multi-carrier signal. The method comprises the steps of subjecting an information signal to first inverse discrete Fourier transform to convert the information signal into an orthogonal-multi-carrier signal; outputting the orthogonal-multi-carrier signal to a transmission line; receiving the ortogonal-multi-carrier signal from the transmission line; and subjecting the received orthogonal-multi-carrier signal to discrete Fourier transform to recover the information signal from the received orthogonal-multi-carrier signal; wherein the subjecting step comprises 1) subjecting the information signal to M-point inverse discrete Fourier transform and thereby implementing a first stage of the first inverse discrete Fourier transform, and generating a transform result signal representative of results of the M-point inverse discrete Fourier transform, wherein M denotes a predetermined natural number greater than 2; and 2) subjecting the transform result signal to N-point inverse discrete Fourier transform and thereby implementing a second stage of the first inverse discrete Fourier transform to generate the orthogonal-multi-carrier signal, the second stage following the first stage, wherein N denotes a predetermined natural number greater than twice M.

A sixth aspect of this invention provides a method of transmitting an orthogonal-multi-carrier signal. The method comprises the steps of subjecting an information signal to first inverse discrete Fourier transform to convert the information signal into an orthogonal-multi-carrier signal; outputting the orthogonal-multi-carrier signal to a transmission line; receiving the ortogonal-multi-carrier signal from the transmission line; and subjecting the received orthogonal-multi-carrier signal to discrete Fourier transform to recover the information signal from the received orthogonal-multi-carrier signal; wherein the subjecting step comprises 1) subjecting the information signal to M-point inverse discrete Fourier transform responsive to rotation factors depending on a desired transmission channel and thereby implementing a first stage of the first inverse discrete Fourier transform, and generating a transform result signal representative of results of the M-point inverse discrete Fourier transform, wherein M denotes a predetermined natural number greater than 2; and 2) subjecting the transform result signal to N-point inverse discrete Fourier transform and thereby implementing a second stage of the first inverse discrete Fourier transform to generate the orthogonal-multi-carrier signal, the second stage following the first stage, wherein N denotes a predetermined natural number greater than twice M.

A seventh aspect of this invention provides an apparatus for transmitting an orthogonal-multi-carrier signal. The apparatus comprises first means for subjecting an information signal to inverse discrete Fourier transform to convert the information signal into an orthogonal-multi-carrier signal; second means for outputting the orthogonal-multi-carrier signal generated by the first means to a transmission line; third means for receiving the orthogonal-multi-carrier signal from the transmission line; fourth means for subjecting the orthogonal-multi-carrier signal received by the third means to first discrete Fourier transform to recover the information signal from the received orthogonal-multi-carrier signal; fifth means contained in the fourth means for subjecting the orthogonal-multi-carrier signal to N-point discrete Fourier transform and thereby implementing a first stage of the first discrete Fourier transform, and for generating a first transform result signal representative of results of the N-point discrete Fourier transform, wherein N denotes a predetermined natural number greater than 4; sixth means contained in the fourth means for subjecting the first transform result signal generated by the fifth means to M-point discrete Fourier transform and thereby implementing a second stage of the first discrete Fourier transform, and for generating a second transform result signal representative of results of the M-point discrete Fourier transform, the second stage following the first stage, wherein M denotes a predetermined natural number smaller than a half of N; and seventh means contained in the fourth means for converting the second transform result signal generated by the sixth means into the information signal.

An eighth aspect of this invention provides an apparatus for transmitting an orthogonal-multi-carrier signal. The apparatus comprises first means for subjecting a multi-channel information signal to inverse discrete Fourier transform to convert the multi-channel information signal into an orthogonal-multi-carrier signal; second means for outputting the orthogonal-multi-carrier signal generated by the first means to a transmission line; third means for receiving the orthogonal-multi-carrier signal from the transmission line; fourth means for subjecting the orthogonal-multi-carrier signal received by the third means to first discrete Fourier transform to recover the multi-channel information signal from the received orthogonal-multi-carrier signal; fifth means contained in the fourth means for subjecting the orthogonal-multi-carrier signal to N-point discrete Fourier transform and thereby implementing a first stage of the first discrete Fourier transform, and for generating a first transform result signal representative of results of the N-point discrete Fourier transform, wherein N denotes a predetermined natural number greater than 4; a plurality of sixth means contained in the fourth means for subjecting the first transform result signal generated by the fifth means to M-point discrete Fourier transform and thereby implementing a second stage of the first discrete Fourier transform, and for generating second transform result signals representative of results of the M-point discrete Fourier transform, the second stage following the first stage, wherein M denotes a predetermined natural number smaller than a half of N; and seventh means contained in the fourth means for converting the second transform result signals generated by the sixth means into the multi-channel information signal.

A ninth aspect of this invention provides an apparatus for transmitting an orthogonal-multi-carrier signal. The apparatus comprises first means for subjecting an information signal to inverse discrete Fourier transform to convert the information signal into an orthogonal-multi-carrier signal; second means for outputting the orthogonal-multi-carrier signal generated by the first means to a transmission line; third means for receiving the orthogonal-multi-carrier signal from the transmission line; fourth means for subjecting the orthogonal-multi-carrier signal received by the third means to first discrete Fourier transform to recover the information signal from the received orthogonal-multi-carrier signal; fifth means contained in the fourth means for subjecting the orthogonal-multi-carrier signal to N-point discrete Fourier transform and thereby implementing a first stage of the first discrete Fourier transform, and for generating a first transform result signal representative of results of the N-point discrete Fourier transform, wherein N denotes a predetermined natural number greater than 4; sixth means contained in the fourth means for subjecting the first transform result signal generated by the fifth means to M-point discrete Fourier transform responsive to rotation factors depending on a desired transmission channel and thereby implementing a second stage of the first discrete Fourier transform, and for generating a second transform result signal representative of results of the M-point discrete Fourier transform, the second stage following the first stage, wherein M denotes a predetermined natural number smaller than a half of N; and seventh means contained in the fourth means for converting the second transform result signal generated by the sixth means into the information signal.

A tenth aspect of this invention provides an apparatus for transmitting an orthogonal-multi-carrier signal. The apparatus comprises first means for subjecting an information signal to inverse discrete Fourier transform to convert the information signal into an orthogonal-multi-carrier signal; second means for outputting the orthogonal-multi-carrier signal generated by the first means to a transmission line; third means for receiving the orthogonal-multi-carrier signal from the transmission line; fourth means for subjecting the orthogonal-multi-carrier signal received by the third means to first discrete Fourier transform to recover the information signal from the received orthogonal-multi-carrier signal; fifth means contained in the fourth means for subjecting the orthogonal-multi-carrier signal to N-point discrete Fourier transform and thereby implementing a first stage of the first discrete Fourier transform, and for generating a first transform result signal representative of results of the N-point discrete Fourier transform, wherein N denotes a predetermined natural number greater than 4; sixth means contained in the fourth means for feeding the first transform result signal from the fifth means to input terminals of M-point inverse discrete Fourier transform and subjecting the first transform result signal to the M-point discrete Fourier transform, and thereby implementing a second stage of the first discrete Fourier transform, and for generating a second transform result signal representative of results of the M-point discrete Fourier transform, the second stage following the first stage, the input terminals depending on a desired transmission channel, wherein M denotes a predetermined natural number smaller than a half of N; and seventh means contained in the fourth means for converting the second transform result signal generated by the sixth means into the information signal.

An eleventh aspect of this invention provides a method of transmitting an orthogonal-multi-carrier signal. The method comprises the steps of subjecting an information signal to inverse discrete Fourier transform to convert the information signal into an orthogonal-multi-carrier signal; outputting the orthogonal-multi-carrier signal to a transmission line; receiving the orthogonal-multi-carrier signal from the transmission line; and subjecting the received orthogonal-multi-carrier signal to first discrete Fourier transform to recover the information signal from the received orthogonal-multi-carrier signal; wherein the subjecting step comprises 1) subjecting the orthogonal-multi-carrier signal to N-point discrete Fourier transform and thereby implementing a first stage of the first discrete Fourier transform, and generating a first transform result signal representative of results of the N-point discrete Fourier transform, wherein N denotes a predetermined natural number greater than 4; 2) subjecting the first transform result signal to M-point discrete Fourier transform and thereby implementing a second stage of the first discrete Fourier transform, and generating a second transform result signal representative of results of the M-point discrete Fourier transform, the second stage following the first stage, wherein M denotes a predetermined natural number smaller than a half of N; and 3) converting the second transform result signal into the information signal.

A twelfth aspect of this invention provides a method of transmitting an orthogonal-multi-carrier signal. The method comprises the steps of subjecting an information signal to inverse discrete Fourier transform to convert the information signal into an orthogonal-multi-carrier signal; outputting the orthogonal-multi-carrier signal to a transmission line; receiving the orthogonal-multi-carrier signal from the transmission line; and subjecting the received orthogonal-multi-carrier signal to first discrete Fourier transform to recover the information signal from the received orthogonal-multi-carrier signal; wherein the subjecting step comprises 1) subjecting the orthogonal-multi-carrier signal to N-point discrete Fourier transform and thereby implementing a first stage of the first discrete Fourier transform, and generating a first transform result signal representative of results of the N-point discrete Fourier transform, wherein N denotes a predetermined natural number greater than 4; 2) subjecting the first transform result signal to M-point discrete Fourier transform responsive to rotation factors depending on a desired transmission channel and thereby implementing a second stage of the first discrete Fourier transform, and generating a second transform result signal representative of results of the M-point discrete Fourier transform, the second stage following the first stage, wherein M denotes a predetermined natural number smaller than a half of N; and 3) converting the second transform result signal into the information signal.

A thirteenth aspect of this invention provides an apparatus comprising first means for subjecting an information signal to first inverse discrete Fourier transform to convert the information signal into an orthogonal-multi-carrier signal; second means contained in the first means for subjecting the information signal to M-point inverse discrete Fourier transform and thereby implementing a first stage of the first inverse discrete Fourier transform, and for generating a transform result signal representative of results of the M-point inverse discrete Fourier transform, wherein M denotes a predetermined natural number greater than 2; and third means contained in the first means for subjecting the transform result signal generated by the second means to N-point inverse discrete Fourier transform and thereby implementing a second stage of the first inverse discrete Fourier transform to generate the ortogonal-multi-carrier signal, the second stage following the first stage, wherein N denotes a predetermined natural number greater than twice M.

A fourteenth aspect of this invention provides an apparatus comprising first means for subjecting an orthogonal-multi-carrier signal to first discrete Fourier transform to recover an information signal from the orthogonal-multi-carrier signal; second means contained in the first means for subjecting the orthogonal-multi-carrier signal to N-point discrete Fourier transform and thereby implementing a first stage of the first discrete Fourier transform, and for generating a first transform result signal representative of results of the N-point discrete Fourier transform, wherein N denotes a predetermined natural number greater than 4; third means contained in the first means for subjecting the first transform result signal generated by the second means to M-point discrete Fourier transform and thereby implementing a second stage of the first discrete Fourier transform, and for generating a second transform result signal representative of results of the M-point discrete Fourier transform, the second stage following the first stage, wherein M denotes a predetermined natural number smaller than a half of N; and fourth means contained in the first means for converting the second transform result signal generated by the third means into the information signal.

BRIEF DESCRIPTION OF THE DRAWINGS

FIG. 18 is a diagram of the assignment of carriers to channels in which the identification numbers of the carriers are arranged in a bit reverse order.

FIG. 19 is a block diagram of frequency-thinned 64-point IDFT of an output-data serially-arranged type in a second embodiment of this invention.

FIG. 22 is a diagram of a unit of butterfly calculations in frequency-thinned IFFT.

FIG. 26 is a diagram of frequency-thinned 64-point IDFT of an input-data serially-arranged type in a fourth embodiment of this invention.

FIG. 39 is a diagram of the relation among channels and used rotation factors in the 64-point DFT of FIG. 36.

FIG. 40 is a diagram of frequency-thinned 64-point DFT of an input-data serially-arranged type in an eleventh embodiment of this invention.

FIG. 41 is a diagram of temporally-thinned 64-point DFT of an output-data serially-arranged type in a twelfth embodiment of this invention.

FIG. 44 is a diagram of a unit of butterfly calculations in temporally-thinned DFT.

FIG. 45 is a diagram of a portion of butterfly calculations in first and second stages of the 64-point DFT in FIG. 41.

FIG. 47 is a diagram of frequency-thinned 64-point DFT of an output-data serially-arranged type in a thirteenth embodiment of this invention.

DESCRIPTION OF THE PREFERRED EMBODIMENTS

A prior-art OFDM signal transmission system (a prior-art orthogonal-multi-carrier signal transmission system) will be explained below for a better understanding of this invention.

Figure 1:
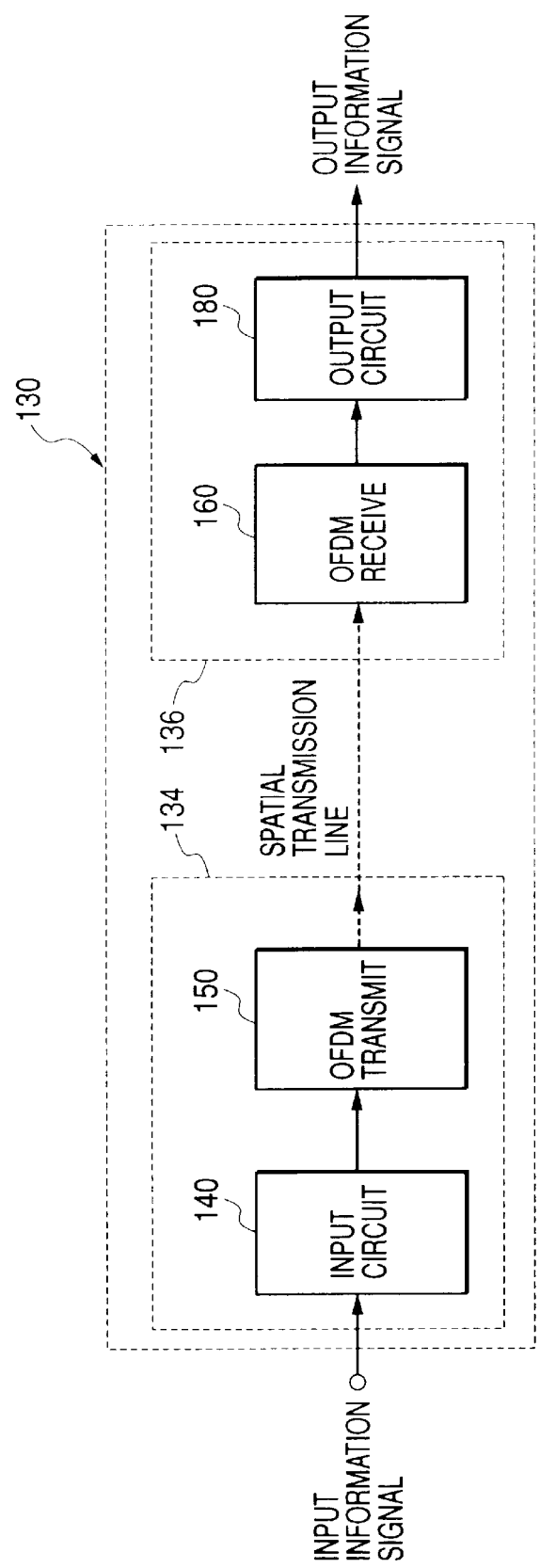
FIG. 1 is a block diagram of a prior-art orthogonal-multi-carrier signal transmission system.

FIG. 1 shows a prior-art orthogonal-multi-carrier signal transmission system 130 including a transmitter 134 and a receiver 136 which can be connected to each other via a spatial transmission line. The transmitter 134 has an input circuit 140 and an OFDM transmitting section 150. The receiver 136 has an OFDM receiving section 160 and an output circuit 180.

In the prior-art system 130 of FIG. 1, an information signal to be transmitted is fed to the input circuit 140 of the transmitter 134. In the input circuit 140, a signal of an error correction code (ECC) is added to the information signal. The ECC-added information signal is divided into pieces. The signal pieces (the pieces of the ECC-added information signal) are fed from the input circuit 140 to the OFDM transmitting section 150. In the OFDM transmitting section 150, an IDFT circuit converts the signal pieces into a baseband orthogonal-multi-carrier signal. A frequency converter in the OFDM transmitting section 150 up-converts the baseband orthogonal-multi-carrier signal into an RF ortogonal-multi-carrier signal. The transmitter 134 has an antenna (not shown) which radiates the RF orthogonal-multi-carrier signal into the spatial transmission line. The RF orthogonal-multi-carrier signal is propagated along the spatial transmission line before reaching an antenna (not shown) in the receiver 136.

In the receiver 136, the RF orthogonal-multi-carrier signal is fed from the antenna to the OFDM receiving section 160. The OFDM receiving section 160 demodulates the RF orthogonal-multi-carrier signal into signal pieces corresponding to pieces of an ECC-added information signal. The signal pieces (the pieces of the ECC-added information signal) are fed from the OFDM receiving section 160 to the output circuit 180. The output circuit 180 combines the signal pieces into the ECC-added information signal. The output circuit 180 implements error detection and correction processes responsive to the ECC signal in the ECC-added information signal, thereby recovering the original information signal. The output circuit 180 outputs the recovered original information signal.

Figure 2:
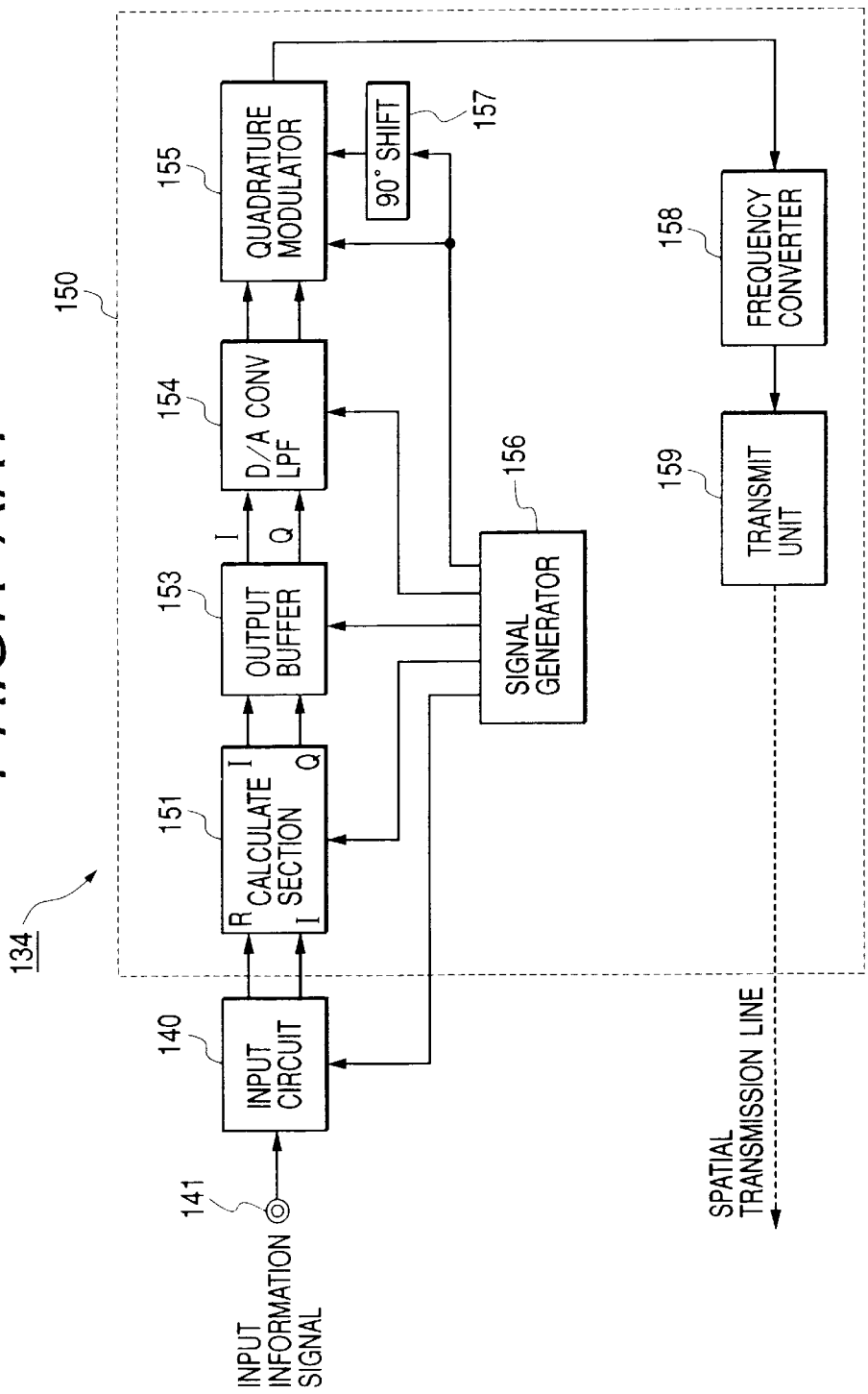
FIG. 2 is a block diagram of a transmitter in the prior-art system of FIG. 1.

As shown in FIG. 2, the OFDM transmitting section 150 in the transmitter 134 includes a calculating section 151, an output buffer 153, a D/A converter 154, a quadrature modulator 155, a signal generator 156, a phase shifter 157, a frequency converter 158, and a transmitting unit 159.

With reference to FIG. 2, an information signal to be transmitted is fed to the input circuit 140 via an input terminal 141. The input circuit 140 adds a signal of an error correction code (ECC) to the information signal. The input circuit 140 divides the ECC-added information signal into pieces in a first group and pieces in a second group through serial-to-parallel conversion. The first-group pieces are used as real-part signals for modulating orthogonal multiple carriers. The second-group pieces are used as imaginary-part signals for modulating the orthogonal multiple carriers. The input circuit 140 outputs the real-part signals and the imaginary-part signals to the calculating section 151 within the OFDM transmitting section 150. The operation of the input circuit 140 is responsive to a clock signal fed from the signal generator 156 within the OFDM transmitting section 150.

The calculating section 151 implements IDFT (or IFFT, inverse fast Fourier transform) for converting the real-part signals and the imaginary-part signals into modulation-resultant ortogonal-multi-carrier signals of the real part and modulation-resultant orthogonal-multi-carrier signals of the imaginary part. The IDFT by the calculating section 151 corresponds to subjecting orthogonal multiple carriers to modulation (for example, QAM or PSK) responsive to the real-part signals and the imaginary-part signals. The calculating section 151 combines the modulation-resultant orthogonal-multi-carrier signals of the real part into a multiplexing-resultant I (in-phase) signal. The calculating section 151 combines the modulation-resultant orthogonal-multi-carrier signals of the imaginary part into a multiplexing-resultant Q (quadrature) signal. The calculating section 151 feeds the multiplexing-resultant I and Q signals to the output buffer 153. The operation of the calculating section 151 is responsive to a clock signal fed from the signal generator 156.

The multiplexing-resultant I and Q signals are temporarily stored in the output buffer 153 before being outputted therefrom to the D/A converter 154 symbol by symbol. Every symbol period corresponds to a guard interval plus a window interval. The operation of the output buffer 153 is responsive to a clock signal fed from the signal generator 156. The D/A converter 154 changes the multiplexing-resultant I signal and the multiplexing-resultant Q signal into corresponding analog I signal and analog Q signal. Low pass filters (LPF's) incorporated in the D/A converter 154 removes unnecessary high-frequency components from the analog I and Q signals. The D/A converter 154 feeds the resultant analog I and Q signals to the quadrature modulator 155 as analog modulating I and Q signals (analog baseband I and Q signals). The operation of the D/A converter 154 is responsive to a clock signal fed from the signal generator 156.

The quadrature modulator 155 receives an intermediate-frequency (IF) carrier from the signal generator 156. Also, the phase shifter 157 receives the IF carrier from the signal generator 156. The device 157 shifts the phase of the IF carrier by 90°, and outputs the phase-shift-resultant IF carrier to the quadrature modulator 155. Thus, the quadrature modulator 155 receives a pair of an in-phase (I) IF carrier and a quadrature (Q) IF carrier. In the quadrature modulator 155, the I and Q IF carriers are modulated in accordance with the analog modulating I and Q signals so that the analog modulating I and Q signals are converted into an IF orthogonal-multi-carrier signal (an IF OFDM signal). The quadrature modulator 155 outputs the IF orthogonal-multi-carrier signal to the frequency converter 158.

The frequency converter 158 changes the IF ortogonal-multi-carrier signal into an RF orthogonal-multi-carrier signal (an RF OFDM signal) in a desired frequency band for transmission. The frequency converter 158 feeds the RF orthogonal-multi-carrier signal to the transmitting unit 159. The transmitting unit 159 amplifies the power of the RF orthogonal-multi-carrier signal. The resultant RF orthogonal-multi-carrier signal is fed to an antenna (not shown) before being radiated thereby into the spatial transmission line.

Figure 3:
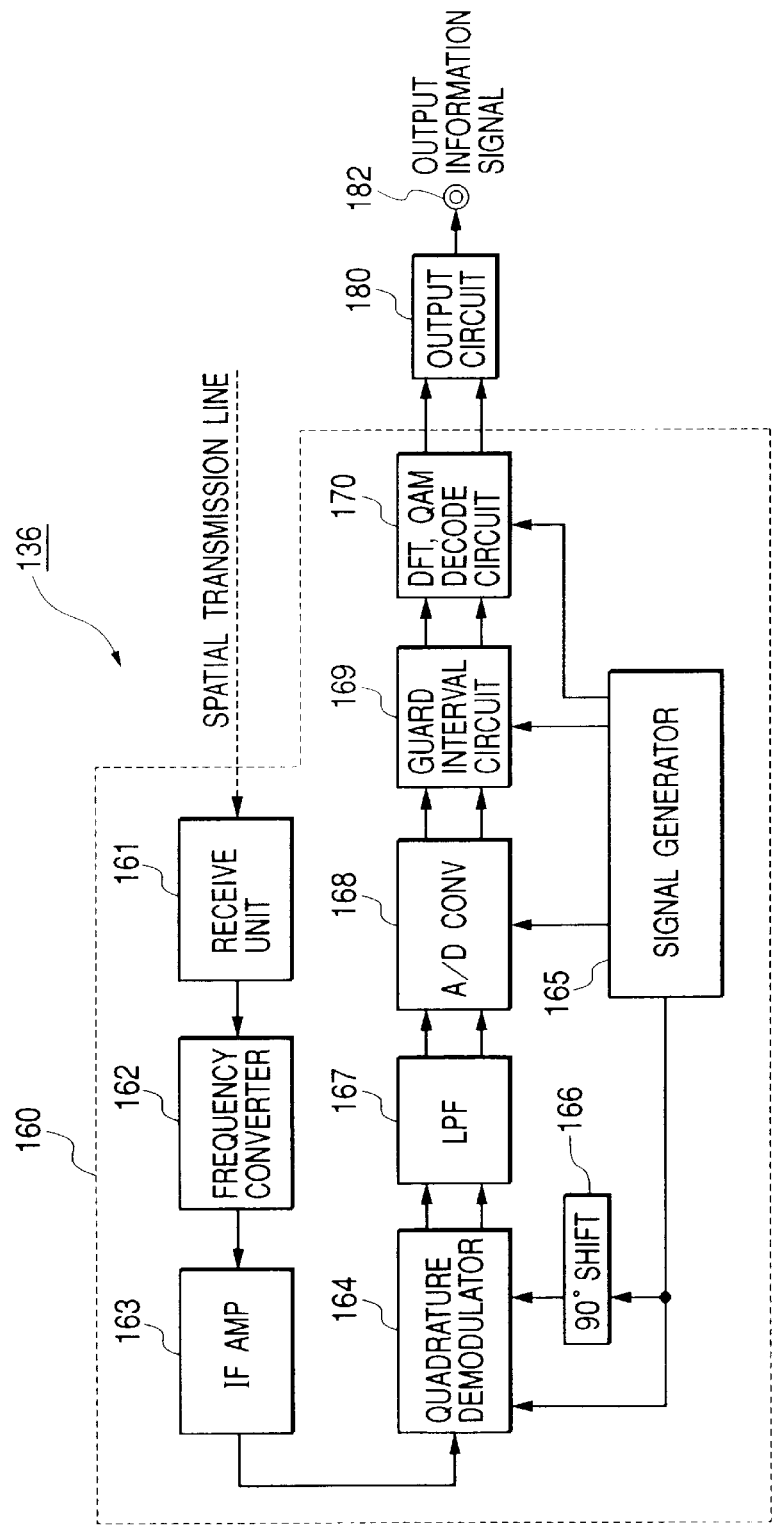
FIG. 3 is a block diagram of a receiver in the prior-art system of FIG. 1.

As shown in FIG. 3, the OFDM receiving section 160 in the receiver 136 includes a receiving unit 161, a frequency converter 162, an intermediate-frequency amplifier 163, a quadrature demodulator 164, a signal generator 165, a phase shifter 166, a low pass filter (LPF) 167, an A/D converter 168, a guard interval processing circuit 169, and a decoding circuit 170.

With reference to FIG. 3, the RF orthogonal-multi-carrier signal is propagated along the spatial transmission line before reaching an antenna (not shown) in the receiver 136. In the receiver 136, the RF orthogonal-multi-carrier signal is fed from the antenna to the receiving unit 161 within the OFDM receiving section 160. The receiving unit 161 amplifies the RF ortogonal-multi-carrier signal. The receiving unit 161 outputs the resultant RF orthogonal-multi-carrier signal to the frequency converter 162. The frequency converter 162 changes the RF orthogonal-multi-carrier signal into an IF orthogonal-multi-carrier signal. The frequency converter 162 feeds the IF orthogonal-multi-carrier signal to the IF amplifier 163. The IF amplifier 163 enlarges the IF orthogonal-multi-carrier signal. The IF amplifier 163 outputs the resultant IF orthogonal-multi-carrier signal to the quadrature demodulator 164.

The quadrature demodulator 164 receives an intermediate-frequency (IF) carrier from the signal generator 165. Also, the phase shifter 166 receives the IF carrier from the signal generator 165. The device 166 shifts the phase of the IF carrier by 90°, and outputs the phase-shift-resultant IF carrier to the quadrature demodulator 164. Thus, the quadrature demodulator 164 receives a pair of an in-phase (I) IF carrier and a quadrature (Q) IF carrier. In response to the pair of the I and Q IF carriers, the IF ortogonal-multi-carrier signal is demodulated by the quadrature demodulator 164 into an analog baseband I signal and an analog baseband Q signal. The quadrature demodulator 164 outputs the analog baseband I and Q signals to the LPF 167.

The LPF 167 passes only components of the output signals of the quadrature demodulator 164 which occupy a desired frequency band. Output signals of the LPF 167 which have analog forms are fed to the A/D converter 168. The device 168 converts the output signals of the LPF 167 into digital signals (digital I and Q signals). The A/D converter 168 outputs the digital signals to the guard interval processing circuit 169. The operation of the A/D converter 168 is responsive to a clock signal fed from the signal generator 165.

The guard interval processing circuit 169 removes time-portions of the output signals (the digital I and Q signals) of the A/D converter 168 which occupy a guard interval in every symbol period. The guard interval processing circuit 169 outputs the resultant signals (the resultant digital I and Q signals) to the decoding circuit 170. The operation of the guard interval processing circuit 169 is responsive to a clock signal fed from the signal generator 165.

The decoding circuit 170 implements fast discrete Fourier transform (fast DFT) for converting the output I and Q signals of the guard interval processing circuit 169 into real-part signals and imaginary-part signals with respect to carrier frequencies. The fast DFT by the decoding circuit 170 corresponds to subjecting the output I and Q signals of the guard interval processing circuit 169 to demodulation (for example, QAM demodulation or PSK demodulation) responsive to information indicating the signal-piece assignment to orthogonal multiple carriers in a transmitter side. The decoding circuit 170 outputs the real-part signals and the imaginary-part signals to the output circuit 180 as decoding-resultant signals. The operation of the decoding circuit 170 is responsive to a clock signal fed from the signal generator 165.

The output circuit 180 combines the output signals of the decoding circuit 170 into an ECC-added information signal. The output circuit 180 implements error detection and correction processes responsive to the ECC signal in the ECC-added information signal, thereby recovering the original information signal. The output circuit 180 feeds the recovered original information signal to an output terminal 82. The operation of the output circuit 180 is responsive to a clock signal fed from the signal generator 165.

In the transmitter 134 of FIG. 2, the calculating section 151 uses a IDFT circuit designed to generate a predetermined number of orthogonal multiple carriers. The IDFT circuit has points corresponding to the respective carriers. In the prior-art system 130 of FIGS. 1–3, all the carriers generated by the IDFT circuit are used for the transmission of the information signal. Accordingly, the prior-art system 130 requires a many-point IDFT circuit for high-rate transmission of an information signal. The many-point IDFT circuit has a complicated structure.

In the receiver 136 of FIG. 3, the decoding circuit 170 uses a DFT circuit having points corresponding to the respective carriers. Accordingly, the prior-art system 130 requires a many-point DFT circuit which has a complicated structure.

First Embodiment

Figure 4:
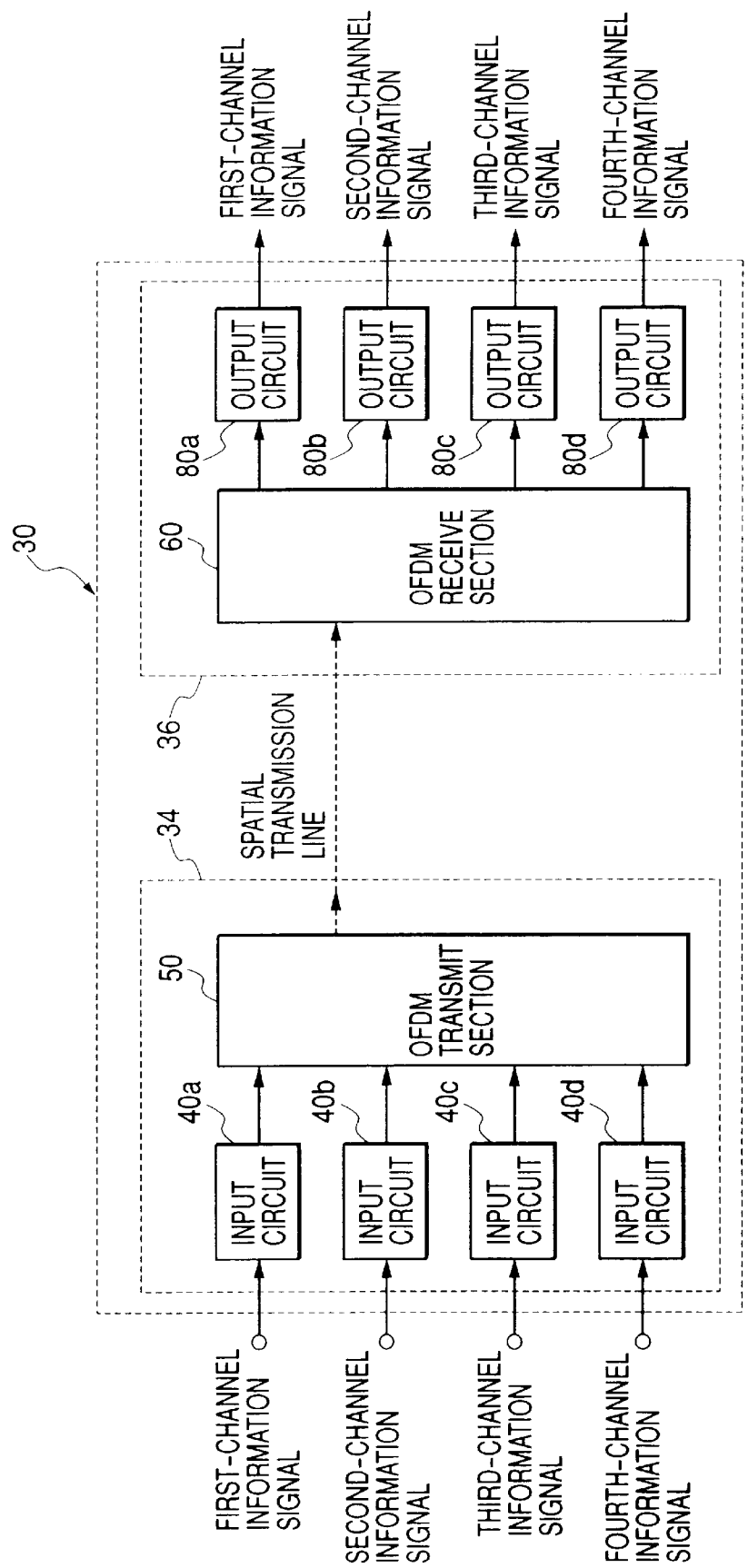
FIG. 4 is a block diagram of an orthogonal-multi-carrier signal transmitting apparatus according to a first embodiment of this invention.

FIG. 4 shows an orthogonal-multi-carrier signal transmitting apparatus (system) 30 according to a first embodiment of this invention. The apparatus 30 of FIG. 4 includes a transmitter 34 and a receiver 36 which can be connected to each other via a spatial transmission line.

The transmitter 34 receives 4-channel information signals to be transmitted. Specifically, the 4-channel information signals include an information signal of a first channel, an information signal of a second channel, an information signal of a third channel, and an information signal of a fourth channel. The transmitter 34 may receive at least one of the 4-channel information signals. The transmitter 34 converts the 4-channel information signals into an RF OFDM signal (an radio-frequency orthogonal frequency multiplexed signal). The RF OFDM signal is also referred to as the RF orthogonal-multi-carrier signal. The transmitter 34 includes an antenna which radiates the RF OFDM signal into the spatial transmission line. The RF OFDM signal is propagated along the spatial transmission line before reaching an antenna (not shown) in the receiver 36. The receiver 36 demodulates and decodes the received RF OFDM signal into the 4-channel information signals.

The transmitter 34 has input circuits 40a, 40b, 40c, and 40d, and an OFDM transmitting section 50. The receiver 36 has an OFDM receiving section 60, and output circuits 80a, 80b, 80c, and 80d.

The first-channel, second-channel, third-channel, and fourth-channel input signals are fed to the input circuits 40a, 40b, 40c, and 40d in the transmitter 34, respectively. Each of the 4-channel input signals includes, for example, an MPEG-2 (Moving Picture Experts Group 2) bit stream representing information to be transmitted. The input circuit 40a adds a signal of an error correction code (ECC) to the first-channel information signal. The input circuit 40a divides the first-channel ECC-added information signal into pieces. The input circuit 40a feeds the first-channel signal pieces (the pieces of the first-channel ECC-added information signal) to the OFDM transmitting section 50. The input circuit 40b adds a signal of an error correction code (ECC) to the second-channel information signal. The input circuit 40b divides the second-channel ECC-added information signal into pieces. The input circuit 40b feeds the second-channel signal pieces (the pieces of the second-channel ECC-added information signal) to the OFDM transmitting section 50. The input circuit 40c adds a signal of an error correction code (ECC) to the third-channel information signal. The input circuit 40c divides the third-channel ECC-added information signal into pieces. The input circuit 40c feeds the third-channel signal pieces (the pieces of the third-channel ECC-added information signal) to the OFDM transmitting section 50. The input circuit 40d adds a signal of an error correction code (ECC) to the fourth-channel information signal. The input circuit 40d divides the fourth-channel ECC-added information signal into pieces. The input circuit 40d feeds the fourth-channel signal pieces (the pieces of the fourth-channel ECC-added information signal) to the OFDM transmitting section 50.

The OFDM transmitting section 50 converts the first-channel signal pieces into a first-channel baseband OFDM signal. The OFDM transmitting section 50 converts the second-channel signal pieces into a second-channel baseband OFDM signal. The OFDM transmitting section 50 converts the third-channel signal pieces into a third-channel baseband OFDM signal. The OFDM transmitting section 50 converts the fourth-channel signal pieces into a fourth-channel baseband OFDM signal. The OFDM transmitting section 50 combines the first-channel, second-channel, third-channel, and fourth-channel baseband OFDM signal into a composite baseband OFDM signal. The OFDM transmitting section 50 up-converts the composite baseband OFDM signal into an RF OFDM signal. The antenna in the transmitter 34 radiates the RF OFDM signal into the spatial transmission line. The RF OFDM signal is propagated along the spatial transmission line before reaching the antenna in the receiver 36.

In the receiver 36, the received RF OFDM signal is fed from the antenna to the OFDM receiving section 60. The OFDM receiving section 60 demodulates the RF OFDM signal into first-channel signal pieces, second-channel signal pieces, third-channel signal pieces, and fourth-channel signal pieces. The OFDM receiving section 60 feeds the first-channel signal pieces, the second-channel signal pieces, the third-channel signal pieces, and the fourth-channel signal pieces to the output circuits 80a, 80b, 80c, and 80d, respectively. The output circuit 80a combines the first-channel signal pieces into the first-channel ECC-added information signal. The output circuit 80a implements error detection and correction processes responsive to the ECC signal in the first-channel ECC-added information signal, thereby recovering the original first-channel information signal. The output circuit 80a outputs the recovered first-channel information signal. The output circuit 80b combines the second-channel signal pieces into the second-channel ECC-added information signal. The output circuit 80b implements error detection and correction processes responsive to the ECC signal in the second-channel ECC-added information signal, thereby recovering the original second-channel information signal. The output circuit 80b outputs the recovered second-channel information signal. The output circuit 80c combines the third-channel signal pieces into the third-channel ECC-added information signal. The output circuit 80c implements error detection and correction processes responsive to the ECC signal in the third-channel ECC-added information signal, thereby recovering the original third-channel information signal. The output circuit 80c outputs the recovered third-channel information signal. The output circuit 80d combines the fourth-channel signal pieces into the fourth-channel ECC-added information signal. The output circuit 80d implements error detection and correction processes responsive to the ECC signal in the fourth-channel ECC-added information signal, thereby recovering the original fourth-channel information signal. The output circuit 80d outputs the recovered fourth-channel information signal.

Figure 5:
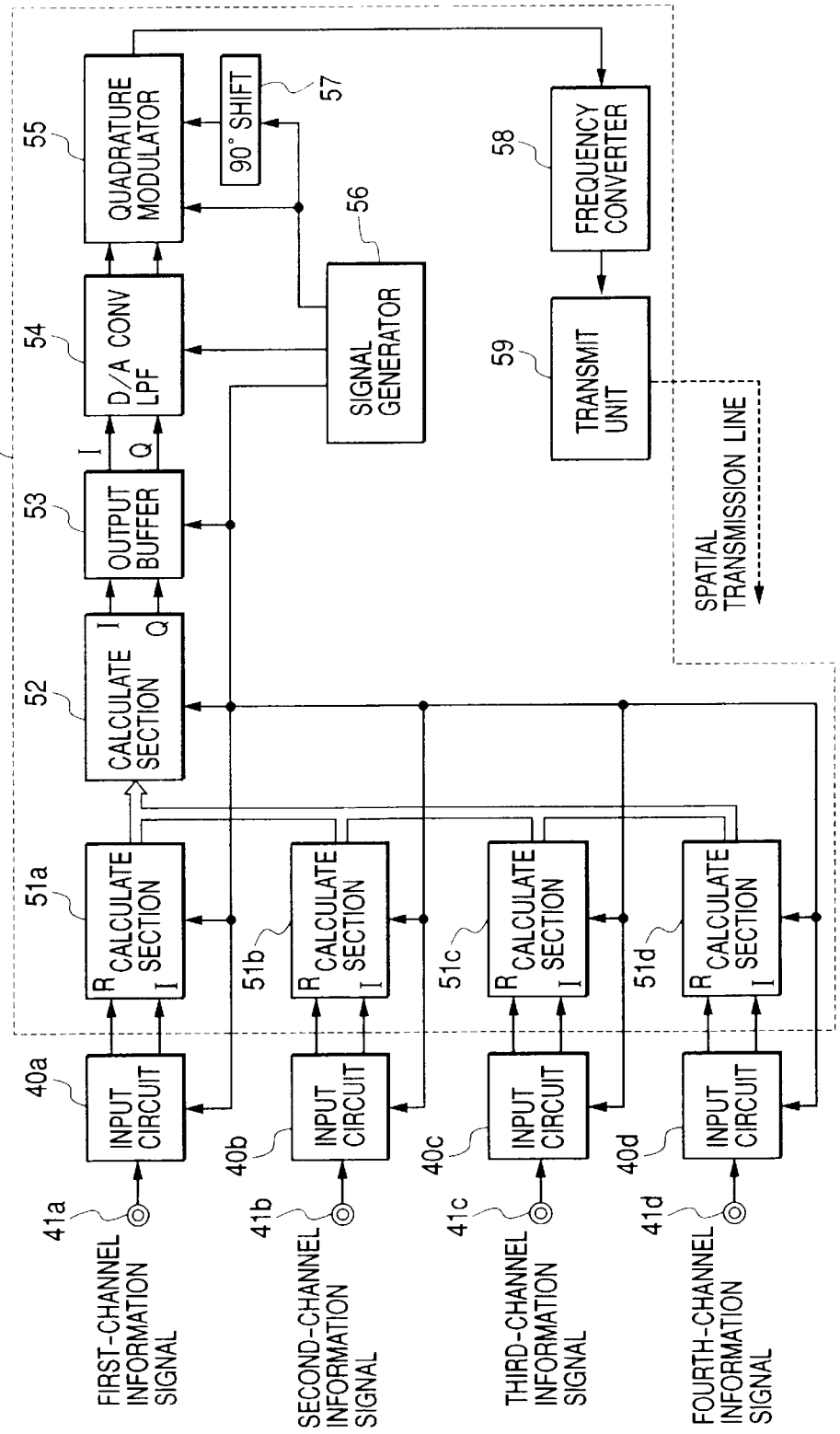
FIG. 5 is a block diagram of a transmitter in the apparatus of FIG. 4.

As shown in FIG. 5, the OFDM transmitting section 50 in the transmitter 34 includes calculating sections 51a, 51b, 51c, and 51d, a later-stage calculating section 52, an output buffer 53, a D/A converter 54, a quadrature modulator 55, a signal generator 56, a phase shifter 57, a frequency converter 58, and a transmitting unit 59.

With reference to FIG. 5, a first-channel information signal to be transmitted is fed to the input circuit 40a via an input terminal 41a. The input circuit 40a adds a signal of an error correction code (ECC) to the first-channel information signal. The input circuit 40a divides the first-channel ECC-added information signal into pieces in a first group and pieces in a second group through serial-to-parallel conversion. The first-group pieces are used as real-part signals for modulating orthogonal multiple carriers of the first channel. The second-group pieces are used as imaginary-part signals for modulating the orthogonal multiple carriers of the first channel. The input circuit 40a outputs the first-channel real-part signals and the first-channel imaginary-part signals to the calculating section 51a within the OFDM transmitting section 50. The operation of the input circuit 40a is responsive to a clock signal generated by and fed from the signal generator 56 within the OFDM transmitting section 50.

A second-channel information signal to be transmitted is fed to the input circuit 40b via an input terminal 41b. The input circuit 40b adds a signal of an error correction code (ECC) to the second-channel information signal. The input circuit 40b divides the second-channel ECC-added information signal into pieces in a first group and pieces in a second group through serial-to-parallel conversion. The first-group pieces are used as real-part signals for modulating orthogonal multiple carriers of the second channel. The second-group pieces are used as imaginary-part signals for modulating the orthogonal multiple carriers of the second channel. The input circuit 40b outputs the second-channel real-part signals and the second-channel imaginary-part signals to the calculating section 51b within the OFDM transmitting section 50. The operation of the input circuit 40b is responsive to the clock signal fed from the signal generator 56 within the OFDM transmitting section 50.

A third-channel information signal to be transmitted is fed to the input circuit 40c via an input terminal 41c. The input circuit 40c adds a signal of an error correction code (ECC) to the third-channel information signal. The input circuit 40c divides the third-channel ECC-added information signal into pieces in a first group and pieces in a second group through serial-to-parallel conversion. The first-group pieces are used as real-part signals for modulating orthogonal multiple carriers of the third channel. The second-group pieces are used as imaginary-part signals for modulating the orthogonal multiple carriers of the third channel. The input circuit 40c outputs the third-channel real-part signals and the third-channel imaginary-part signals to the calculating section 51c within the OFDM transmitting section 50. The operation of the input circuit 40c is responsive to the clock signal fed from the signal generator 56 within the OFDM transmitting section 50.

A fourth-channel information signal to be transmitted is fed to the input circuit 40d via an input terminal 41d. The input circuit 40d adds a signal of an error correction code (ECC) to the fourth-channel information signal. The input circuit 40d divides the fourth-channel ECC-added information signal into pieces in a first group and pieces in a second group through serial-to-parallel conversion. The first-group pieces are used as real-part signals for modulating orthogonal multiple carriers of the fourth channel. The second-group pieces are used as imaginary-part signals for modulating the orthogonal multiple carriers of the fourth channel. The input circuit 40d outputs the fourth-channel real-part signals and the fourth-channel imaginary-part signals to the calculating section 51d within the OFDM transmitting section 50. The operation of the input circuit 40d is responsive to the clock signal fed from the signal generator 56 within the OFDM transmitting section 50.

The calculating sections 51a, 51b, 51c, 51d, and the later-stage calculating section 52 cooperate to implement IFFT (inverse fast Fourier transform) or IDFT (inverse discrete Fourier transform) for converting the first-channel, second-channel, third-channel, and fourth-channel real-part signals and the first-channel, second-channel, third-channel, and fourth-channel imaginary-part signals into modulation-resultant orthogonal-multi-carrier signals of the real part and modulation-resultant orthogonal-multi-carrier signals of the imaginary part. The IFFT (or IDFT) by the calculating sections 51a, 51b, 51c, 51d, and the later-stage calculating section 52 corresponds to subjecting orthogonal multiple carriers to modulation (for example, QAM or PSK) responsive to the real-part signals and the imaginary-part signals. The later-stage calculating section 52 combines the modulation-resultant orthogonal-multi-carrier signals of the real part into a multiplexing-resultant I (in-phase) signal. The later-stage calculating section 52 combines the modulation-resultant orthogonal-multi-carrier signals of the imaginary part into a multiplexing-resultant Q (quadrature) signal. The later-stage calculating section 52 feeds the multiplexing-resultant I and Q signals to the output buffer 53. The operation of the calculating sections 51a, 51b, 51c, 51d, and the later-stage calculating section 52 is responsive to the clock signal fed from the signal generator 56.

The calculating sections 51a, 51b, 51c, 51d, and the later-stage calculating section 52 include, for example, a common DSP (digital signal processor) or a common computer-based device programmed to implement the IFFT or the IDFT. The calculating sections 51a, 51b, 51c, 51d, and the later-stage calculating section 52 may include a common LSI (large-scale integration circuit) designed to implement the IFFT or the IDFT.

The multiplexing-resultant I and Q signals are temporarily stored in the output buffer 53 before being outputted therefrom to the D/A converter 54 symbol by symbol. Every symbol period corresponds to a guard interval plus a window interval. The operation of the output buffer 53 is responsive to the clock signal fed from the signal generator 56. The D/A converter 54 changes the multiplexing-resultant I signal and the multiplexing-resultant Q signal into corresponding analog I signal and analog Q signal. Low pass filters (LPF's) incorporated in the D/A converter 54 removes unnecessary high-frequency components from the analog I and Q signals. The D/A converter 54 feeds the resultant analog I and Q signals to the quadrature modulator 55 as analog modulating I and Q signals (analog baseband I and Q signals). The operation of the D/A converter 54 is responsive to a clock signal generated by and fed from the signal generator 56.

The signal generator 56 produces an intermediate-frequency (IF) carrier. The quadrature modulator 55 receives the IF carrier from the signal generator 56. Also, the phase shifter 57 receives the IF carrier from the signal generator 56. The device 57 shifts the phase of the IF carrier by 90°, and outputs the phase-shift-resultant IF carrier to the quadrature modulator 56. Thus, the quadrature modulator 55 receives a pair of an in-phase (I) IF carrier and a quadrature (Q) IF carrier. In the quadrature modulator 55, the I and Q IF carriers are modulated in accordance with the analog modulating I and Q signals so that the analog modulating I and Q signals are converted into an IF orthogonal-multi-carrier signal (an IF OFDM signal). The quadrature modulator 55 outputs the IF orthogonal-multi-carrier signal to the frequency converter 58.

The frequency converter 58 changes the IF orthogonal-multi-carrier signal into an RF orthogonal-multi-carrier signal (an RF OFDM signal) in a desired frequency band for transmission. The frequency converter 58 feeds the RF orthogonal-multi-carrier signal to the transmitting unit 59. The transmitting unit 59 amplifies the power of the RF orthogonal-multi-carrier signal. The resultant RF orthogonal-multi-carrier signal is fed to an antenna (not shown) before being radiated thereby into the spatial transmission line.

Figure 6:
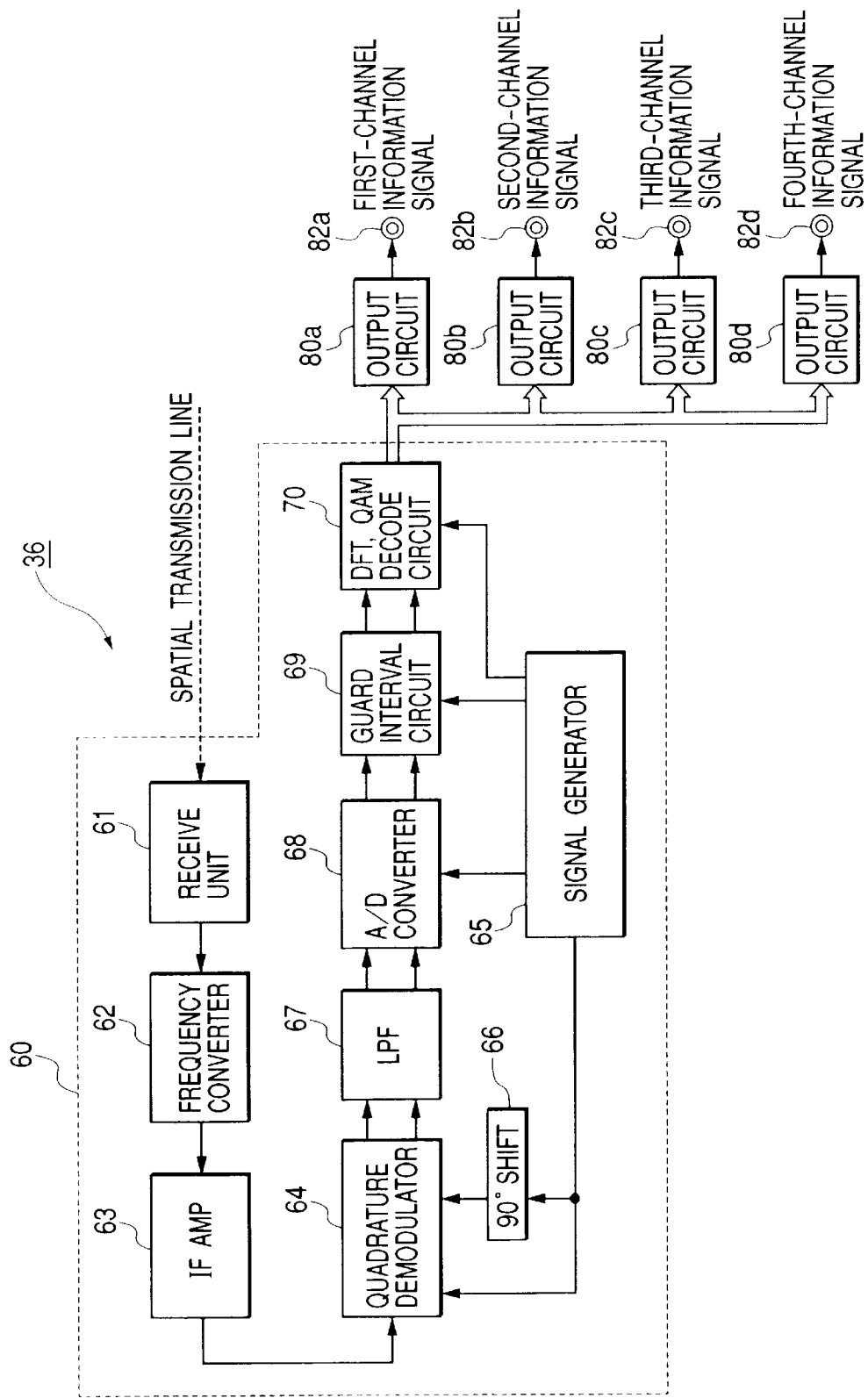
FIG. 6 is a block diagram of a receiver in the apparatus of FIG. 4.

As shown in FIG. 6, the OFDM receiving section 60 in the receiver 36 includes a receiving unit 61, a frequency converter 62, an intermediate-frequency amplifier 63, a quadrature demodulator 64, a signal generator 65, a phase shifter 66, a low pass filter (LPF) 67, an A/D converter 68, a guard interval processing circuit 69, and a decoding circuit 70.

With reference to FIG. 6, the RF orthogonal-multi-carrier signal is propagated along the spatial transmission line before reaching the antenna in the receiver 36. In the receiver 36, the RF orthogonal-multi-carrier signal is fed from the antenna to the receiving unit 61 within the OFDM receiving section 60. The receiving unit 61 amplifies the RF orthogonal-multi-carrier signal. The receiving unit 61 outputs the resultant RF orthogonal-multi-carrier signal to the frequency converter 62. The frequency converter 62 changes the RF orthogonal-multi-carrier signal into an IF orthogonal-multi-carrier signal. The frequency converter 62 feeds the IF orthogonal-multi-carrier signal to the IF amplifier 63. The IF amplifier 63 enlarges the IF orthogonal-multi-carrier signal. The IF amplifier 63 outputs the resultant IF orthogonal-multi-carrier signal to the quadrature demodulator 64.

The signal generator 65 produces an intermediate-frequency (IF) carrier. The quadrature demodulator 64 receives the IF carrier from the signal generator 65. Also, the phase shifter 66 receives the IF carrier from the signal generator 65. The device 66 shifts the phase of the IF carrier by 90°, and outputs the phase-shift-resultant IF carrier to the quadrature demodulator 64. Thus, the quadrature demodulator 64 receives a pair of an in-phase (I) IF carrier and a quadrature (Q) IF carrier. In response to the pair of the I and Q IF carriers, the IF orthogonal-multi-carrier signal is demodulated by the quadrature demodulator 64 into an analog baseband I signal and an analog baseband Q signal. The quadrature demodulator 64 outputs the analog baseband I and Q signals to the LPF 67.

The LPF 67 passes only components of the output signals of the quadrature demodulator 64 which occupy a desired frequency band. Output signals of the LPF 67 which have analog forms are fed to the A/D converter 68. The device 68 converts the output signals of the LPF 67 into digital signals (digital I and Q signals). The A/D converter 68 outputs the digital signals to the guard interval processing circuit 69. The operation of the A/D converter 68 is responsive to a clock signal generated by and fed from the signal generator 65.

The guard interval processing circuit 69 removes time-portions of the output signals (the digital I and Q signals) of the A/D converter 68 which occupy a guard interval in every symbol period. The guard interval processing circuit 69 outputs the resultant signals (the resultant digital I and Q signals) to the decoding circuit 70. The operation of the guard interval processing circuit 69 is responsive to a clock signal generated by and fed from the signal generator 65.

The decoding circuit 70 implements fast discrete Fourier transform (fast DFT) for converting the output I and Q signals of the guard interval processing circuit 69 into first-channel, second-channel, third-channel, and fourth-channel real-part signals, and first-channel, second-channel, third-channel, and fourth-channel imaginary-part signals with respect to carrier frequencies. The fast DFT by the decoding circuit 70 corresponds to subjecting the output I and Q signals of the guard interval processing circuit 69 to demodulation (for example, QAM demodulation or PSK demodulation) responsive to information indicating the signal-piece assignment to orthogonal multiple carriers in a transmitter side. The decoding circuit 70 outputs the first-channel real-part signals and the first-channel imaginary-part signals to the output circuit 80a as first-channel decoding-resultant signals. The decoding circuit 70 outputs the second-channel real-part signals and the second-channel imaginary-part signals to the output circuit 80b as second-channel decoding-resultant signals. The decoding circuit 70 outputs the third-channel real-part signals and the third-channel imaginary-part signals to the output circuit 80c as third-channel decoding-resultant signals. The decoding circuit 70 outputs the fourth-channel real-part signals and the fourth-channel imaginary-part signals to the output circuit 80d as fourth-channel decoding-resultant signals. The operation of the decoding circuit 70 is responsive to a clock signal generated by and fed from the signal generator 65.

The output circuit 80a combines the first-channel output signals of the decoding circuit 70 into a first-channel ECC-added information signal. The output circuit 80a implements error detection and correction processes responsive to the ECC signal in the first-channel ECC-added information signal, thereby recovering the original first-channel information signal. The output circuit 80a feeds the recovered first-channel information signal to an output terminal 82a. The output circuit 80b combines the second-channel output signals of the decoding circuit 70 into a second-channel ECC-added information signal. The output circuit 80b implements error detection and correction processes responsive to the ECC signal in the second-channel ECC-added information signal, thereby recovering the original second-channel information signal. The output circuit 80b feeds the recovered second-channel information signal to an output terminal 82b. The output circuit 80c combines the third-channel output signals of the decoding circuit 70 into a third-channel ECC-added information signal. The output circuit 80c implements error detection and correction processes responsive to the ECC signal in the third-channel ECC-added information signal, thereby recovering the original third-channel information signal. The output circuit 80b feeds the recovered third-channel information signal to an output terminal 82c. The output circuit 80d combines the fourth-channel output signals of the decoding circuit 70 into a fourth-channel ECC-added information signal. The output circuit 80d implements error detection and correction processes responsive to the ECC signal in the fourth-channel ECC-added information signal, thereby recovering the original fourth-channel information signal. The output circuit 80d feeds the recovered third-channel information signal to an output terminal 82d.

Figure 7:
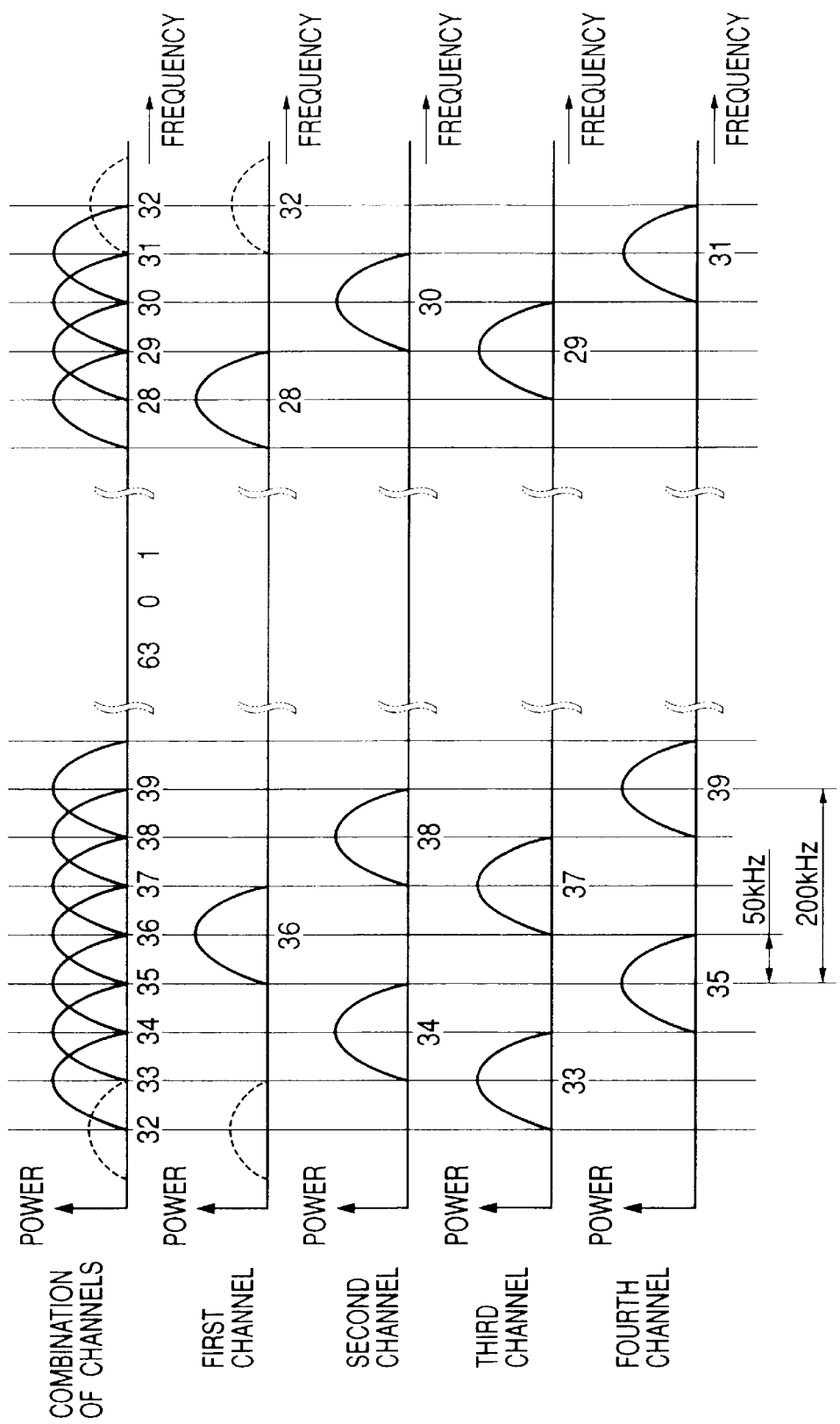
FIG. 7 is a diagram of a frequency spectrum of an ortogonal-multi-carrier signal.
Figures 8, 9:
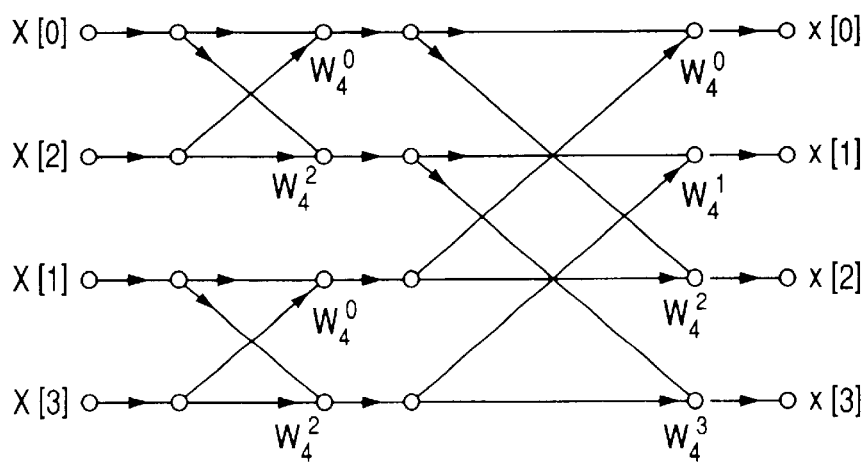
FIG. 8 is a diagram of the assignment of carriers to channels.
FIG. 9 is a signal flow diagram of temporally-thinned 4-point IFFT of an output-data serially-arranged type.

The apparatus 30 of FIG. 4 uses 60 orthogonal multiple carriers denoted by numbers (carrier order numbers or carrier identification numbers) "0", "1", "2", "3", ..., and "63" respectively. As shown in FIG. 7, the orthogonal multiple carriers "0", "1", "2", "3", ..., and "63" are spaced at 50-kHz intervals in a frequency domain. The first channel, the second channel, the third channel, and the fourth channel are denoted by numbers (channel order numbers or channel identification numbers) "0", "1", "2", and "3" respectively. As shown in FIGS. 7 and 8, the carriers "0", "4", "8", ..., and "60" are assigned to the first channel (the channel having the identification number "0"). In other words, the carriers "4n" are assigned to the first channel, where n=0, 1, 2, 3, ..., 15. The carriers "2", "6", "10", ..., and "62" are assigned to the second channel (the channel having the identification number "1"). In other words, the carriers "4n+2" are assigned to the second channel. The carriers "1", "5", "9", ..., and "61" are assigned to the third channel (the channel having the identification number "2"). In other words, the carriers "4n+1" are assigned to the third channel. The carriers "3", "7", "11", ..., and "63" are assigned to the fourth channel (the channel having the identification number "3"). In other words, the carriers "4n+3" are assigned to the fourth channel. In each of the first, second, third, and fourth channels, carriers are spaced at 200-kHz intervals.

The IFFT by the calculating sections 51a, 51b, 51c, 51d, and the later-stage calculating section 52 will be further explained below. The IFFT has a cardinal number of "2". FIG. 9 shows a signal flow of temporally-thinned 4-point IFFT of an output-data serially-arranged type. In FIG. 9, X[0], X[2], X[1], and X[3] at the left-hand side denote terminals fed with frequency-domain input signals, and x[0], x[1], x[2], and x[3] at the right-hand side denote terminals fed with time-domain output signals. In addition, the arrows indicate directions along which signals are fed. Furthermore, characters such as $W_4^0$ and $W_4^2$ near arrows indicate rotation factors. The presence of a character of a rotation factor near an arrow means that a related signal is multiplied by the rotation factor before being fed to a later stage. The absence of a character of a rotation factor from a region near an arrow means that a related signal is multiplied by "1" before being fed to a later stage, or that a related signal is fed to a later stage as it is. At each node to which two arrows are directed, related two signals are added.

Figure 10:
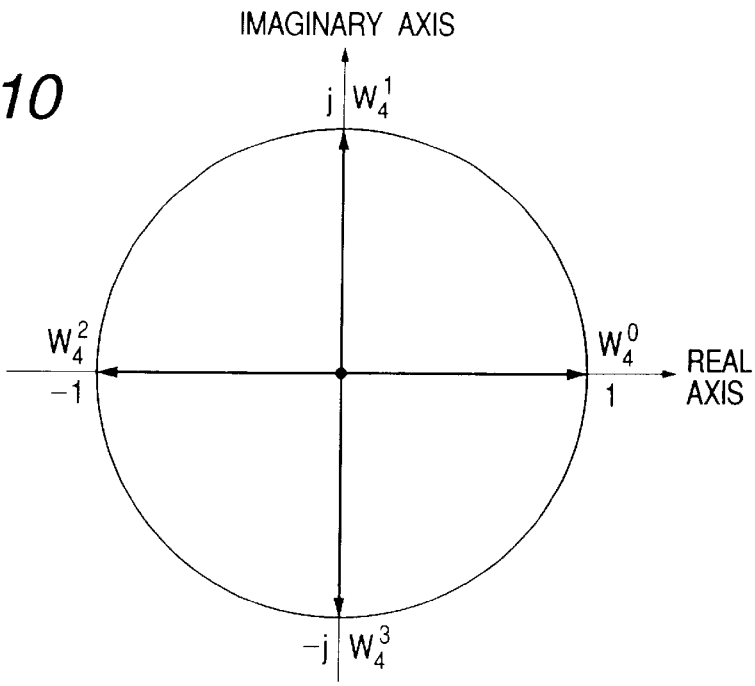
FIG. 10 is a diagram of a complex plane in which rotation factors used in 4-point IFFT are located.

The rotation factors $W_4^0$, $W_4^1$, $W_4^2$, and $W_4^3$ are used by the 4-point IFFT. The rotation factors $W_4^0$, $W_4^1$, $W_4^2$, and $W_4^3$ take complex values shown in FIG. 10. Specifically, FIG. 10 shows that a circle having a radius of "1" exists in a complex plane defined by a real axis (an ordinate) and an imaginary axis (an abscissa). The circle intersects with the real axis at a point of "1" and a point of "−1". The intersection point of "1" corresponds to the rotation factor $W_4^0$. The intersection point of "−1" corresponds to the rotation factor $W_4^2$. The circle intersects with the imaginary axis at a point of "j" and a point of "−j", where "j" denotes an imaginary unit. The intersection point of "j" corresponds to the rotation factor $W_4^1$. The intersection point of "−j" corresponds to the rotation factor $W_4^3$. Accordingly, the rotation factors $W_4^0$, $W_4^1$, $W_4^2$, and $W_4^3$ are equal to "1", "j", "−1", and "−j", respectively.

Figure 11:
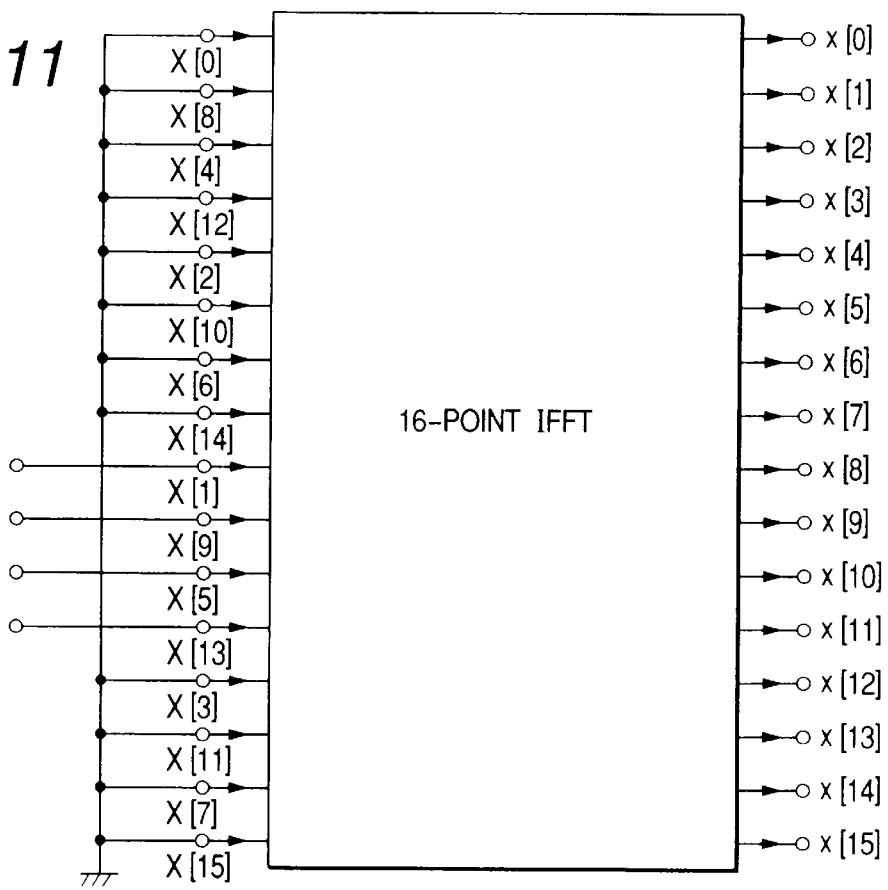
FIG. 11 is a diagram of an IFFT device for implementing 16-point IFFT, and input terminals and output terminals thereof.

FIG. 11 shows an IFFT device for implementing temporally-thinned 16-point IFFT of an output-data serially-arranged type. In FIG. 11, X[0], X[8], X[4], ... and X[15] at the left-hand side denote frequency-domain input terminals which correspond to 16 different carrier frequencies. On the other hand, [x0], x[1], x[2], ..., and x[15] at the right-hand side denote terminals for outputting IFFT calculation results as time-domain output signals.

With reference to FIG. 11, four information signal pieces are fed to the four terminals X[1], X[5], X[9], and X[13] among the frequency-domain input terminals X[0], X[1], X[2], ..., and X[15], respectively. The other terminals among the frequency-domain input terminals X[0], X[1], X[2], ..., and X[15] are connected to a ground, and are not subjected to information signal pieces. Thus, the IFFT device in FIG. 11 uses only 4 carriers (1st, 5th, 9th, and 13th carriers) among 16 carriers. The other carriers are unused or inactive. The results of IFFT calculations with respect to the four information signal pieces are outputted to the terminals x[0], x[1], x[2], ..., and x[15]. The IFFT calculation results correspond to the 1st, 5th, 9th, and 13th carriers modulated in accordance with the four information signal pieces. The IFFT calculation results include sequences of signal samples representing output signal voltages.

Figure 12:
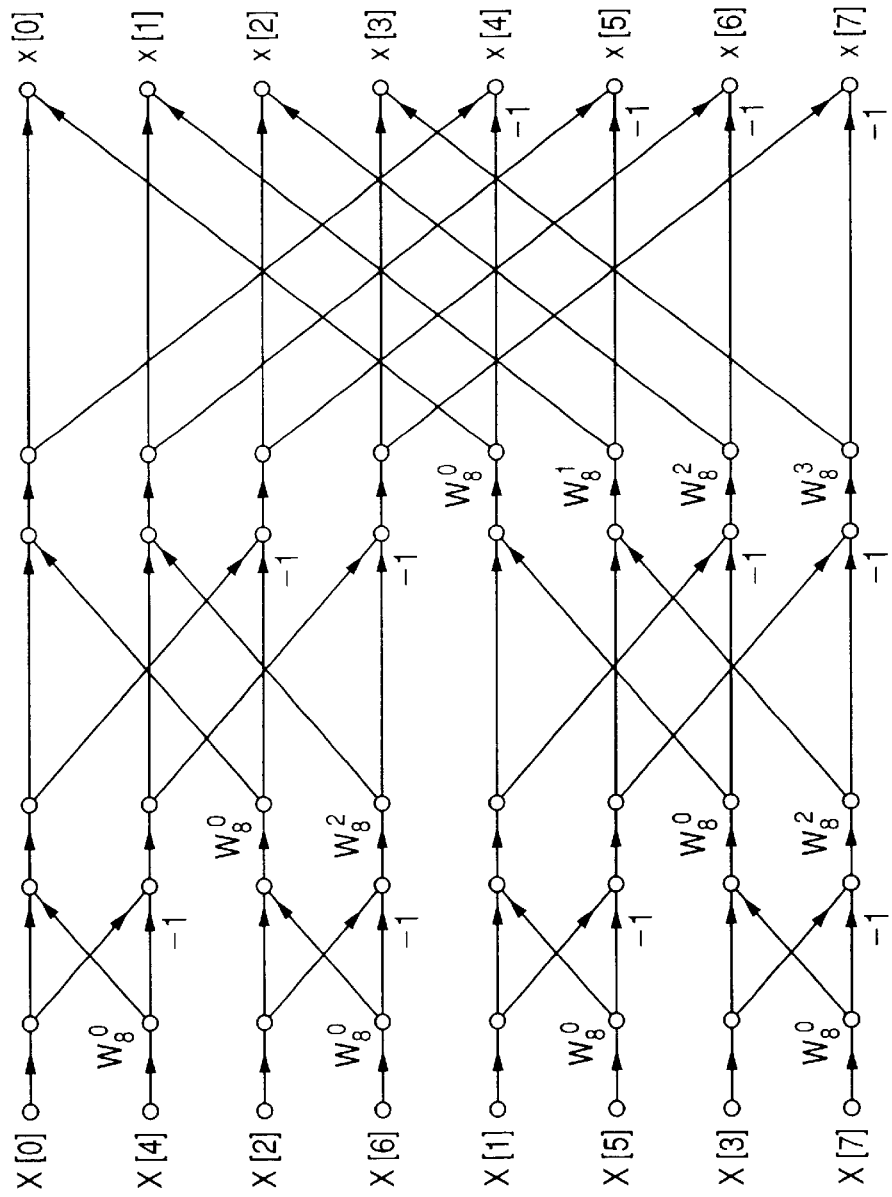
FIG. 12 is a signal flow diagram of temporally-thinned 8-point IFFT of an output-data serially-arranged type.

FIG. 12 shows a signal flow of temporally-thinned 8-point IFFT of an output-data serially-arranged type. In FIG. 12, X[0], X[4], X[2], X[6], X[1], X[5], X[3], and X[7] at the left-hand side denote terminals fed with frequency-domain input signals, and x[0], x[1], x[2], ..., and x[7] at the right-hand side denote terminals fed with time-domain output signals. In addition, the arrows indicate directions along which signals are fed. Furthermore, characters such as $W_8^0$ and $W_8^2$ near arrows indicate rotation factors. The presence of a character of a rotation factor near an arrow means that a related signal is multiplied by the rotation factor before being fed to a later stage. The absence of a character of a rotation factor from a region near an arrow means that a related signal is multiplied by "1" before being fed to a later stage, or that a related signal is fed to a later stage as it is. The presence of a numerical character "−1" near an arrow means that a related signal is multiplied by "−1" before being fed to a later stage. The absence of a numerical character "−1" from a region near an arrow means that a related signal is multiplied by "1" before being fed to a later stage, or that a related signal is fed to a later stage as it is. At each node to which two arrows are directed, related two signals are added.

Figure 13:
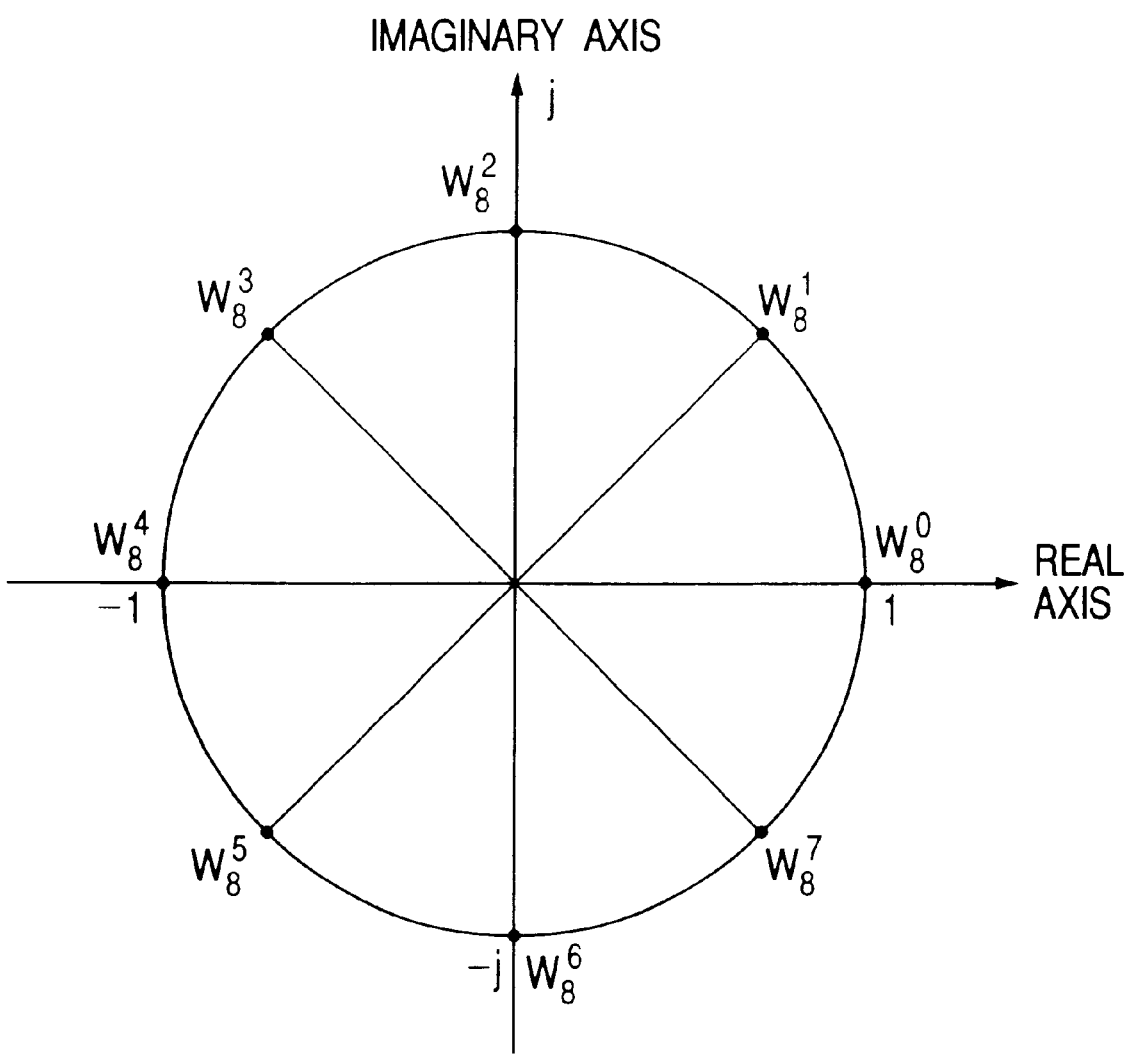
FIG. 13 is a diagram of a complex plane in which rotation factors used in 8-point IFFT are located.

Rotation factors $W_8^0$, $W_8^1$, $W_8^2$, $W_8^3$, $W_8^4$, $W_8^5$, $W_8^6$, and $W_8^7$ are used by normal 8-point IFFT. The rotation factors $W_8^0$, $W_8^1$, $W_8^2$, $W_8^3$, $W_8^4$, $W_8^5$, $W_8^6$, and $W_8^7$ take complex values shown in FIG. 13. Specifically, FIG. 13 shows that a circle having a radius of "1" exists in a complex plane defined by a real axis (an ordinate) and an imaginary axis (an abscissa). The circle intersects with the real axis at a point of "1" and a point of "−1". The intersection point of "1" corresponds to the rotation factor $W_8^0$. The intersection point of "−1" corresponds to the rotation factor $W_8^4$. The circle intersects with the imaginary axis at a point of "j" and a point of "−j", where "j" denotes an imaginary unit. The intersection point of "j" corresponds to the rotation factor $W_8^2$. The intersection point of "−j" corresponds to the rotation factor $W_8^6$. A point on the circle which is intermediate between and equidistant from the intersection point of "1" and the intersection point of "j" corresponds to the rotation factor $W_8^1$. A point on the circle which is intermediate between and equidistant from the intersection point of "j" and the intersection point of "−1" corresponds to the rotation factor $W_8^3$. A point on the circle which is intermediate between and equidistant from the intersection point of "−1" and the intersection point of "−j" corresponds to the rotation factor $W_8^5$. A point on the circle which is intermediate between and equidistant from the intersection point of "−j" and the intersection point of "1" corresponds to the rotation factor $W_8^7$. The temporally-thinned 8-point IFFT in FIG. 12 uses only the four rotation factors $W_8^0$, $W_8^1$, $W_8^2$, and $W_8^3$ among the eight rotation factors $W_8^0$, $W_8^1$, $W_8^2$, $W_8^3$, $W_8^4$, $W_8^5$, $W_8^6$, and $W_8^7$.

Figure 14:
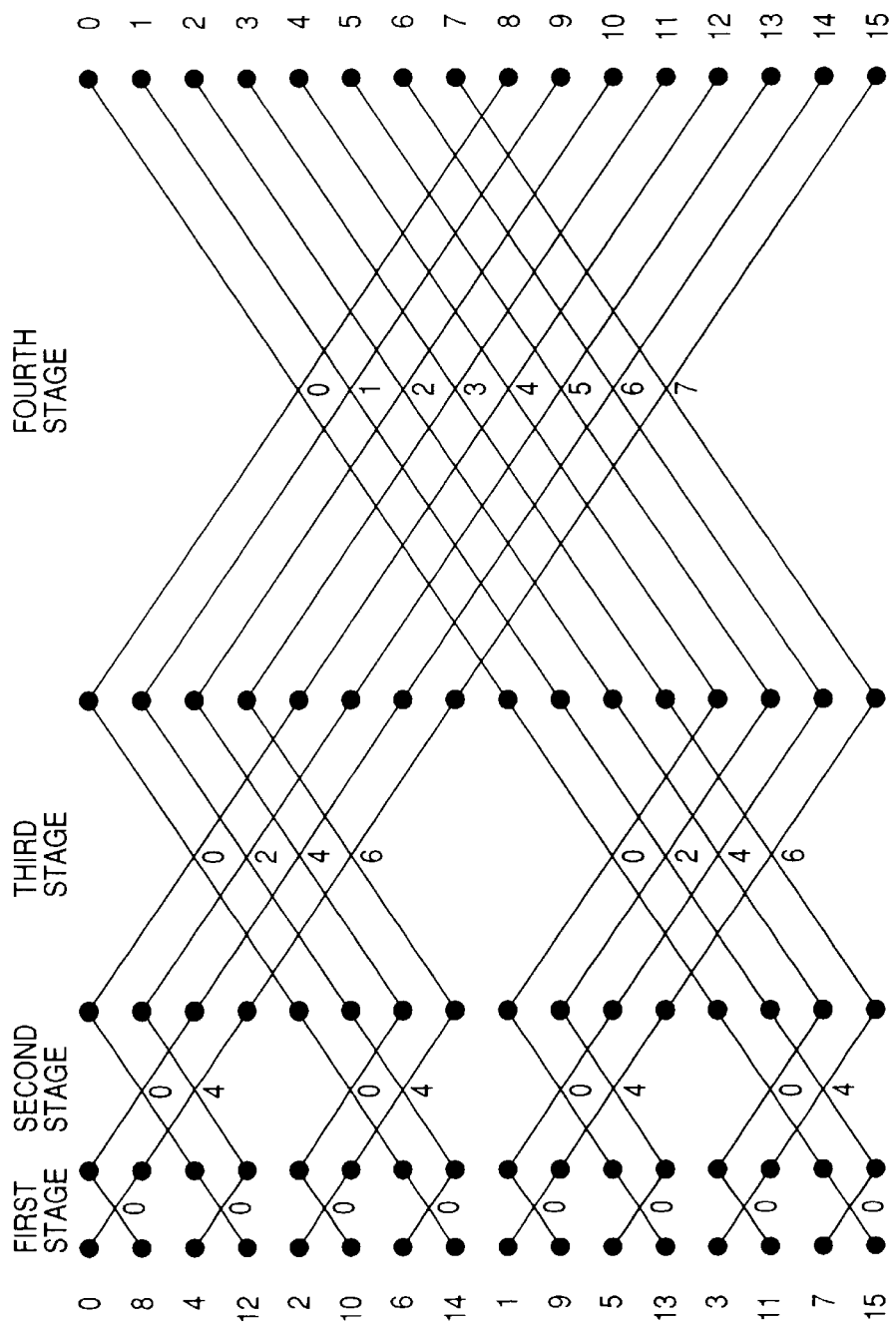
FIG. 14 is a diagram of butterfly calculations in temporally-thinned 16-point IFFT of an output-data serially-arranged type.

FIG. 14 shows butterfly calculations in specified 16-point IFFT, that is, temporally-thinned 16-point IFFT of an output-data serially-arranged type. In FIG. 14, the black circles denote signal connection points (nodes) respectively. The signal connection points (the black circles) are located at the vertices of rectangles (not shown). In each rectangle, a pair of intersecting diagonal lines join the 4 signal connection points (the black circles), and denote the execution of butterfly calculations among the 4 signal connection points. In FIG. 14, the numerals "0", "8", "4", "12", ..., and "15" at the left-hand side denote the order numbers of frequency-domain input signals while the numerals "0", "1", "2", ..., and "15" at the right-hand side denote the order numbers of time-domain output signals. In addition, the numerals located at regions near the intersection points among the diagonal lines denote the identification numbers of rotation factors. Here, eight rotation factors $W_{16}^0$, $W_{16}^1$, $W_{16}^2$, $W_{16}^3$, $W_{16}^4$, $W_{16}^5$, $W_{16}^6$, and $W_{16}^7$ are used where "0", "1", "2", ..., and "7" indicate the identification numbers.

Figures 15, 16:
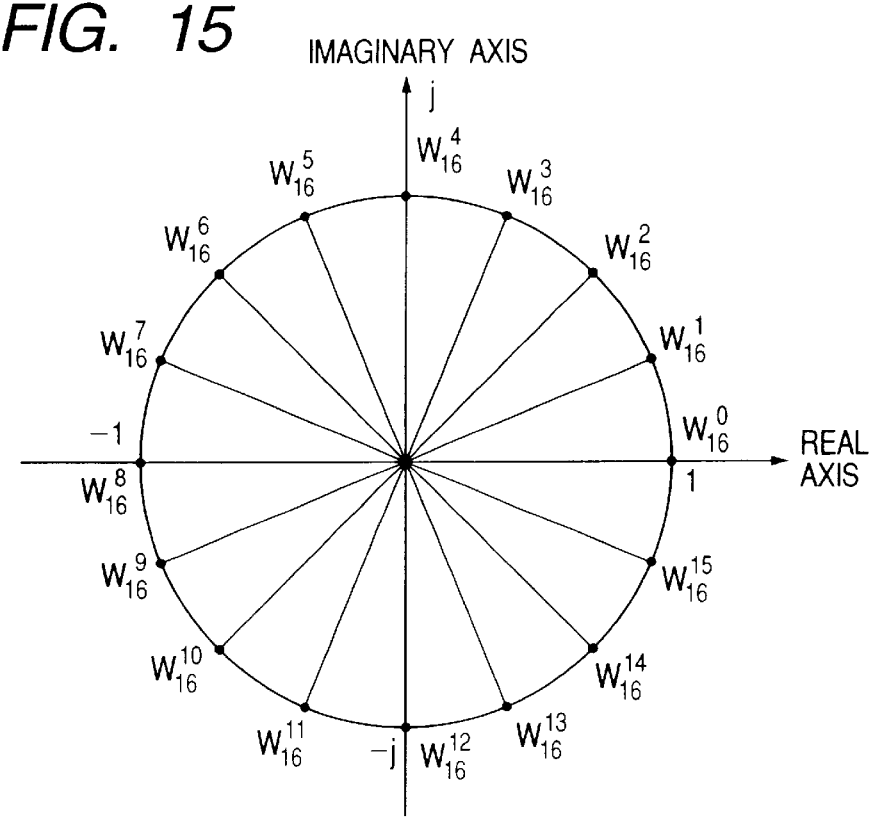
FIG. 15 is a diagram of a complex plane in which rotation factors used in 16-point IFFT are located.
FIG. 16 is a diagram of temporally-thinned 64-point IDFT of an output-data serially-arranged type.

Sixteen rotation factors $W_{16}^0$, $W_{16}^1$, $W_{16}^2$, ..., and $W_{16}^{15}$ are used by normal 16-point IFFT. The rotation factors $W_{16}^0$, $W_{16}^1$, $W_{16}^2$, ..., and $W_{16}^{15}$ take complex values shown in FIG. 15. Specifically, FIG. 15 shows that a circle having a radius of "1" exists in a complex plane defined by a real axis (an ordinate) and an imaginary axis (an abscissa). The circle intersects with the real axis at a point of "1". The intersection point of "1" corresponds to the rotation factor $W_{16}^0$. The circle is equally divided into 16 arcs. The 16 points on the circle between the arcs sequentially correspond to the rotation factors $W_{16}^0$, $W_{16}^1$, $W_{16}^2$, ..., and $W_{16}^{15}$ along the counterclockwise direction, respectively. The specified 16-point IFFT in FIG. 14 uses only the eight rotation factors $W_{16}^0$, $W_{16}^1$, $W_{16}^2$, $W_{16}^3$, $W_{16}^4$, $W_{16}^5$, $W_{16}^6$, and $W_{16}^7$ among the sixteen rotation factors $W_{16}^0$, $W_{16}^1$, $W_{16}^2$, ..., and $W_{16}^{15}$.

In the specified 16-point IFFT of FIG. 14, butterfly calculations are repetitively executed through a sequence of first, second, third, and fourth stages. Given signals in FIG. 14 are multiplied by "−1" before being fed to later stages as those in FIG. 12. Numerical characters "−1" denoting such multiplications by "−1" are omitted from FIG. 14.

FIG. 16 shows specified 64-point IFFT (IDFT), that is, temporally-thinned 64-point IFFT (IDFT) of an output-data serially-arranged type. The specified 64-point IFFT in FIG. 16 has a sequence of first, second, third, fourth, fifth, and sixth stages. The first, second, third, and fourth stages in the specified 64-point IFFT are formed by first, second, third, and fourth stages in four specified 16-point IFFT's "a", "b", "c", and "d". Thus, during the first stage to the fourth stage, the specified 64-point IFFT executes butterfly calculations corresponding to the specified 16-point IFFT's "a", "b", "c", and "d". Then, at the fifth stage, the specified 64-point IFFT executes butterfly calculations with respect to the results of calculations by the specified 16-point IFFT's "a", "b", "c", and "d". Subsequently, at the sixth stage, the specified 64-point IFFT executes butterfly calculations with respect to the results of the fifth-stage calculations.

The specified 16-point IFFT's "a", "b", "c", and "d" are implemented by the calculating sections 51a, 51b, 51c, and 51d in FIG. 5, respectively. The butterfly calculations in the fifth and sixth stages of the specified 64-point IFFT in FIG. 16 are executed by the later-stage calculating section 52 in FIG. 5.

Figure 17:
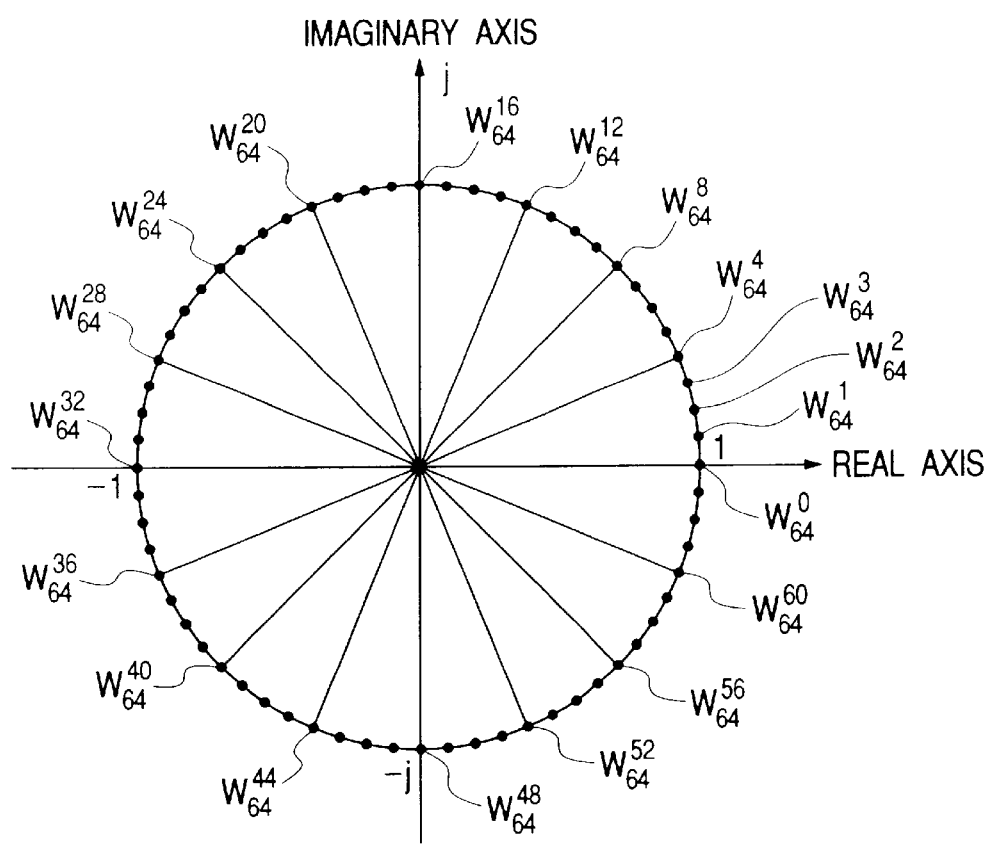
FIG. 17 is a diagram of a complex plane in which rotation factors used in 64-point IFFT are located.

Sixty-four rotation factors $W_{64}^0$, $W_{64}^1$, $W_{64}^2$, ..., and $W_{64}^{63}$ are used by normal 64-point IFFT. The rotation factors $W_{64}^0$, $W_{64}^1$, $W_{64}^2$, ..., and $W_{64}^{63}$, take complex values shown in FIG. 17. Specifically, FIG. 17 shows that a circle having a radius of "1" exists in a complex plane defined by a real axis (an ordinate) and an imaginary axis (an abscissa). The circle intersects with the real axis at a point of "1". The intersection point of "1" corresponds to the rotation factor $W_{64}^0$. The circle is equally divided into 64 arcs. The 64 points on the circle between the arcs sequentially correspond to the rotation factors $W_{64}^0$, $W_{64}^1$, $W_{64}^2$, ..., and $W_{64}^{63}$ along the counterclockwise direction, respectively. The rotation factors $W_{16}^0$, $W_{16}^1$, $W_{16}^2$, $W_{16}^3$, $W_{16}^4$, $W_{16}^5$, $W_{16}^6$, and $W_{16}^7$ used in the specified 16-point IFFT are equal to the 64-point IFFT rotation factors $W_{64}^0$, $W_{64}^4$, $W_{64}^8$, $W_{64}^{12}$, $W_{64}^{16}$, $W_{64}^{20}$, $W_{64}^{24}$, and $W_{64}^{28}$ respectively. Therefore, the 16-point IFFT rotation factors $W_{16}^0$, $W_{16}^1$, $W_{16}^2 W_{16}^3$, $W_{16}^4 W_{16}^5$, $W_{16}^6$, and $W_{16}^7$ can be used instead of the 64-point IFFT rotation factors $W_{64}^0$, $W_{64}^4$, $W_{64}^8$, $W_{64}^{12}$, $W_{64}^{16}$, $W_{64}^{20}$, $W_{64}^{24}$, and $W_{64}^{28}$ respectively.

The first stage of the specified 64-point IFFT uses the rotation factor $W_{64}^0$ having the identification number "0". The second stage of the specified 64-point IFFT uses the rotation factors $W_{64}^0$ and $W_{64}^{16}$ having the identification numbers "0" and "16". The third stage of the specified 64-point IFFT uses the rotation factors $W_{64}^0$, $W_{64}^8$, $W_{64}^{16}$, and $W_{6424}$ having the identification numbers "0", "8", "16", and "24". The fourth stage of the specified 64-point IFFT uses the rotation factors $W_{64}^0$, $W_{64}^4$, $W_{64}^8$, $W_{64}^{12}$, $W_{64}^{16}$, $W_{64}^{20}$, $W_{64}^{24}$, and $W_{64}^{28}$ having the identification numbers "0", "4", "8", "12", "16", "20", "24", and "28".

The fifth stage in FIG. 16 is divided into two portions (calculation blocks) "e" and "f" equal in design to each other. The portion "e" of the fifth stage follows the specified 16-point IFFT's "a" and "b". The portion "f" of the fifth stage follows the specified 16-point IFFT's "c" and "d". Each of the portions "e" and "f" of the fifth stage uses the rotation factors $W_{64}^0$, $W_{64}^2$, $W_{64}^4$, ..., and $W_{64}^{30}$ having the identification numbers "0", "2", "4", ..., and "30". In each of the portions "e" and "f" of the fifth stage, butterfly calculations are executed in a way similar to the previously-mentioned way.

In FIG. 16, the sixth stage has a calculation block "g" which follows the calculation blocks "e" and "f" of the fifth stage. The calculation block "g" in the sixth stage uses the rotation factors $W_{64}^0$, $W_{64}^1$, $W_{64}^2$, ..., and $W_{64}^{31}$ having the identification numbers "0", "1", "2", ..., and "31". The calculation block "g" in the sixth stage executes butterfly calculations among 32 separate data pieces in a way similar to the previously-mentioned way.

In FIG. 16, the numerals "0", "1", "2", ..., and "63" at the right-hand side denote the order numbers of terminals for time-domain output signals, respectively. Modulating signals assigned to respective orthogonal multiple carriers are fed to the first stage of the specified 64-point IFFT in FIG. 16. The time-domain output signals correspond to additions and combinations of the resultants of modulation of the orthogonal multiple carriers in accordance with the modulating signals.

The fifth stage in FIG. 16 can be selectively assigned to only one of the specified 16-point IFFT's "a", "b", "c", and "d". In this case, input signals coming from the other specified 16-point IFFT's are set to zero. The assignment of the fifth stage to the specified 16-point IFFT "a" corresponds to the channel identification number "0". The assignment of the fifth stage to the specified 16-point IFFT "b" corresponds to the channel identification number "1". The assignment of the fifth stage to the specified 16-point IFFT "c" corresponds to the channel identification number "2". The assignment of the fifth stage to the specified 16-point IFFT "d" corresponds to the channel identification number "3". In the case of the channel identification numbers "0" and "1", it is unnecessary for the block "f" of the fifth stage to execute butterfly calculations. In the case of the channel identification numbers "2" and "3", it is unnecessary for the block "e" of the fifth stage to execute butterfly calculations.

As previously mentioned, the first stage to the fourth stage in FIG. 16 correspond to the specified 16-point IFFT's "a", "b", "c", and "d". Calculations in the block "e" of the fifth stage or calculations in the block "f" thereof are omitted in accordance with the channel identification number. In each of the blocks "e" and "f" of the fifth stage, first ones of input signals for butterfly calculations are made effective while second ones thereof are set to zero. In the sixth stage, first ones of input signals for butterfly calculations are made effective while second ones thereof are set to zero. As a result, the specified 64-point IFFT in FIG. 16 generates modulation-resultant signals having 64 orthogonal multiple carriers grouped into a first set of every four carriers assigned to the first channel, a second set of every four carriers assigned to the second channel, a third set of every four carriers assigned to the third channel, and a fourth set of every four carriers assigned to the fourth channel.

In the specified 64-point IFFT of FIG. 16, modulating signals for the first channel having the identification number "0" are fed to the input terminals of the specified 16-point IFFT "a". Butterfly calculations in the first stage to the fourth stage of the specified 16-point IFFT "a" are executed with respect to the modulating signals for the first channel ("0"). Modulating signals for the second channel having the identification number "1" are fed to the input terminals of the specified 16-point IFFT "b". Butterfly calculations in the first stage to the fourth stage of the specified 16-point IFFT "b" are executed with respect to the modulating signals for the second channel ("1"). Modulating signals for the third channel having the identification number "2" are fed to the input terminals of the specified 16-point IFFT "c". Butterfly calculations in the first stage to the fourth stage of the specified 16-point IFFT "c" are executed with respect to the modulating signals for the third channel ("2"). Modulating signals for the fourth channel having the identification number "3" are fed to the input terminals of the specified 16-point IFFT "d". Butterfly calculations in the first stage to the fourth stage of the specified 16-point IFFT "d" are executed with respect to the modulating signals for the fourth channel ("3"). Thus, the specified 16-point IFFT's "a", "b", "c", and "d" are independent of each other. Time-domain output signals which appear at the output terminals of the sixth stage correspond to additions and combinations of the resultants of modulation of the orthogonal multiple carriers in accordance with the modulating signals.

FIG. 18 shows the assignment of the 64 orthogonal multiple carriers to the first, second, third, and fourth channels. Carriers "0", "32", "16", "48", "8", "40", "24", "56", "4", "36", "20", "52", "12", "44", "28", and "60" (identification numbers or order numbers) are assigned to the first channel having the identification number "0". Carriers "2", "34", "18", "50", "10", "42", "26", "58", "6", "38", "22", "54", "14", "46", "30", and "62" (identification numbers or order numbers) are assigned to the second channel having the identification number "1". Carriers "1", "33", "17", "49", "9", "41", "25", "57", "5", "37", "21", "53", "13", "45", "29", and "61" (identification numbers or order numbers) are assigned to the third channel having the identification number "2". Carriers "3", "35", "19", "51", "11", "43", "27", "59", "7", "39", "23", "55", "15", "47", "31", and "63" (identification numbers or order numbers) are assigned to the fourth channel having the identification number "3". The order of the carriers in FIG. 18 agrees with the bit reverse order. The channel assignment of the carriers in FIG. 18 is equal to that in FIG. 8 although the order of the carriers in each channel group in FIG. 18 differs from that in FIG. 8.

As previously mentioned, the first, second, third, and fourth stages of the 64-point IFFT are replaced by the first, second, third, and fourth stages of the IFFT's (the 16-point IFFT's) having points less than 64. Therefore, in the case where the calculating sections 51a, 51b, 51c, 51d, and the later-stage calculating section 52 (see FIG. 5) include a common LSI, the scale of the LSI can be relatively small. In the case where the calculating sections 51a, 51b, 51c, 51d, and the later-stage calculating section 52 (see FIG. 5) include a DSP, the number of calculation steps can be relatively small.

Second Embodiment

A second embodiment of this invention is similar to the first embodiment thereof except that the calculating sections 51a, 51b, 51c, and 51d, and the later-stage calculating section 52 (see FIG. 5) are modified to implement IFFT different from the IFFT in the first embodiment.

FIG. 19 shows frequency-thinned 64-point IFFT (IDFT) of an output-data serially-arranged type in the second embodiment of this invention. The frequency-thinned 64-point IFFT in FIG. 19 has a sequence of first, second, third, fourth, fifth, and sixth stages. The first, second, third, and fourth stages have four calculation blocks "p", "q", "r", and "s" which are equal in design (calculation way) to each other. The calculation blocks "p", "q", "r", and "s" are different from each other in data pieces inputted thereinto, rotation factors used thereby, and carrier identification numbers assigned thereto.

Specifically, carriers "0", "32", "16", "48", "8", "40", "24", "56", "4", "36", "20", "52", "12", "44", "28", and "60" (identification numbers or order numbers) are assigned to the first channel having the identification number "0". Modulating signals for the first channel ("0") are fed to the calculation block "p". Carriers "2", "34", "18", "50", "10", "42", "26", "58", "6", "38", "22", "54", "14", "46", "30", and "62" (identification numbers or order numbers) are assigned to the second channel having the identification number "1". Modulating signals for the second channel ("1") are fed to the calculation block "q". Carriers "1", "33", "17", "49", "9", "41", "25", "57", "5", "37", "21", "53", "13", "45", "29", and "61" (identification numbers or order numbers) are assigned to the third channel having the identification number "2". Modulating signals for the third channel ("2") are fed to the calculation block "r". Carriers "3", "35", "19", "51", "11", "43", "27", "59", "7", "39", "23", "55", "15", "47", "31", and "63" (identification numbers or order numbers) are assigned to the fourth channel having the identification number "3". Modulating signals for the fourth channel ("3") are fed to the calculation block "s".

Figure 20:
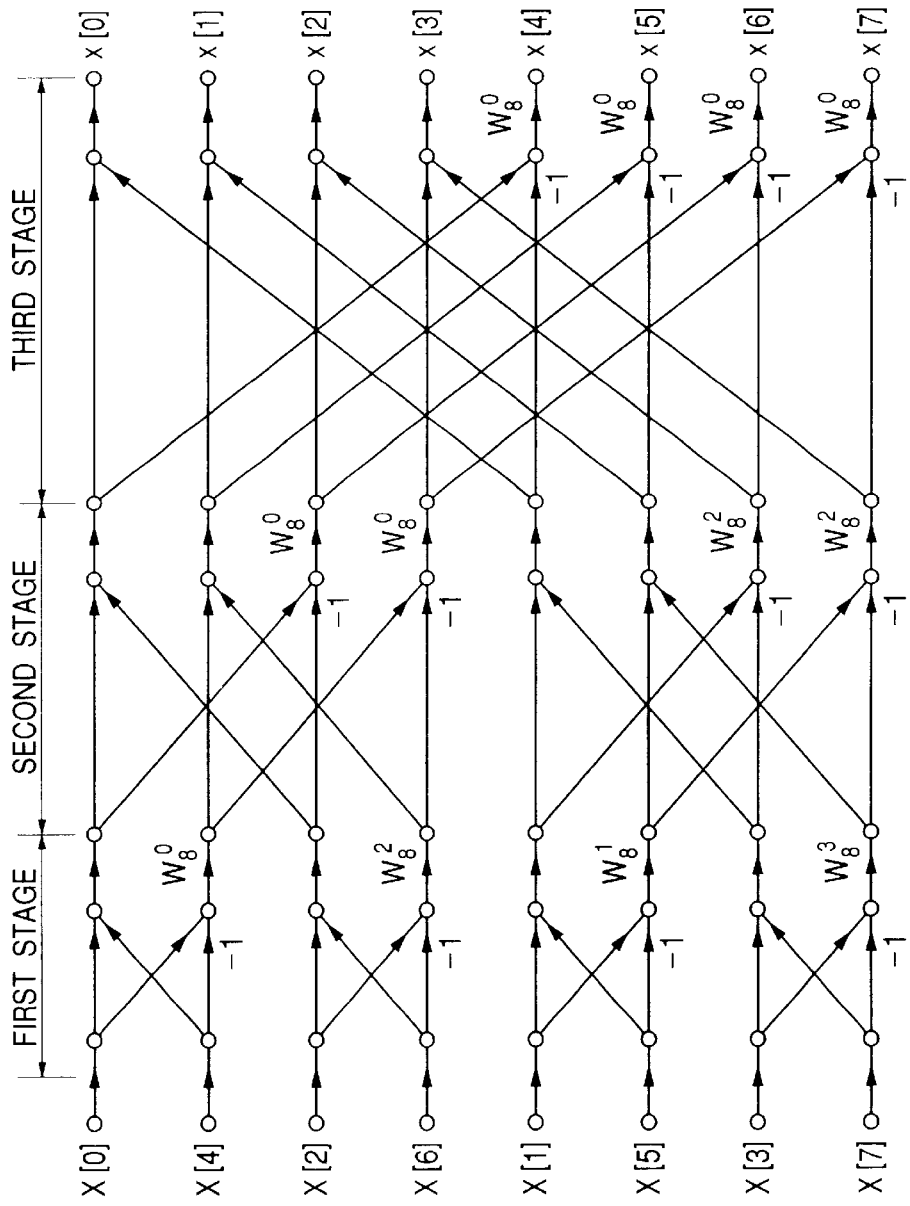
FIG. 20 is a signal flow diagram of frequency-thinned 8-point IDFT of an output-data serially-arranged type.

FIG. 20 shows a signal flow of frequency-thinned 8-point IFFT (IDFT) of an output-data serially-arranged type which can be a base of segments of the frequency-thinned 64-point IFFT in FIG. 19. In FIG. 20, X[0], X[4], X[2], X[6], X[1], X[5], X[3], and X[7] at the left-hand side denote terminals fed with frequency-domain input signals, and x[0], x[1], x[2], ..., and x[7] at the right-hand side denote terminals fed with time-domain output signals. In addition, the arrows indicate directions along which signals are fed. Furthermore, characters such as $W_8^0$ and $W_8^2$ near arrows indicate rotation factors. The presence of a character of a rotation factor near an arrow means that a related signal is multiplied by the rotation factor before being fed to a later stage. The absence of a character of a rotation factor from a region near an arrow means that a related signal is multiplied by "1" before being fed to a later stage, or that a related signal is fed to a later stage as it is. The presence of a numerical character "−1" near an arrow means that a related signal is multiplied by "−1" before being fed to a later stage. The absence of a numerical character "−1" from a region near an arrow means that a related signal is multiplied by "1" before being fed to a later stage, or that a related signal is fed to a later stage as it is. At each node to which two arrows are directed, related two signals are added. The frequency-thinned 8-point IFFT in FIG. 20 uses only the four rotation factors $W_8^0$, $W_8^1$, $W_8^2$, and $W_8^3$ among the eight rotation factors $W_8^0$, $W_8^1 W_8^2$, $W_8^3$, $W_8^4$, $W_8^5$, $W_8^6$, and $W_8^7$ of FIG. 13.

The calculation blocks "p", "q", "r", and "s" in FIG. 19 execute butterfly calculations while using different sets of rotation factors. Specifically, the calculation block "p" uses the 64-point IFFT rotation factors $W_{64}^0$, $W_{64}^{16}$, $W_{64}^8$, $W_{64}^{24}$, $W_{64}^4$, $W_{64}^{20}$, $W_4^{12}$, and $W_4^{28}$ of FIG. 17. The calculation block "q" uses the 64-point IFFT rotation factors $W_{64}^2$, $W_{64}^{18}$, $W_{64}^{10}$, $W_{64}^{26}$, $W_{64}^6$, $W_{64}^{22}$, $W_{64}^{14}$, and $W_{64}^{30}$ of FIG. 17. The calculation block "r" uses the 64-point IFFT rotation factors $W_{64}^1$, $W_{64}^{17}$, $W_{64}^9$, $W_{64}^{25}$, $W_{64}^5$, $W_{64}^{21}$, $W_{64}^{13}$, and $W_{64}^{29}$ of FIG. 17. The calculation block "s" uses the 64-point IFFT rotation factors $W_{64}^3$, $W_{64}^{19}$, $W_{64}^{11}$, $W_{64}^{27}$, $W_{64}^7$, $W_{23}^5$, $W_{64}^{15}$, and $W_{64}^{31}$ of FIG. 17.

Figure 21:
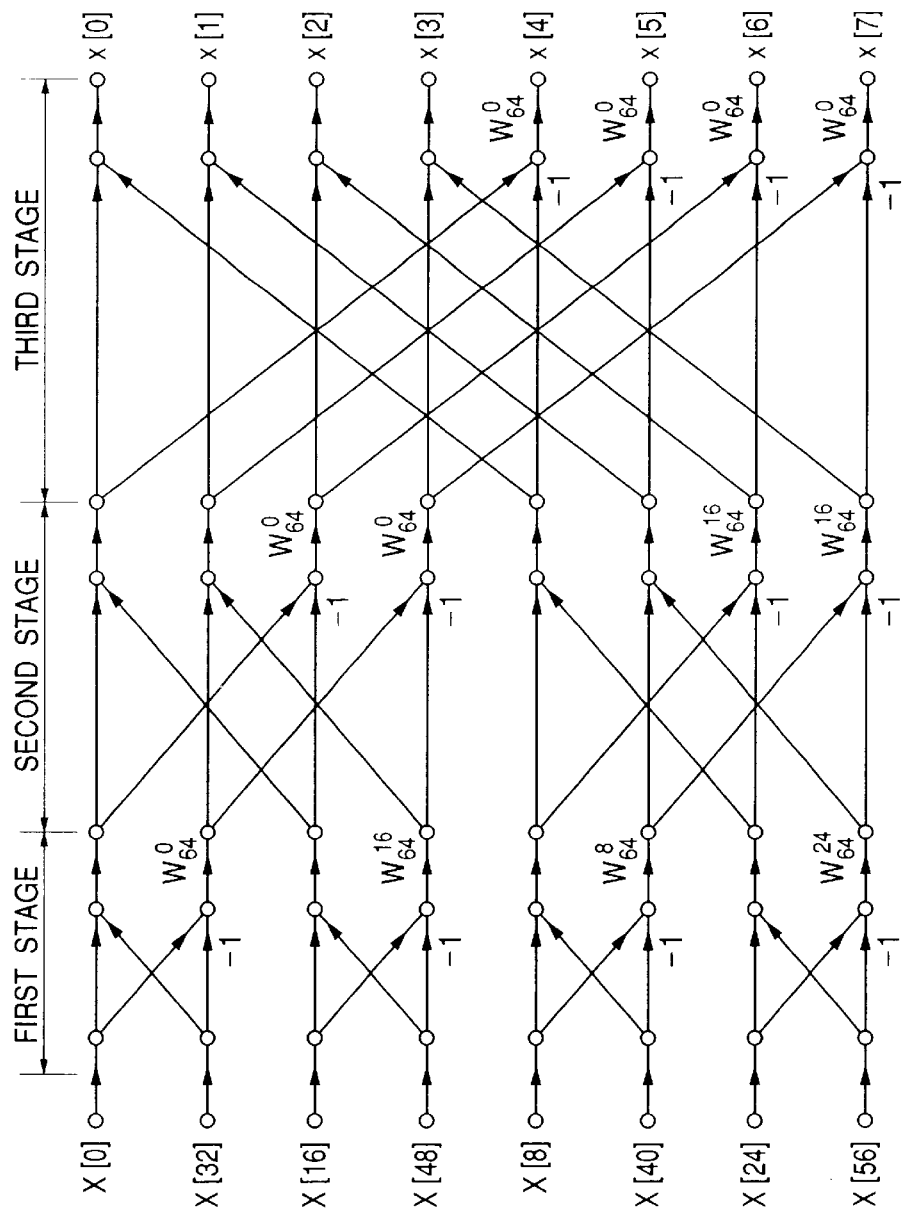
FIG. 21 is a signal flow diagram of a portion of the frequency-thinned 8-point IDFT of an output-data serially-arranged type.

Modulating signals for carriers "0", "32", "16", "48", "8", "40", "24", "56", "4", "36", "20", "52", "12", "44", "28", and "60" are fed to the calculation block "p". FIG. 21 shows a signal flow of the first, second, and third stages in a portion of the calculation block "p" which corresponds to 8 input signals. With reference to FIG. 21, modulating signals for carriers "0", "32", "16", "48", "8", "40", "24", and "56" are fed to the first stage in the portion of the calculation block "p". Butterfly calculations are executed in the first, second, and third stages in the portion of the calculation block "p" for the carriers "0", "32", "16", "48", "8", "40", "24", and "56". In the calculation block "p", butterfly calculations for the carriers "4", "36", "20", "52", "12", "44", "28", and "60" are similar to those for the carriers "0", "32", "16", "48", "8", "40", "24", and "56".

Butterfly calculations executed in the calculation blocks "p", "q", "r", and "s" are similar to each other except that different sets of rotation factors are used. It is preferable to provide a memory storing information representative of a table of the rotation factors used by the calculation blocks "p", "q", "r", and "s". In this case, the calculation blocks "p", "q", "r", and "s" execute the butterfly calculations while referring to the table and getting the rotation factors therefrom. Thus, in this case, the execution of the butterfly calculations is relatively easy.

As in the first embodiment of this invention, specified 16-point IFFT's can be used for the butterfly calculations by the calculation blocks "p", "q", "r", and "s". In this case, it is possible to provide a reduced amount of the butterfly calculations. For the first channel having the identification number "0", only the butterfly calculations in the calculation block "p" is executed. For the second channel having the identification number "1", only the butterfly calculations in the calculation block "q" is executed. For the third channel having the identification number "2", only the butterfly calculations in the calculation block "r" is executed. For the fourth channel having the identification number "3", only the butterfly calculations in the calculation block "s" is executed.

In the frequency-thinned 64-point IFFT of FIG. 19, the fifth stage has calculation blocks "t" and "u". The calculation block "t" follows the calculation blocks "p" and "q". The calculation block "u" follows the calculation blocks "r" and "s". The calculation blocks "t" and "u" are similar in design to each other except that used rotation factors are different. The calculation block "t" uses the rotation factor $W_{64}^0$ having the identification number "0". The calculation block "u" uses the rotation factor $W_{64}^{16}$ having the identification number "16". In each of the calculation blocks "t" and "u", butterfly calculations are executed among 16 separate data pieces. In the frequency-thinned 64-point IFFT of FIG. 19, the sixth stage has a calculation block "v". The calculation block "v" executes butterfly calculations among 32 separate data pieces while using the rotation factor $W_{64}^0$ having the identification number "0". The results of the butterfly calculations by the calculation block "v" are time-domain data pieces x[0], x[1], x[2], ..., and x[63]. The frequency-thinned 64-point IFFT of FIG. 19 outputs the time-domain data pieces x[0], x[1], x[2], ..., and x[63].

At a timing between the fourth stage and the fifth stage, a decision can be made as to which of the four channels is currently processed and selected. When the calculation block "p" is active and the other calculation blocks "q", "r", and "s" are null, the first channel having the identification number "0" is selected. When the calculation block "q" is active and the other calculation blocks "p", "r", and "s" are null, the second channel having the identification number "1" is selected. When the calculation block "r" is active and the other calculation blocks "p", "q", and "s" are null, the third channel having the identification number "2" is selected. When the calculation block "s" is active and the other calculation blocks "p", "q", and "r" are null, the fourth channel having the identification number "3" is selected. In the case where the channel having the identification number "0" or "1" is selected, it is unnecessary for the calculation block "u" to execute butterfly calculations. In the case where the channel having the identification number "2" or "3" is selected, it is unnecessary for the calculation block "t" to execute butterfly calculations.

FIG. 22 shows a unit of butterfly calculations in frequency-thinned IFFT. With reference to FIG. 22, frequency-domain input signals "X" and "Y" are expressed by complex numbers as "X=Re1+jIm1" and "Y=Re2+jIm2". Butterfly calculations between the frequency-domain input signals "X" and "Y" in response to a rotation factor W generate time-domain output signals "x=(Re1+Re2)+j(Im1+Im2)" and "y={(Re1−Re2)+j(Im1−Im2)}·W".

The results of the butterfly calculations in the fourth stage of the frequency-thinned 64-point IFFT in FIG. 19 are expressed by a time-domain data-piece sequence "Z={z1, z2, z3, z4, ..., z15}". The fifth and sixth stages of the frequency-thinned 64-point IFFT in FIG. 19 use the rotation factors $W_{64}^0$ and $W_{6416}$ which are equal to "1" and "j" respectively. Accordingly, the results of the butterfly calculations in the fifth and sixth stages are given as follows.

For the first channel having the identification number "0", the calculation results are "Z, Z, Z, Z", and are thus given as:

{z1, z2, ..., z15, z1, z2, ..., z15, z1, z, ..., z15, z1, z2, ..., z15}

For the second channel having the identification number "1", the calculation results are "Z, −Z, Z, −Z", and are thus given as:

{z1, z2, . . . , z15, −z1, −z2, . . . , −z15, z1, z2, . . . , z15, −z1, −z2, . . . , −z15}

For the third channel having the identification number "2", the calculation results are "Z, jZ, −Z, −jZ", and are thus given as:

{z1, z2, . . . , z15, j·z1, j·z2, . . . , j·z15, −z1, −z2, . . . , −z15, −j·z1, −j·z2, . . . , −j·z15}

For the fourth channel having the identification number "3", the calculation results are "Z, −jZ, −Z, jZ", and are thus given as:

{z, z2, . . . , z15, −j·z1, −j·z2, . . . , −j·z15, −z1, −z2, . . . , −z15, j·z1, j·z2, . . . , j·z15}

As previously mentioned, the first stage to the fourth stage in the frequency-thinned 64-point IFFT of FIG. 19 correspond to the specified 16-point IFFT's. The fifth and sixth stages execute partially-omitted 64-point IFFT. As a result, the frequency-thinned 64-point IFFT in FIG. 19 generates modulation-resultant signals having 64 orthogonal multiple carriers grouped into a first set of every four carriers assigned to the first channel, a second set of every four carriers assigned to the second channel, a third set of every four carriers assigned to the third channel, and a fourth set of every four carriers assigned to the fourth channel.

Third Embodiment

A third embodiment of this invention is similar to the first embodiment thereof except that the calculating sections 51a, 51b, 51c, and 51d, and the later-stage calculating section 52 (see FIG. 5) are modified to implement IFFT different from the IFFT in the first embodiment.

Figure 23:
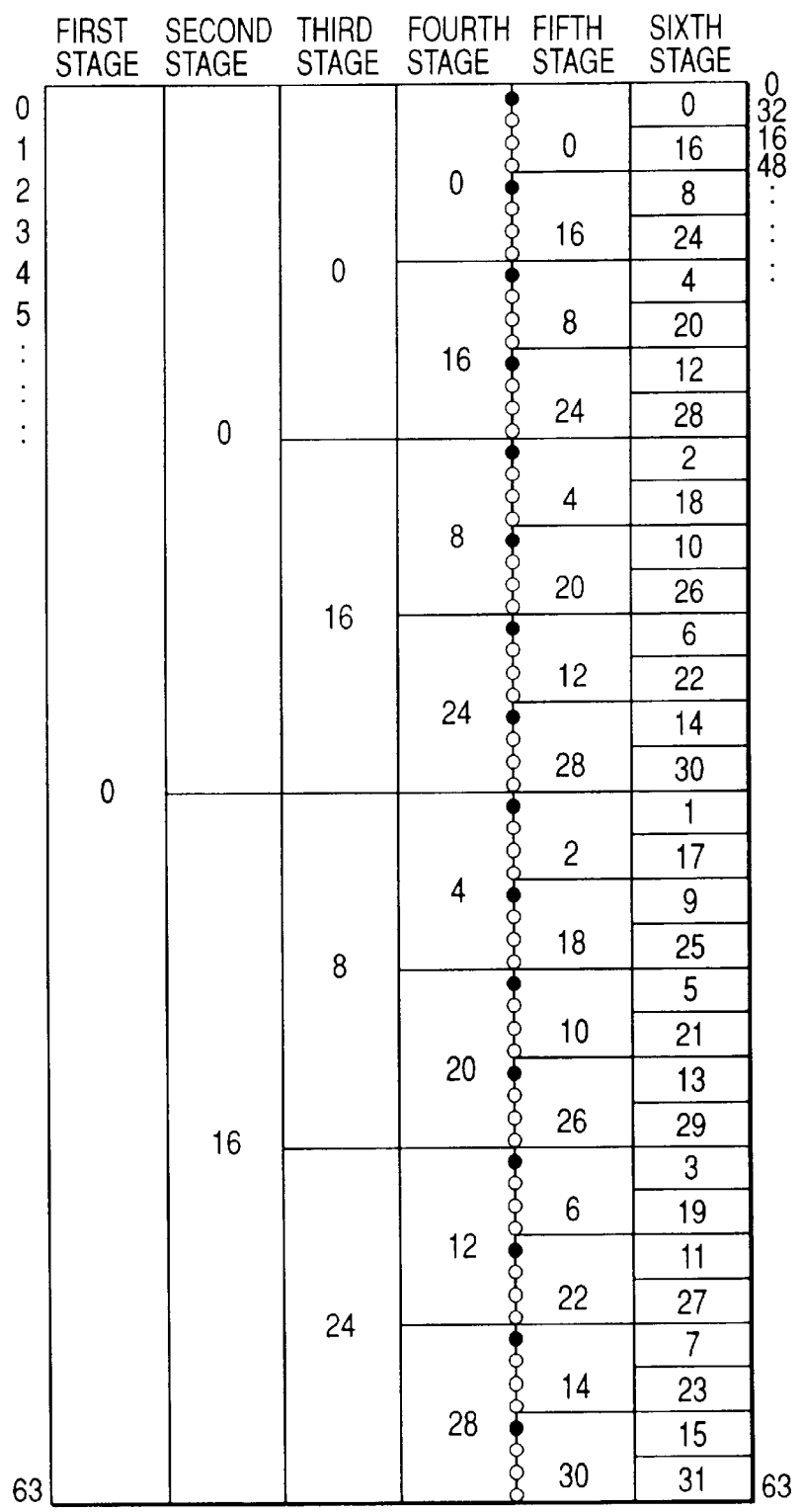
FIG. 23 is a diagram of temporally-thinned 64-point IDFT of an input-data serially-arranged type in a third embodiment of this invention.

FIG. 23 shows temporally-thinned 64-point IFFT (IDFT) of an input-data serially-arranged type in the third embodiment of this invention. The temporally-thinned 64-point IFFT in FIG. 23 has a sequence of first, second, third, fourth, fifth, and sixth stages. The first stage executes butterfly calculations between data pieces in pairs. In each pair, data pieces are separated by distances corresponding to 32 points equal to a half of the total point number (64). As the stage moves from the second one to the sixth one, butterfly calculations are executed among data pieces at positions closer to each other.

The temporally-thinned 64-point IFFT in FIG. 23 uses rotation factors as follows. The first stage uses the rotation factor $W_{64}^0$ having the identification number "0". The second stage uses the rotation factors $W_{64}^0$ and $W_{64}^{16}$ having the identification numbers "0" and "16". The third stage uses the rotation factors $W_{64}^0$, $W_{64}^8$, $W_{64}^{16}$, and $W_{64}^{24}$ having the identification numbers "0", "8", "16", and "24". The fourth stage uses the rotation factors $W_{64}^0$, $W_{64}^4$, $W_{64}^8$, $W_{64}^{12}$, $W_{64}^{16}$, $W_{64}^{20}$, $W_{64}^{24}$, and $W_{64}^{28}$ having the identification numbers "0", "4", "8", "12", "16", "20", "24", and "28". The fifth stage uses the rotation factors $W_{64}^0$, $W_{64}^2$, $W_{64}^4$, $W_{64}^6$, $W_{64}^8$, $W_{64}^{10}$, $W_{64}^{12}$, $W_{64}^{14}$, $W_{64}^{16}$, $W_{64}^{18}$, $W_{64}^{20}$, $W_{64}^{22}$, $W_{64}^{24}$, $W_{64}^{26}$, $W_{64}^{28}$, and $W_{64}^{30}$ having the identification numbers "0", "2", "4", "6", "8", "10", "12", "14", "16", "18", "20", "22", "24", "26", "28", and "30". The sixth stage uses the rotation factors $W_{64}^0$, $W_{64}^1$, $W_{64}^2$, . . . , and $W_{64}^{31}$ having the identification numbers "0", "1", "2", . . . , and "31".

Figure 24:
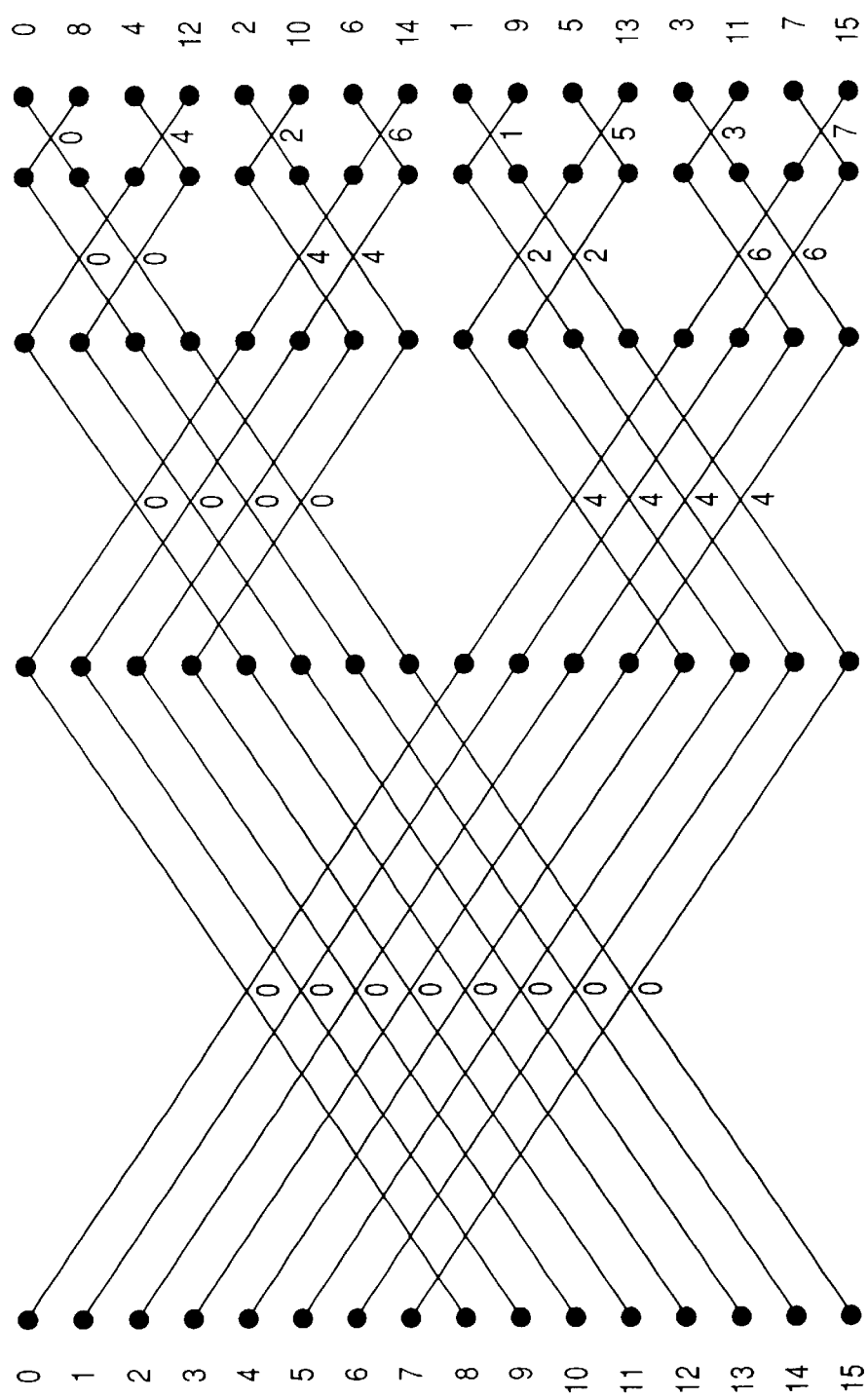
FIG. 24 is a diagram of butterfly calculations in temporally-thinned 16-point IFFT of an input-data serially-arranged type.

FIG. 24 shows butterfly calculations in temporally-thinned 16-point IFFT of an input-data serially-arranged type. In FIG. 24, the black circles denote signal connection points (nodes) respectively. The signal connection points (the black circles) are located at the vertices of rectangles (not shown). In each rectangle, a pair of intersecting diagonal lines join the 4 signal connection points (the black circles), and denote the execution of butterfly calculations among the 4 signal connection points. In FIG. 24, the numerals "0", "1", "2", "3", . . . , and "15" at the left-hand side denote the order numbers of frequency-domain input signals while the numerals "0", "8", "4", . . . , and "15" at the right-hand side denote the order numbers of time-domain output signals. In addition, the numerals located at regions near the intersection points among the diagonal lines denote the identification numbers of rotation factors. Here, the eight rotation factors $W_{16}^0$, $W_{16}^1$, $W_{16}^2$, $W_{16}^3$, $W_{16}^4$, $W_{16}^5$, $W_{16}^6$, and $W_{16}^7$ are used where "0", "1", "2", . . . , and "7" indicate the identification numbers.

The temporally-thinned 16-point IFFT in FIG. 24 repetitively executes butterfly calculations. The temporally-thinned 16-point IFFT in FIG. 24 is divided into four columnar unit calculation blocks referred to as first, second, third, and fourth stages respectively.

Figure 25:
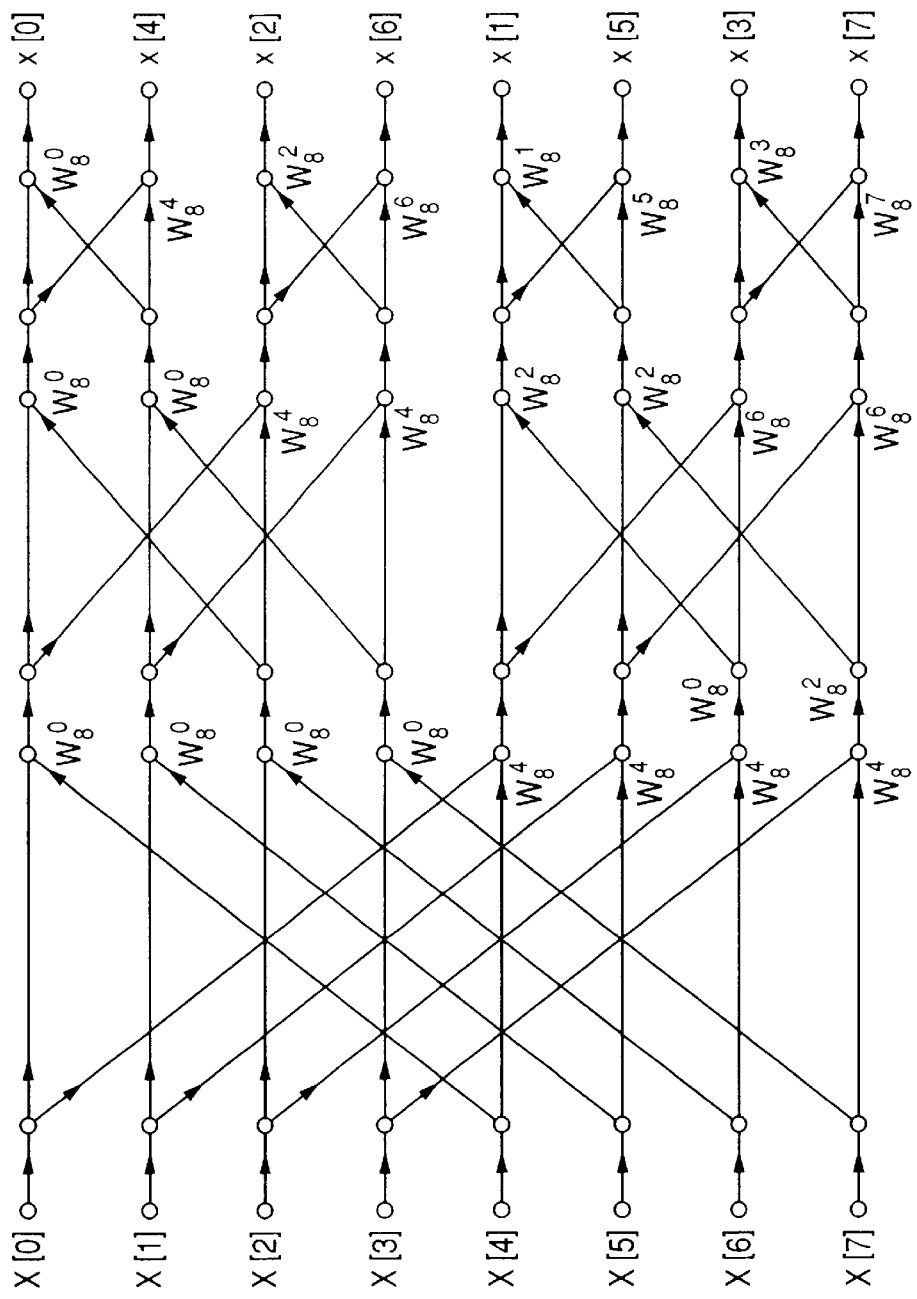
FIG. 25 is a signal flow diagram of temporally-thinned 8-point IFFT of an input-data serially-arranged type.

FIG. 25 shows a signal flow of temporally-thinned 8-point IFFT of an input-data serially-arranged type which can be a base of segments of the temporally-thinned 64-point IFFT in FIG. 23. In FIG. 25, X[0], X[1], X[2], . . . , and X[7] at the left-hand side denote terminals fed with frequency-domain input signals, and x[0], x[4], x[2], x[6], x[1], x[5], x[3], and x[7] at the right-hand side denote terminals fed with time-domain output signals. In addition, the arrows indicate directions along which signals are fed. Furthermore, characters such as $W_8^0$ and $W_8^2$ near arrows indicate rotation factors. The presence of a character of a rotation factor near an arrow means that a related signal is multiplied by the rotation factor before being fed to a later stage. The absence of a character of a rotation factor from a region near an arrow means that a related signal is multiplied by "1" before being fed to a later stage, or that a related signal is fed to a later stage as it is. At each node to which two arrows are directed, related two signals are added. The temporally-thinned 8-point IFFT in FIG. 25 uses the eight rotation factors $W_8^0$, $W_8^1$, $W_8^2$, $W_8^3$, $W_8^4$, $W_8^5$, $W_8^6$, and $W_8^7$ of FIG. 13.

Multiple carriers "0", "4", "8", . . . , and "60" are assigned to the first channel (the channel having the identification number "0"). In the case where the generation of the first-channel multiple carriers is required, information pieces to be transmitted are applied to input terminals of the temporally-thinned 64-point IFFT which correspond to the carrier identification numbers "0", "4", "8", . . . , and "60" while zero signals (null signals) are applied to the other input terminals. Then, the temporally-thinned 64-point IFFT executes butterfly calculations in the first stage to the sixth stage. Multiple carriers "2", "6", "10", . . . , and "62" are assigned to the second channel (the channel having the identification number "1"). In the case where the generation of the second-channel multiple carriers is required, information pieces to be transmitted are applied to input terminals of the temporally-thinned 64-point IFFT which correspond to the carrier identification numbers "2", "6", "10", . . . , and "62" while zero signals (null signals) are applied to the other input terminals. Then, the temporally-thinned 64-point IFFT executes butterfly calculations in the first stage to the sixth stage. Multiple carriers "1", "5", "9", . . . , and "61" are assigned to the third channel (the channel having the identification number "2"). In the case where the generation of the third-channel multiple carriers is required, information pieces to be transmitted are applied to input terminals of the temporally-thinned 64-point IFFT which correspond to the carrier identification numbers "1", "5", "9", ..., and "61" while zero signals (null signals) are applied to the other input terminals. Then, the temporally-thinned 64-point IFFT executes butterfly calculations in the first stage to the sixth stage. Multiple carriers "3", "7", "11", ..., and "63" are assigned to the fourth channel (the channel having the identification number "3"). In the case where the generation of the fourth-channel multiple carriers is required, information pieces to be transmitted are applied to input terminals of the temporally-thinned 64-point IFFT which correspond to the carrier identification numbers "3", "7", "11", ..., and "63" while zero signals (null signals) are applied to the other input terminals. Then, the temporally-thinned 64-point IFFT executes butterfly calculations in the first stage to the sixth stage.

The butterfly calculations in the first, second, third, and fourth stages of the temporally-thinned 64-point IFFT in FIG. 23 are equivalent to the butterfly calculations in the first, second, third and fourth stages of the temporally-thinned 16-point IFFT in FIG. 24. Therefore, the butterfly calculations in the first, second, third, and fourth stages of the temporally-thinned 64-point IFFT can be replaced by the butterfly calculations in the first, second, third and fourth stages of the temporally-thinned 16-point IFFT.

In FIG. 23, there are 64 circles at the boundary between the fourth stage and the fifth stage of the temporally-thinned 64-point IFFT. The 64 circles denote signal connection points (nodes). The 16 circles among the 64 circles are black. The 16 black circles indicate the assignment of fourth-stage output signals to the fifth stage for the first channel (the channel having the identification number "0").

In the case where the butterfly calculations in the first, second, third, and fourth stages of the temporally-thinned 64-point IFFT are replaced by the butterfly calculations in the first, second, third and fourth stages of the temporally-thinned 16-point IFFT, there are 16 signals outputted from the fourth stage for each of the four channels. The used channel is decided and selected from among the four channels according to the assignment of the fourth-stage output signals to the fifth stage.

The 64 signal connection points (nodes) at the boundary between the fourth stage and the fifth stage in FIG. 23 are serially numbered from above as "0", "1", "2", ..., and "63". For the first channel (the channel having the identification number "0"), the fourth-stage output signals are fed to the fifth stage through the signal connection points "0", "4", "8", "12", ..., and "60". For the second channel (the channel having the identification number "1"), the fourth-stage output signals are fed to the fifth stage through the signal connection points "2", "6", "10", "14", ..., and "62". For the third channel (the channel having the identification number "2"), the fourth-stage output signals are fed to the fifth stage through the signal connection points "1", "5", "9", "13", ..., and "61". For the fourth channel (the channel having the identification number "3"), the fourth-stage output signals are fed to the fifth stage through the signal connection points "3", "7", "11", "15", ..., and "63".

With reference to FIG. 23, in the case where only information pieces in one of the four channels are fed to the first stage, the fifth stage receives 16 effective data pieces and 48 null data pieces from the fourth stage. Accordingly, the IFFT calculations in the fifth stage can be partially omitted as the number of the channels used for data transmission is decreased from four. In the case of the transmission of information pieces in only one channel, the fifth stage generates 32 output data pieces from only 16 input data pieces. Specifically, in the fifth stage, first ones of input signals for butterfly calculations are made effective while second ones thereof are set to zero. The sixth stage receives 32 effective data pieces and 32 null data pieces from the fifth stage. Accordingly, the IFFT calculations in the sixth stage can be partially omitted.

Fourth Embodiment

A fourth embodiment of this invention is similar to the first embodiment thereof except that the calculating sections 51a, 51b, 51c, and 51d, and the later-stage calculating section 52 (see FIG. 5) are modified to implement IFFT different from the IFFT in the first embodiment.

FIG. 26 shows frequency-thinned 64-point IFFT (IDFT) of an input-data serially-arranged type in the fourth embodiment of this invention. The frequency-thinned 64-point IFFT in FIG. 26 has a sequence of first, second, third, fourth, fifth, and sixth stages. The first stage executes butterfly calculations between data pieces in pairs. In each pair, data pieces are separated by distances corresponding to 32 points equal to a half of the total point number (64). As the stage moves from the second one to the sixth one, butterfly calculations are executed among data pieces at positions closer to each other.

The frequency-thinned 64-point IFFT in FIG. 26 uses rotation factors as follows. The first stage uses the rotation factors $W_{64}^0$, $W_{64}^1$, $W_{64}^2$, ..., and $W_{64}^{31}$ having the identification numbers "0", "1", "2", ..., and "31". The second stage uses the rotation factors $W_{64}^0$, $W_{64}^2$, $W_{64}^4$, $W_{64}^6$, $W_{64}^8$, $W_{64}^{10}$, $W_{64}^{12}$, $W_{6416}$, $W_{64}^{18}$, $W_{64}^{20}$, $W_{64}^{22}$, $W_{64}^{24}$, $W_{64}^{28}$ and $W_{64}^{30}$ having the identification numbers "0", "2", "4", "6", "8", "10", "12", "14", "16", "18", "20", "22", "24", "26", "28", and "30". The third stage uses the rotation factors $W_{64}^0$, $W_{64}^4$, $W_{64}^8$, $W_{64}^{12}$, $W_{64}^{16}$, $W_{64}^{20}$, $W_{64}^{24}$, and $W_{64}^{28}$ having the identification numbers "0", "4", "8", "12", "16", "20", "24", and "28". The fourth stage uses the rotation factors $W_{64}^0$, $W_{64}^8$, $W_{64}^{16}$ and $W_{64}^{24}$ having the identification numbers "0", "8", "16", and "24". The fifth stage uses the rotation factors $W_{64}^0$ and $W_{64}^{16}$ having the identification numbers "0" and "16". The sixth stage uses the rotation factor $W_{64}^0$ having the identification number "0".

Figure 27:
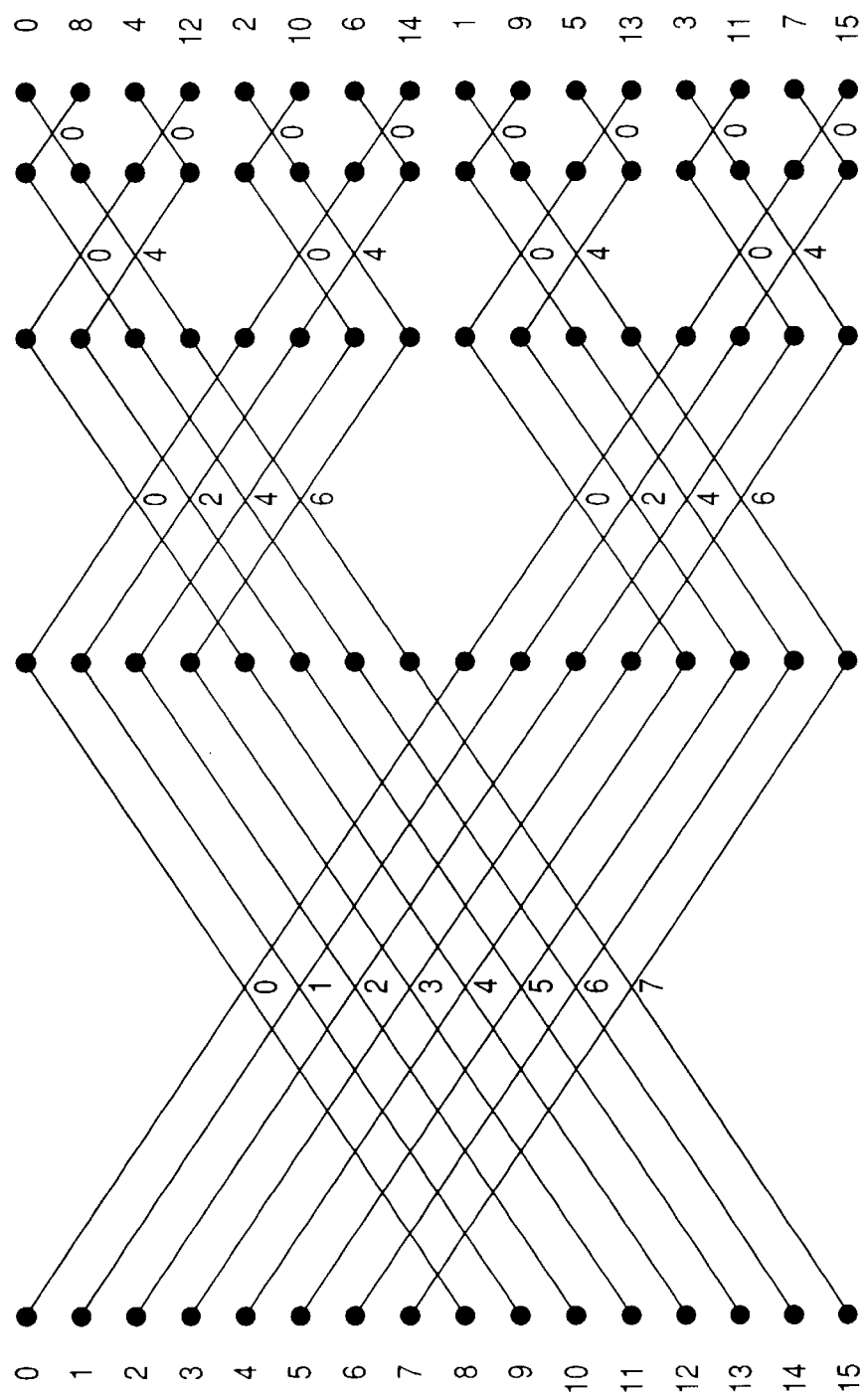
FIG. 27 is a diagram of butterfly calculations in frequency-thinned 16-point IFFT of an input-data serially-arranged type.

FIG. 27 shows butterfly calculations in frequency-thinned 16-point IFFT of an input-data serially-arranged type. In FIG. 27, the black circles denote signal connection points (nodes) respectively. The signal connection points (the black circles) are located at the vertices of rectangles (not shown). In each rectangle, a pair of intersecting diagonal lines join the 4 signal connection points (the black circles), and denote the execution of butterfly calculations among the 4 signal connection points. In FIG. 27, the numerals "0", "1", "2", "3", ..., and "15" at the left-hand side denote the order numbers of frequency-domain input signals while the numerals "0", "8", "4", ..., and "15" at the right-hand side denote the order numbers of time-domain output signals. In addition, the numerals located at regions near the intersection points among the diagonal lines denote the identification numbers of rotation factors. Here, the eight rotation factors $W_{16}^0$, $W_{16}^1$, $W_{16}^2$, $W_{16}^3$, $W_{16}^4$, $W_{16}^5$, $W_{16}^6$, and $W_{16}^7$ are used where "0", "1", "2", ..., and "7" indicate the identification numbers.

The frequency-thinned 16-point IFFT in FIG. 27 repetitively executes butterfly calculations. The frequency-thinned 16-point IFFT in FIG. 27 is divided into four columnar unit calculation blocks referred to as first, second, third, and fourth stages respectively.

Figure 28:
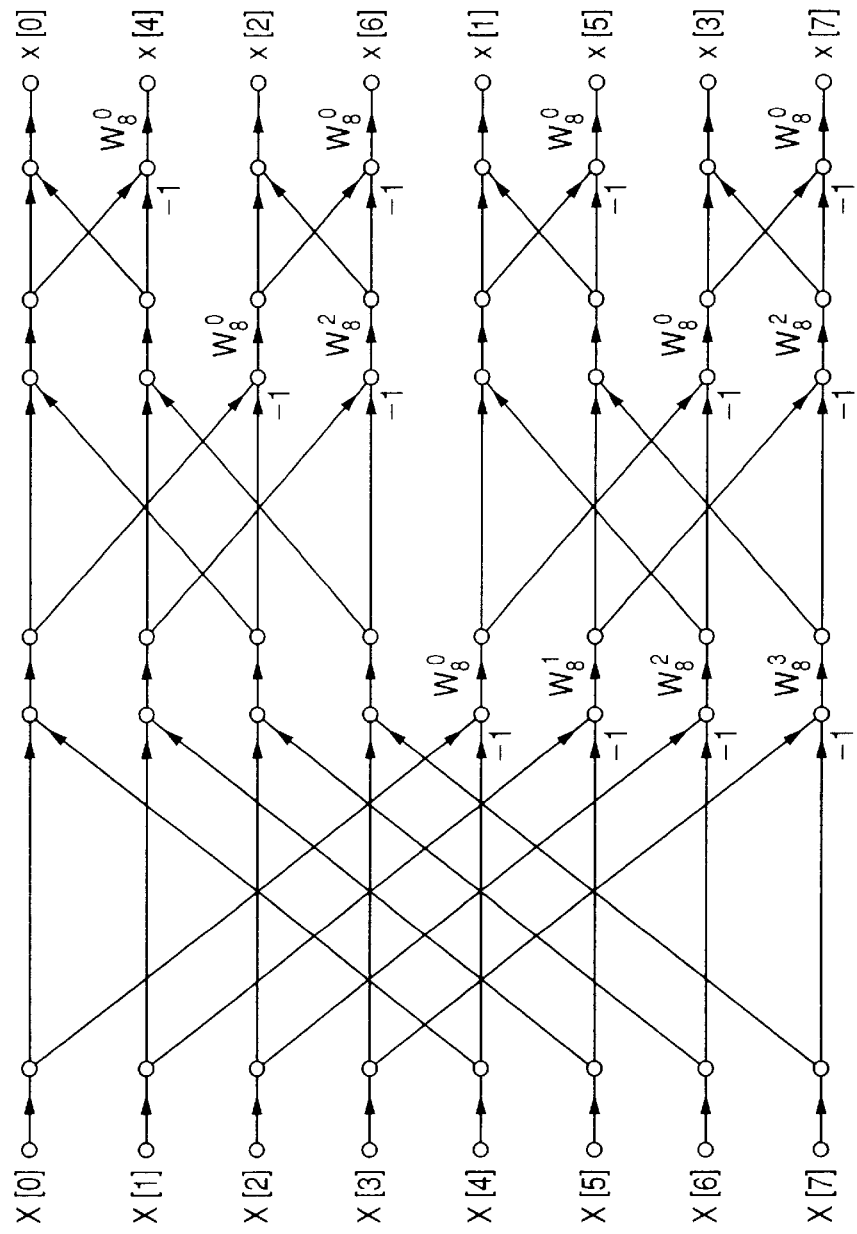
FIG. 28 is a signal flow diagram of frequency-thinned 8-point IFFT of an input-data serially-arranged type.

FIG. 28 shows a signal flow of frequency-thinned 8-point IFFT of an input-data serially-arranged type which can be a base of segments of the frequency-thinned 64-point IFFT in FIG. 26. In FIG. 28, X[0], X[1], X[2], . . . , and X[7] at the left-hand side denote terminals fed with frequency-domain input signals, and x[0], x[4], x[2], x[6], x[1], x[5], x[3], and x[7] at the right-hand side denote terminals fed with time-domain output signals. In addition, the arrows indicate directions along which signals are fed. The presence of a numerical character "−1" near an arrow means that a related signal is multiplied by "−1" before being fed to a later stage. The absence of a numerical character "−1" from a region near an arrow means that a related signal is multiplied by "11" before being fed to a later stage, or that a related signal is fed to a later stage as it is. At each node to which two arrows are directed, related two signals are added. The frequency-thinned 8-point IFFT in FIG. 28 uses the four rotation factors $W_8^0$, $W_8^1$, $W_8^2$, and $W_8^3$ of FIG. 13.

Multiple carriers "0", "4", "8", . . . , and "60" are assigned to the first channel (the channel having the identification number "0"). In the case where the generation of the first-channel multiple carriers is required, information pieces to be transmitted are applied to input terminals of the frequency-thinned 64-point IFFT which correspond to the carrier identification numbers "0", "4", "8", . . . , and "60" while zero signals (null signals) are applied to the other input terminals. Then, the frequency-thinned 64-point IFFT executes butterfly calculations in the first stage to the sixth stage. Multiple carriers "2", "6", "10", . . . , and "62" are assigned to the second channel (the channel having the identification number "1"). In the case where the generation of the second-channel multiple carriers is required, information pieces to be transmitted are applied to input terminals of the frequency-thinned 64-point IFFT which correspond to the carrier identification numbers "2", "6", "10", . . . , and "62" while zero signals (null signals) are applied to the other input terminals. Then, the frequency-thinned 64-point IFFT executes butterfly calculations in the first stage to the sixth stage. Multiple carriers "1", "5", "9", . . . , and "61" are assigned to the third channel (the channel having the identification number "2"). In the case where the generation of the third-channel multiple carriers is required, information pieces to be transmitted are applied to input terminals of the frequency-thinned 64-point IFFT which correspond to the carrier identification numbers "1", "5", "9", . . . , and "61" while zero signals (null signals) are applied to the other input terminals. Then, the frequency-thinned 64-point IFFT executes butterfly calculations in the first stage to the sixth stage. Multiple carriers "3", "7", "11", . . . , and "63" are assigned to the fourth channel (the channel having the identification number "3"). In the case where the generation of the fourth-channel multiple carriers is required, information pieces to be transmitted are applied to input terminals of the frequency-thinned 64-point IFFT which correspond to the carrier identification numbers "3", "7", "11", . . . , and "63" while zero signals (null signals) are applied to the other input terminals. Then, the frequency-thinned 64-point IFFT executes butterfly calculations in the first stage to the sixth stage.

In the frequency-thinned 64-point IFFT of FIG. 26, a set of rotation factors used by each of the first, second, third, and fourth stages depends on the channel. Specifically, a set of rotation factors used by the first stage depends on the channel as follows. The rotation factors $W_{64}^0$, $W_{64}^4$, $W_{64}^8$, $W_{64}^{12}$, $W_{64}^{16}$, $W_{64}^{20}$, $W_{64}^{24}$, and $W_{64}^{28}$ are used for the first channel (the channel having the identification number "0"). The rotation factors $W_{64}^2$, $W_{64}^6$, $W_{64}^{10}$, $W_{64}^{14}$, $W_{64}^{18}$, $W_{64}^{22}$, $W_{64}^{26}$, and $W_{64}^{30}$ are used for the second channel (the channel having the identification number "1"). The rotation factors $W_{64}^1$, $W_{64}^5$, $W_{64}^9$, $W_{64}^{13}$, $W_{64}^{17}$, $W_{64}^{21}$, $W_{64}^{25}$, and $W_{64}^{29}$ are used for the third channel (the channel having the identification number "2"). The rotation factors $W_{64}^3$, $W_{64}^7$, $W_{64}^{11}$, $W_{64}^{15}$, $W_{64}^{19}$, $W_{64}^{23}$, $W_{64}^{27}$, and $W_{64}^{31}$ are used for the fourth channel (the channel having the identification number "3").

Regarding the first, second, third, and fourth stages of the frequency-thinned 64-point IFFT in FIG. 26, it is preferable to provide a memory storing information representative of tables of the rotation factors used for the respective channels. In this case, the butterfly calculations in the first, second, third, and fourth stages are executed while the tables are referred to and the rotation factors are obtained therefrom. Also, in this case, the butterfly calculations in the first, second third, and fourth stages can be replaced by calculations in the first, second, third, and fourth stages of the frequency-thinned 16-point IFFT in FIG. 27. Thus, in this case, it is possible to provide a reduced amount of butterfly calculations in the first, second, third, and fourth stages of the frequency-thinned 64-point IFFT of FIG. 26.

As previously indicated, the fifth stage of the frequency-thinned 64-point IFFT in FIG. 26 uses the rotation factors $W_{64}^0$ and $W_{64}^{16}$ which are equal to "1" and "j" respectively. The fifth stage executes butterfly calculations between data pieces in pairs. In each pair, data pieces are separated by distances corresponding to 2 points. Ones of the data pieces in the pairs are null (zero).

In FIG. 26, there are 64 circles at the boundary between the fourth stage and the fifth stage of the frequency-thinned 64-point IFFT. The 64 circles denote signal connection points (nodes). The 16 circles among the 64 circles are black. The 16 black circles indicate the assignment of fourth-stage output signals to the fifth stage for the first channel (the channel having the identification number "0"). The 64 signal connection points (nodes) are serially numbered from above as "0", "1", "2", . . . , and "63". There are 16 signals outputted from the fourth stage for each of the four channels. The used channel is decided and selected from among the four channels according to the assignment of the fourth-stage output signals to the fifth stage. Specifically, for the first channel (the channel having the identification number "0"), the fourth-stage output signals are fed to the fifth stage through the signal connection points "0", "4", "8", "12", . . . , and "60". For the second channel (the channel having the identification number "1"), the fourth-stage output signals are fed to the fifth stage through the signal connection points "2", "6", "10", "14", . . . , and "62". For the third channel (the channel having the identification number "2"), the fourth-stage output signals are fed to the fifth stage through the signal connection points "1", "5", "9", "13", . . . , and "61". For the fourth channel (the channel having the identification number "3"), the fourth-stage output signals are fed to the fifth stage through the signal connection points "3", "7", "11", "15", . . . , and "63".

As previously indicated, the sixth stage of the frequency-thinned 64-point IFFT in FIG. 26 uses the rotation factor $W_{64}^0$ which is equal to "1". The sixth stage executes butterfly calculations between data pieces in pairs. In each pair, data pieces neighbor each other. Ones of the data pieces in the pairs are null (zero). Accordingly, the butterfly calculations in the sixth stage can be partially omitted. The frequency-thinned 64-point IFFT of FIG. 26 outputs the results of the butterfly calculations in the sixth stage.

Fifth Embodiment

A fifth embodiment of this invention is similar to one of the first, second, third, and fourth embodiments thereof except for the following design change. The fifth embodiment of this invention uses a double over-sampling technique and executes 128-point inverse Fourier transform to generate an OFDM signal having 64 carriers. The number of carriers may be less than 64.

Sixth Embodiment

A sixth embodiment of this invention is similar to one of the first, second, third, and fourth embodiments thereof except for the following design changes. The sixth embodiment of this invention executes IFFT having a cardinal number of "4" or a combination of cardinal numbers of "2" and "4". The IFFT executed in the sixth embodiment of this invention has 1024 points, 8096 points, or more.

Seventh Embodiment

A seventh embodiment of this invention is similar to one of the first, second, third, and fourth embodiments thereof except for the following design changes. The seventh embodiment of this invention is designed to process 2-channel signals. In this case, first alternate ones of orthogonal multiple carriers are assigned to a first channel, and second alternate ones thereof are assigned to a second channel.

Alternatively, the seventh embodiment of this invention may be designed to process 8-channel signals. In this case, orthogonal multiple carriers are grouped into a first set of every eight carriers assigned to a first channel, a second set of every eight carriers assigned to a second channel, a third set of every eight carriers assigned to a third channel, a fourth set of every eight carriers assigned to a fourth channel, a fifth set of every eight carriers assigned to a fifth channel, a sixth set of every eight carriers assigned to a sixth channel, a seventh set of every eight carriers assigned to a seventh channel, and an eighth set of every eight carriers assigned to an eighth channel.

The seventh embodiment of this invention may be designed to process 16-channel signals. In this case, orthogonal multiple carriers are grouped into 16 sets of every sixteen carriers assigned to 16 channels, respectively.

The seventh embodiment of this invention may be designed to vary the number of assigned carriers from channel to channel. In this case, the information transfer rate (the information transmission rate) depends on the channel.

Eighth Embodiment

An eighth embodiment of this invention is similar to one of the first, second, third, and fourth embodiments thereof except for the following design changes. In the eighth embodiment of this invention, the first, second, third, and fourth stages of first one of the 64-point IFFT's in the first, second, third, and fourth embodiments of this invention is combined with the fifth and sixth stages of second one of the 64-point IFFT's in the first, second, third, and fourth embodiments of this invention.

Ninth Embodiment

A ninth embodiment of this invention is similar to one of the first, second, third, and fourth embodiments thereof except for the following design changes. The ninth embodiment of this invention generates an infrared OFDM signal instead of an RF OFDM signal.

The ninth embodiment of this invention may be designed to transmit an OFDM signal through a coaxial cable, a telephone line, or an optical fiber cable.

Tenth Embodiment

A tenth embodiment of this invention is based on one of the first, second, third, and fourth embodiments thereof. The tenth embodiment of this invention relates to the designing of the decoding circuit 70 (see FIG. 6).

In the tenth embodiment of this invention, the decoding circuit 70 implements fast discrete Fourier transform (fast DFT) for converting the output I and Q signals of the guard interval processing circuit 69 (see FIG. 6) into first-channel, second-channel, third-channel, and fourth-channel real-part signals, and first-channel, second-channel, third-channel, and fourth-channel imaginary-part signals with respect to carrier frequencies. The fast DFT by the decoding circuit 70 corresponds to subjecting the output I and Q signals of the guard interval processing circuit 69 to demodulation (for example, QAM demodulation or PSK demodulation) responsive to information indicating the signal-piece assignment to orthogonal multiple carriers in a transmitter side. The decoding circuit 70 outputs the first-channel real-part signals and the first-channel imaginary-part signals to the output circuit 80a (see FIG. 6) as first-channel decoding-resultant signals. The decoding circuit 70 outputs the second-channel real-part signals and the second-channel imaginary-part signals to the output circuit 80b (see FIG. 6) as second-channel decoding-resultant signals. The decoding circuit 70 outputs the third-channel real-part signals and the third-channel imaginary-part signals to the output circuit 80c (see FIG. 6) as third-channel decoding-resultant signals. The decoding circuit 70 outputs the fourth-channel real-part signals and the fourth-channel imaginary-part signals to the output circuit 80d (see FIG. 6) as fourth-channel decoding-resultant signals.

The decoding circuit 70 includes, for example, a DSP (digital signal processor) or a computer-based device programmed to implement the DFT. The decoding circuit 70 may include an LSI (large-scale integration circuit) designed to implement the DFT.

Figure 29:
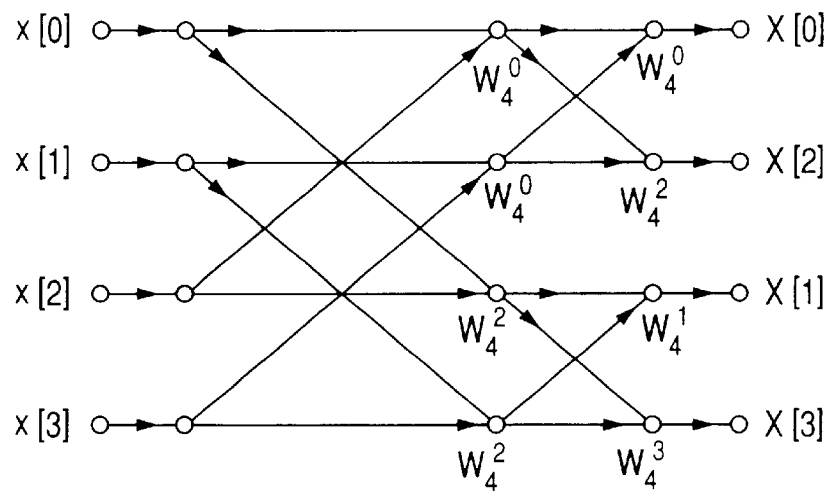
FIG. 29 is a signal flow diagram of temporally-thinned 4-point DFT of an input-data serially-arranged type.

The DFT by the decoding circuit 70 will be further explained below. The DFT has a cardinal number of "2". FIG. 29 shows a signal flow of temporally-thinned 4-point DFT of an input-data serially-arranged type. In FIG. 29, x[0], x[1], x[2], and x[3] at the left-hand side denote terminals fed with time-domain input signals, and X[0], X[2], X[1], and X[3] at the right-hand side denote terminals fed with frequency-domain output signals. In addition, the arrows indicate directions along which signals are fed. Furthermore, characters such as $W_4^0$ and $W_4^2$ near arrows indicate rotation factors. The presence of a character of a rotation factor near an arrow means that a related signal is multiplied by the rotation factor before being fed to a later stage. The absence of a character of a rotation factor from a region near an arrow means that a related signal is multiplied by "1" before being fed to a later stage, or that a related signal is fed to a later stage as it is. At each node to which two arrows are directed, related two signals are added.

Figure 30:
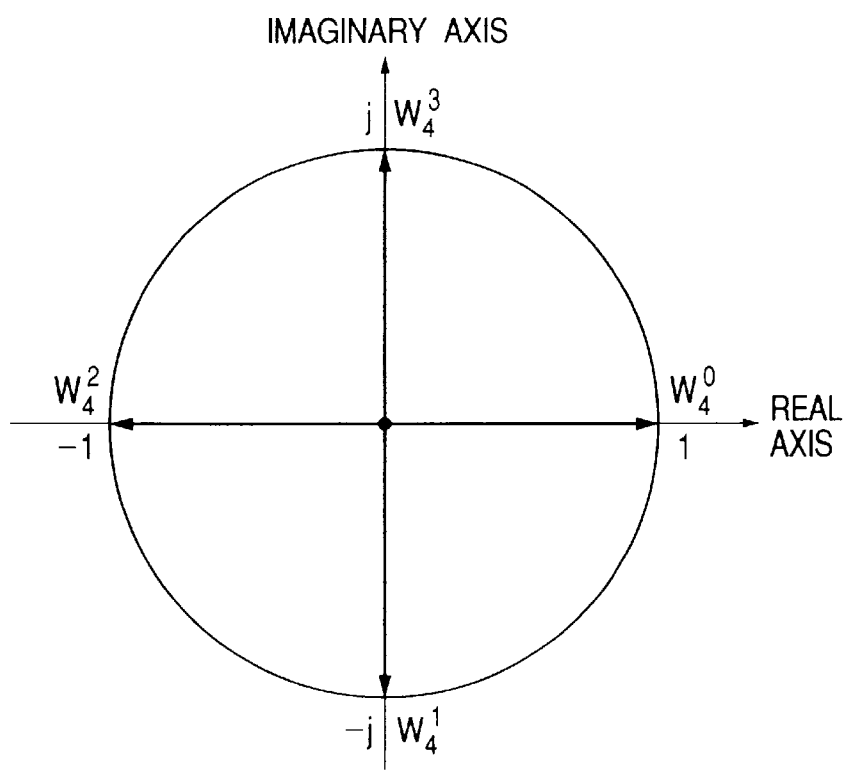
FIG. 30 is a diagram of a complex plane in which rotation factors used in 4-point DFT are located.

The rotation factors $W_4^0$, $W_4^1$, $W_4^2$, and $W_4^3$ are used by the 4-point DFT. The rotation factors $W_4^0$, $W_4^1$, $W_4^2$, and $W_4^3$ take complex values shown in FIG. 30. Specifically, FIG. 30 shows that a circle having a radius of "1" exists in a complex plane defined by a real axis (an ordinate) and an imaginary axis (an abscissa). The circle intersects with the real axis at a point of "1" and a point of "−1". The intersection point of "1" corresponds to the rotation factor $W_4^0$. The intersection point of "−1" corresponds to the rotation factor $W_4^2$. The circle intersects with the imaginary axis at a point of "j" and a point of "−j", where "j" denotes an imaginary unit. The intersection point of "j" corresponds to the rotation factor $W_4^3$. The intersection point of "−j" corresponds to the rotation factor $W_4^1$. Accordingly, the rotation factors $W_4^0$, $W_4^1$, $W_4^2$, and $W_4^3$ are equal to "1", "−j", "−1", and "j", respectively.

Figure 31:
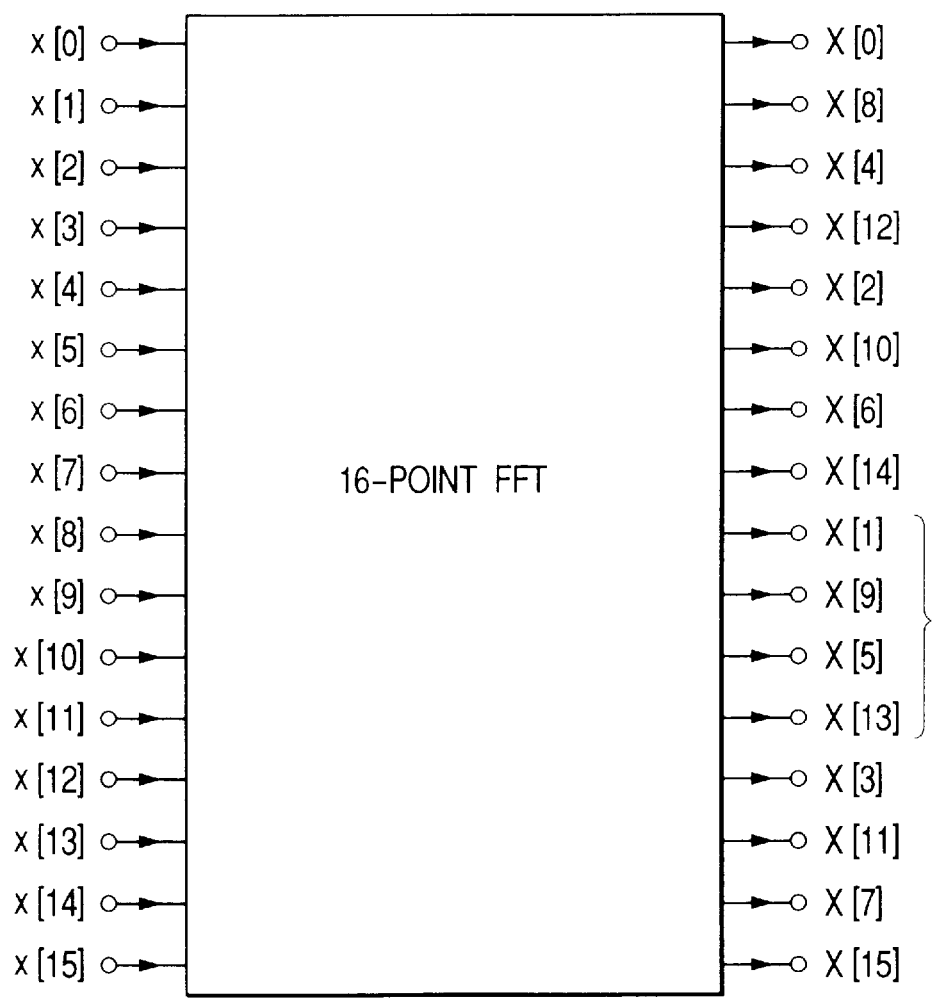
FIG. 31 is a diagram of a DFT device for implementing 16-point DFT, and input terminals and output terminals thereof.

FIG. 31 shows a DFT device for implementing temporally-thinned 16-point DFT of an input-data serially-arranged type. In FIG. 31, x[0], x[1], x[2], ..., and x[15] at the left-hand side denote time-domain input terminals for input signals having sequences of signal samples representing signal voltages. The signal samples result from sampling at a predetermined clock frequency. In FIG. 31, X[0], X[8], X[4], ..., and X[15] at the right-hand side denote terminals for outputting DFT calculation results as frequency-domain output signals which correspond to 16 different carrier frequencies respectively. Output signals from the guard interval processing circuit 69 are fed to the input terminals x[0], x[1], x[2], ..., and x[15] respectively.

With reference to FIG. 31, for example, transmitted information pieces in carriers "1", "9", "5", and "13" are recovered at the four output terminals X[1], X[9], X[5], and X[13]. The recovered information pieces take forms of voltage signals.

Figure 32:
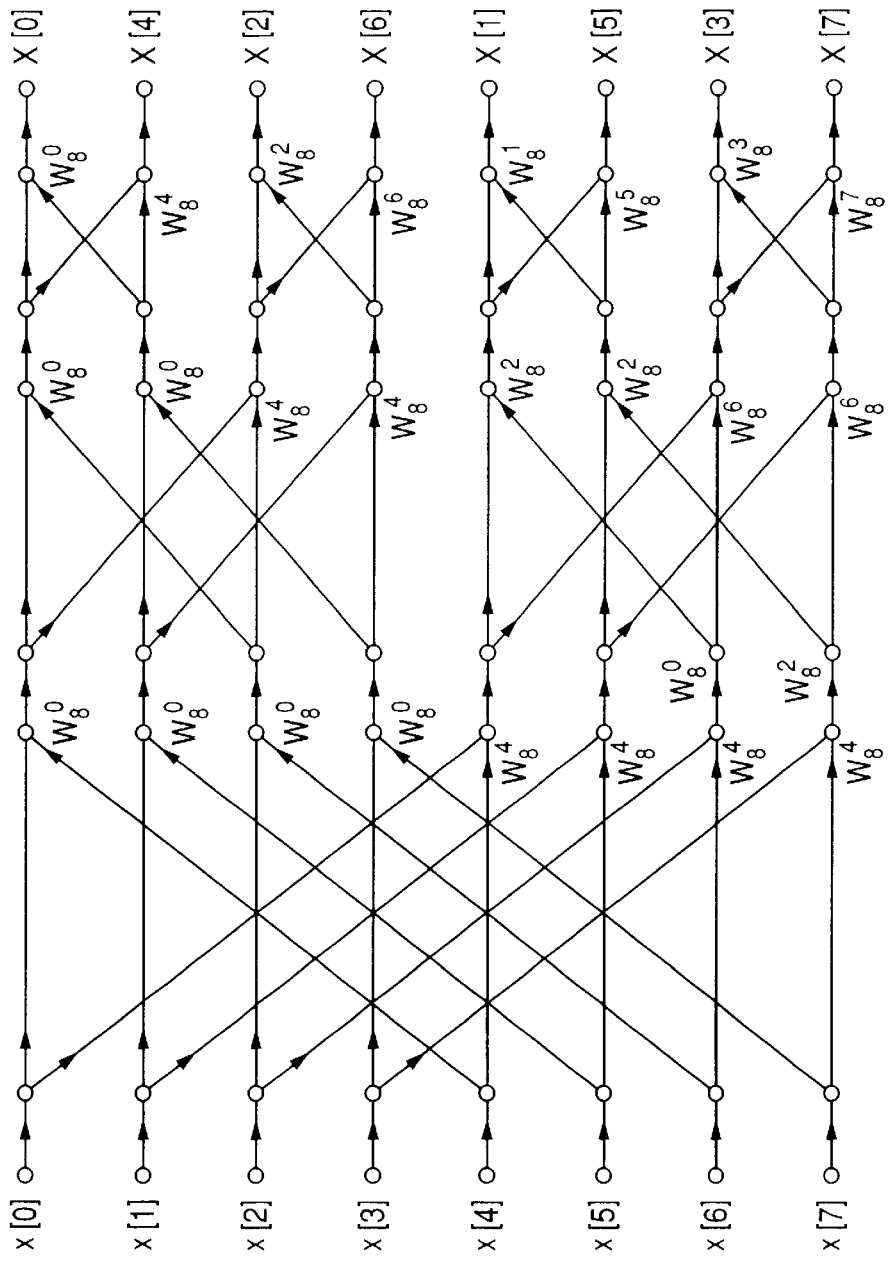
FIG. 32 is a signal flow diagram of temporally-thinned 8-point DFT of an input-data serially-arranged type.

FIG. 32 shows a signal flow of temporally-thinned 8-point DFT of an input-data serially-arranged type. In FIG. 32, x[0], x[1], x[2], ..., and x[7] at the left-hand side denote terminals fed with time-domain input signals, and X[0], X[4], X[2], X[6], X[1], X[5], X[3], and X[7] at the right-hand side denote terminals fed with frequency-domain output signals. In addition, the arrows indicate directions along which signals are fed. Furthermore, characters such as $W_8^0$ and $W_8^2$ near arrows indicate rotation factors. The presence of a character of a rotation factor near an arrow means that a related signal is multiplied by the rotation factor before being fed to a later stage. The absence of a character of a rotation factor from a region near an arrow means that a related signal is multiplied by "1" before being fed to a later stage, or that a related signal is fed to a later stage as it is. At each node to which two arrows are directed, related two signals are added.

Figure 33:
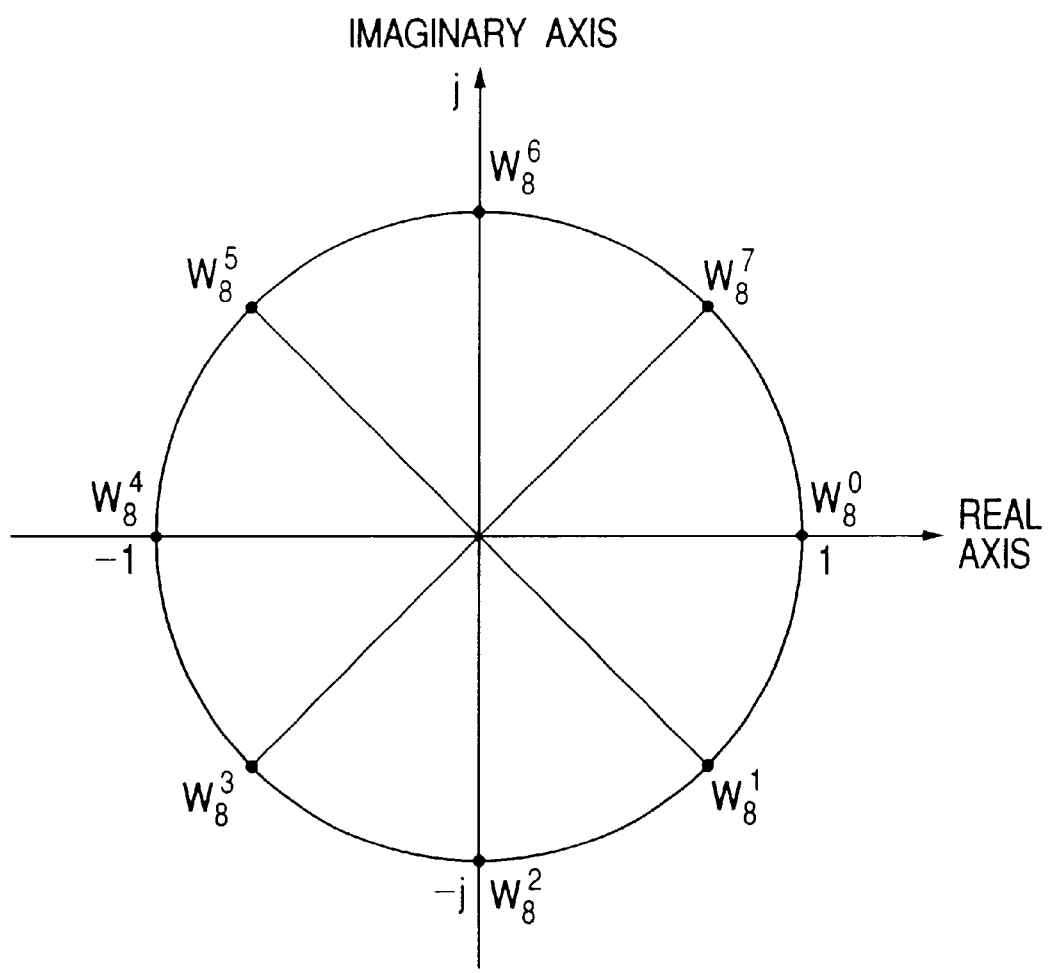
FIG. 33 is a diagram of a complex plane in which rotation factors used in 8-point DFT are located.

Rotation factors $W_8^0$, $W_8^1$, $W_8^2$, $W_8^3$, $W_8^4$, $W_8^5$, $W_8^6$, and $W_8^7$ are used by the temporally-thinned 8-point DFT in FIG. 32. The rotation factors $W_8^0$, $W_8^1$, $W_8^2$, $W_8^3$, $W_8^4$, $W_8^5$, $W_8^6$, and $W_8^7$ take complex values shown in FIG. 33. Specifically, FIG. 33 shows that a circle having a radius of "1" exists in a complex plane defined by a real axis (an ordinate) and an imaginary axis (an abscissa). The circle intersects with the real axis at a point of "1" and a point of "−1". The intersection point of "1" corresponds to the rotation factor $W_8^0$. The intersection point of "−1" corresponds to the rotation factor $W_8^4$. The circle intersects with the imaginary axis at a point of "j" and a point of "−j", where "j" denotes an imaginary unit. The intersection point of "j" corresponds to the rotation factor $W_8^6$. The intersection point of "−j" corresponds to the rotation factor $W_8^2$. A point on the circle which is intermediate between and equidistant from the intersection point of "1" and the intersection point of "j" corresponds to the rotation factor $W_8^7$. A point on the circle which is intermediate between and equidistant from the intersection point of "j" and the intersection point of "−1" corresponds to the rotation factor $W_8^5$. A point on the circle which is intermediate between and equidistant from the intersection point of "−1" and the intersection point of "−j" corresponds to the rotation factor $W_8^3$. A point on the circle which is intermediate between and equidistant from the intersection point of "−j" and the intersection point of "1" corresponds to the rotation factor $W_8^1$.

Figure 34:
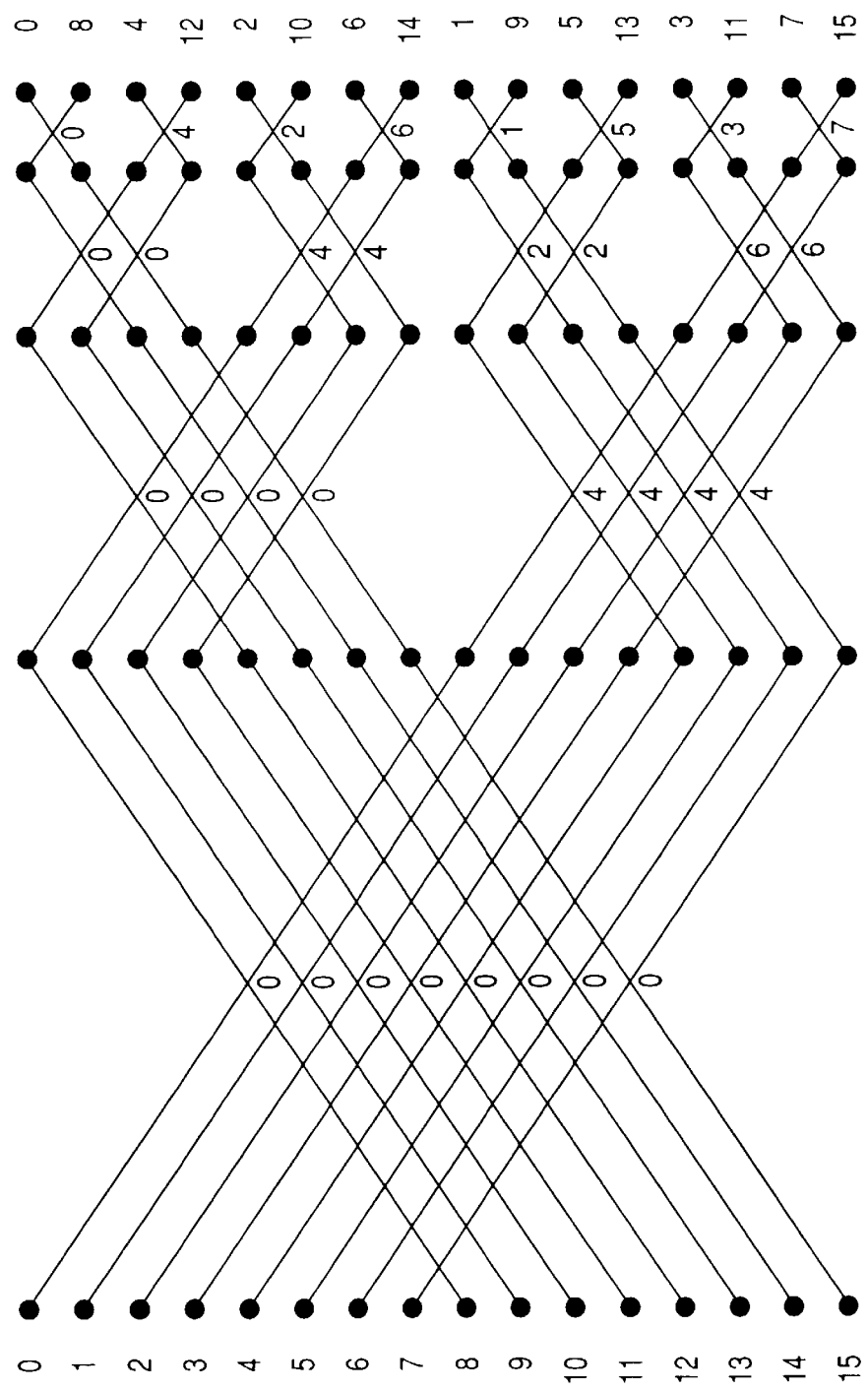
FIG. 34 is a diagram of butterfly calculations in temporally-thinned 16-point DFT of an input-data serially-arranged type.

FIG. 34 shows butterfly calculations in specified 16-point DFT, that is, temporally-thinned 16-point DFT of an input-data serially-arranged type. In FIG. 34, the black circles denote signal connection points (nodes) respectively. The signal connection points (the black circles) are located at the vertices of rectangles (not shown). In each rectangle, a pair of intersecting diagonal lines join the 4 signal connection points (the black circles), and denote the execution of butterfly calculations among the 4 signal connection points. In FIG. 34, the numerals "0", "1", "2", ..., and "15" at the left-hand side denote the order numbers of time-domain input signals while the numerals "0", "8", "4", "12", ..., and "15" at the right-hand side denote the order numbers of frequency-domain output signals. In addition, the numerals located at regions near the intersection points among the diagonal lines denote the identification numbers of rotation factors. Here, eight rotation factors $W_{16}^0$, $W_{16}^1$, $W_{16}^2$, $W_{16}^3$, $W_{16}^4$, $W_{16}^5$, $W_{16}^6$, and $W_{16}^7$ are used where "0", "1", "2", ..., and "7" indicate the identification numbers.

Figure 35:
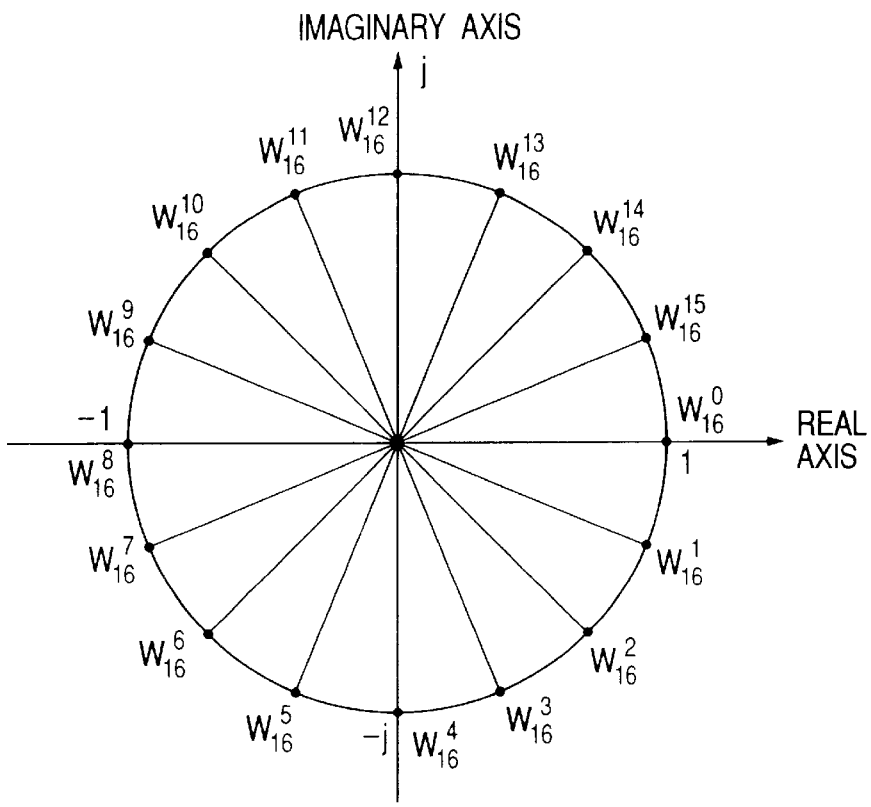
FIG. 35 is a diagram of a complex plane in which rotation factors used in 16-point DFT are located.

Sixteen rotation factors $W_{16}^0$, $W_{16}^1$, $W_{16}^2$, ..., and $W_{16}^{15}$ are used by normal 16-point DFT. The rotation factors $W_{16}^0$, $W_{16}^1$, $W_{16}^2$, ..., and $W_{16}^{15}$ take complex values shown in FIG. 35. Specifically, FIG. 35 shows that a circle having a radius of "1" exists in a complex plane defined by a real axis (an ordinate) and an imaginary axis (an abscissa). The circle intersects with the real axis at a point of "1". The intersection point of "1" corresponds to the rotation factor $W_{16}^0$. The circle is equally divided into 16 arcs. The 16 points on the circle between the arcs sequentially correspond to the rotation factors $W_{16}^0$, $W_{16}^1$, $W_{16}^2$, ..., and $W_{16}^{15}$ along the clockwise direction, respectively. The specified 16-point DFT in FIG. 34 uses only the eight rotation factors $W_{16}^0$, $W_{16}^1$, $W_{16}^2$, $W_{16}^3$, $W_{16}^4$, $W_{16}^5$, $W_{16}^6$, and $W_{16}^7$ among the sixteen rotation factors $W_{16}^0$, $W_{16}^1$, $W_{16}^2$, ..., and $W_{16}^{15}$.

In the specified 16-point DFT of FIG. 34, butterfly calculations are repetitively executed through a sequence of first, second, third, and fourth stages. From another viewpoint, the specified 16-point DFT in FIG. 34 is divided into four columnar unit calculation blocks referred to as first, second, third, and fourth stages respectively.

Figure 36:
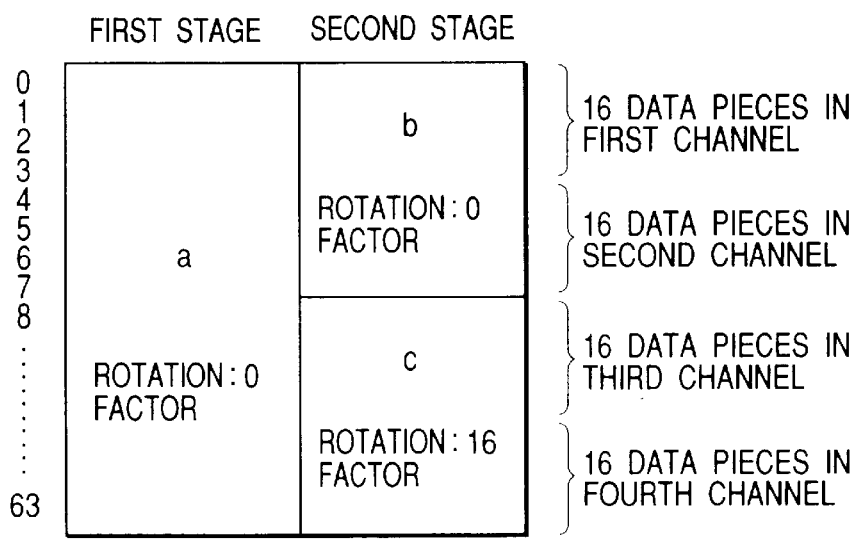
FIG. 36 is a diagram of a portion of temporally-thinned 64-point DFT of an input-data serially-arranged type in a tenth embodiment of this invention.

FIG. 36 shows a portion of specified 64-point DFT which has a sequence of first and second stages. The specified 64-point DFT is frequency-thinned 64-point DFT of an input-data serially-arranged type. The specified 64-point DFT generates four sets of 16 output data pieces from 64 input data pieces sequentially numbered as "0", "1", "2", ..., and "63". The four sets of 16 output signals correspond to the four channels, respectively. In FIG. 36, "aa" denotes the first stage. The second stage is divided into two portions (calculation blocks) "bb" and "cc" equal in design to each other.

Figure 37:
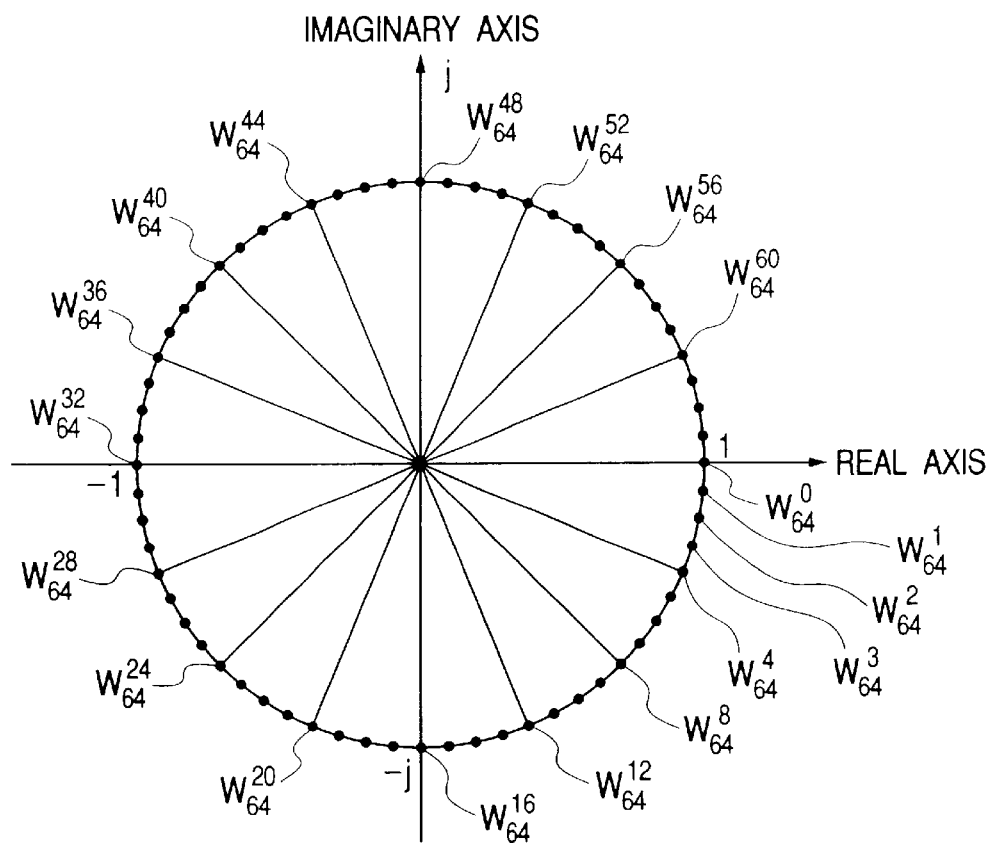
FIG. 37 is a diagram of a complex plane in which rotation factors used in 64-point DFT are located.

Sixty-four rotation factors $W_{64}^0$, $W_{64}^1$, $W_{64}^2$, ..., and $W_{64}^{63}$ are used by normal 64-point DFT. The rotation factors $W_{64}^0$, $W_{64}^1$, $W_{64}^2$, ..., and $W_{64}^{63}$ take complex values shown in FIG. 37. Specifically, FIG. 37 shows that a circle having a radius of "1" exists in a complex plane defined by a real axis (an ordinate) and an imaginary axis (an abscissa). The circle intersects with the real axis at a point of "1". The intersection point of "1" corresponds to the rotation factor $W_{64}^0$. The circle is equally divided into 64 arcs. The 64 points on the circle between the arcs sequentially correspond to the rotation factors $W_{64}^0$, $W_{64}^1$, $W_{64}^2$, ..., and $W_{64}^{63}$ along the clockwise direction, respectively. The rotation factors $W_{16}^0$, $W_{16}^1$, $W_{16}^2$, $W_{16}^3$, $W_{16}^4$, $W_{16}^5$, $W_{16}^6$, and $W_{16}^7$ used in the specified 16-point DFT are equal to the 64-point DFT rotation factors $W_{64}^0$, $W_{64}^4$, $W_{64}^8$, $W_{64}^{12}$, $W_{64}^{16}$, $W_{64}^{20}$, $W_{64}^{24}$, and $W_{64}^{28}$ respectively.

The first stage "aa" of the specified 64-point DFT executes butterfly calculations between input data pieces in 32 pairs while using the rotation factor $W_{64}^0$ having the identification number "0". In each pair, input data pieces neighbor each other. When the decoding of information pieces in at least one of the first and second channels (the channels having the identification numbers "0" and "1") is required, the first stage "aa" subjects only 32 input data pieces in the former half to butterfly calculations. When the decoding of information pieces in at least one of the third and fourth channels (the channels having the identification numbers "2" and "3") is required, the first stage "aa" subjects only 32 input data pieces in the latter half to butterfly calculations. When both the decoding of information pieces in at least one of the first and second channels and the decoding of information pieces in at least one of the third and fourth channels are required, the first stage "aa" subjects all 64 input data pieces to butterfly calculations.

The portion "bb" of the second stage of the specified 64-point DFT in FIG. 36 executes butterfly calculations between data pieces -in pairs while using the rotation factor $W_{64}^0$ having the identification number "0". In each pair, data pieces are separated by distances corresponding to 16 points. The portion "cc" of the second stage of the specified 64-point DFT in FIG. 36 executes butterfly calculations between data pieces in pairs while using the rotation factor $W_{64}^{16}$ having the identification number "16". In each pair, data pieces are separated by distances corresponding to 16 points.

When the decoding of information pieces in at most three of the four channels is required, the butterfly calculations in the portions "bb" and "cc" of the second stage can be partially omitted. For example, when the decoding of information pieces in only the first channel (the identification number "0") is required, only the portion "bb" subjects 16 data pieces in the former half to butterfly calculations. When the decoding of information pieces in only the second channel (the identification number "1") is required, only the portion "bb" subjects 16 data pieces in the latter half to butterfly calculations. When the decoding of information pieces in only the third channel (the identification number "2") is required, only the portion "cc" subjects 16 data pieces in the former half to butterfly calculations. When the decoding of information pieces in only the fourth channel (the identification number "3") is required, only the portion "cc" subjects 16 data pieces in the latter half to butterfly calculations.

The specified 64-point DFT executes butterfly calculations through a sequence of first, second, third, fourth, fifth, and sixth stages. The previously-mentioned first and second stages are successively followed by the third, fourth, fifth, and sixth stages. The second stage outputs 16 data pieces to the third stage for each of the four channels.

Figure 38:
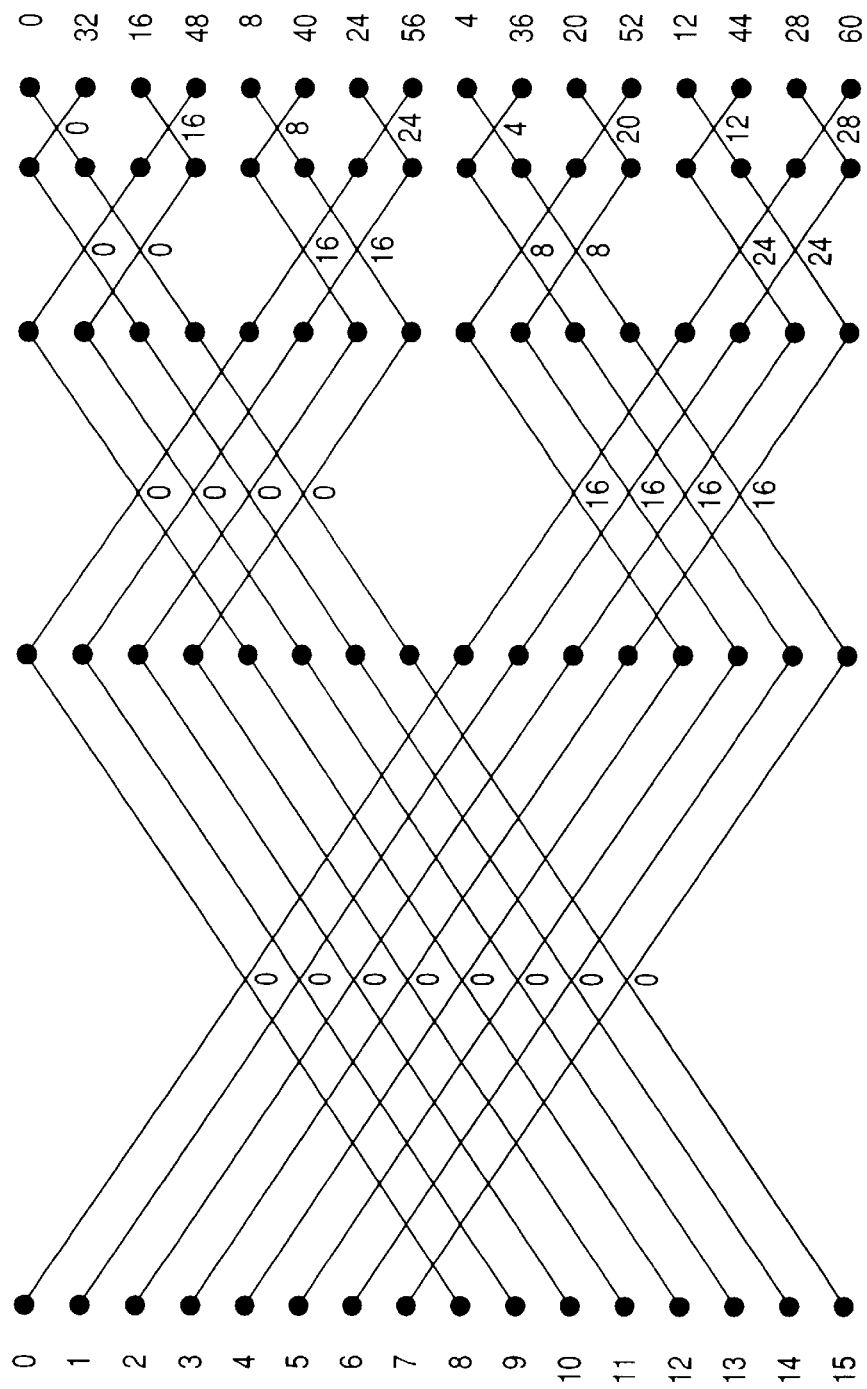
FIG. 38 is a diagram of butterfly calculations in temporally-thinned 16-point DFT of an input-data serially-arranged type.

FIG. 38 shows butterfly calculations in temporally-thinned 16-point DFT of an input-data serially-arranged type which forms the third stage to the sixth stage of a portion of the specified 64-point DFT, and which corresponds to the first channel (the identification number "0"). In FIG. 38, the black circles denote signal connection points (nodes) respectively. The signal connection points (the black circles) are located at the vertices of rectangles (not shown). In each rectangle, a pair of intersecting diagonal lines join the 4 signal connection points (the black circles), and denote the execution of butterfly calculations among the 4 signal connection points. In FIG. 38, the numerals "0", "1", "2", ..., and "15" at the left-hand side denote the order numbers of input signals while the numerals "0", "32", "16", "48", ..., and "60" at the right-hand side denote the order numbers of output signals which are equal to the order numbers of the related carriers. In addition, the numerals located at regions near the intersection points among the diagonal lines denote the identification numbers of rotation factors. Here, the eight rotation factors $W_{64}^0$, $W_{64}^4$, $W_{64}^8$, $W_{64}^{12}$, $W_{64}^{16}$, $W_{64}^{20}$, $W_{64}^{24}$, and $W_{64}^{28}$ are used where "0", "4", "8", "12", "16", "20", "24", and "28" indicate the identification numbers. Specifically, the third stage of the specified 64-point DFT uses the rotation factor $W_{64}^0$ having the identification number "0". The fourth stage uses the rotation factors $W_{64}^0$ and $W_{64}^{16}$ having the identification numbers "0" and "16". The fifth stage uses the rotation factors $W_{64}^0$, $W_{64}^8$, $W_{64}^{16}$, and $W_{64}^{24}$ having the identification numbers "0", "8", "16", and "24". The sixth stage uses the rotation factors $W_{64}^0$, $W_{64}^4$, $W_{64}^8$, $W_{64}^{12}$, $W_{64}^{16}$, $W_{64}^{20}$, $W_{64}^{24}$, and $W_{64}^{28}$ having the identification numbers "0", "4", "8", "12", "16", "20", "24", and "28".

The third stage to the sixth stage of the specified 64-point DFT use different sets of rotation factors for the four channels, respectively. FIG. 39 shows the relation among the channels and the used rotation factors. As shown in FIG. 39, for the second channel having the identification number "1", the third stage to the sixth stage of the specified 64-point DFT use the rotation factors $W_{64}^2$, $W_{64}^4$, $W_{64}^6$, ..., and $W_{64}^{30}$ having the identification numbers "2", "4", "6", ..., and "30". Specifically, the third stage uses the rotation factor $W_{64}^{16}$ having the identification number "16". The fourth stage uses the rotation factors $W_{64}^8$ and $W_{64}^{24}$ having the identification numbers "8" and "24". The fifth stage uses the rotation factors $W_{64}^4$, $W_{64}^{12}$, $W_{64}^{20}$, and $W_{64}^{28}$ having the identification numbers "4", "12", "20", and "28". The sixth stage uses the rotation factors $W_{64}^2$, $W_{64}^6$, $W_{64}^{10}$, $W_{64}^{14}$, $W_{64}^{18}$, $W_{64}^{22}$, $W_{64}^{26}$, $W_{64}^{30}$ having the identification numbers "2", "6", "10", "14", "18", "22", "26", and "30". For the third channel having the identification number "2", the third stage to the sixth stage of the specified 64-point DFT use the rotation factors $W_{64}^1$, $W_{64}^2$, $W_{64}^4$, $W_{64}^5$, $W_{64}^8$, $W_{64}^9$, $W_{64}^{10}$, $W_{64}^{13}$, $W_{64}^{17}$, $W_{64}^{18}$, $W_{64}^{20}$, $W_{64}^{21}$, $W_{64}^{25}$, $W_{64}^{26}$, $W_{64}^{29}$ having the identification numbers "1", "2", "4", "5", "8", "9", "10", "13", "17", "18", "20", "21", "25", "26", and "29". Specifically, the third stage uses the rotation factor $W_{64}^8$ having the identification number "8". The fourth stage uses the rotation factors $W_{64}^4$ and $W_{64}^{20}$ having the identification numbers "4" and "20". The fifth stage uses the rotation factors $W_{64}^2$, $W_{64}^{10}$, $W_{64}^{18}$, and $W_{64}^{26}$ having the identification numbers "2", "10", "18", and "26". The sixth stage uses the rotation factors $W_{64}^1$, $W_{64}^5$, $W_{64}^9$, $W_{64}^{13}$, $W_{64}^{17}$, $W_{64}^{21}$, $W_{64}^{25}$, and $W_{64}^{29}$ having the identification numbers "1", "5", "9", "13", "17", "21", "25", and "29". For the fourth channel having the identification number "3", the third stage to the sixth stage of the specified 643 point DFT use the rotation factors $W_{64}^3$, $W_{64}^6$, $W_{64}^7$, $W_{64}^{11}$, $W_{64}^{12}$, $W_{64}^{14}$, $W_{64}^{15}$, $W_{64}^{19}$, $W_{64}^{22}$, $W_{64}^{23}$, $W_{64}^{24}$, $W_{64}^{27}$, $W_{64}^{28}$, $W_{64}^{30}$, $W_{64}^{31}$ having the identification numbers "3", "6", "7", "11", "12", "14", "15", "19", "22", "23", "24", "27", "28", "30", and "31". Specifically, the third stage uses the rotation factor $W_{64}^{24}$ having the identification number "24". The fourth stage uses the rotation factors $W_{64}^{12}$ and $W_{64}^{28}$ having the identification numbers "12" and "28". The fifth stage uses the rotation factors $W_{64}^6$, $W_{64}^{14}$, $W_{64}^{22}$, and $W_{64}^{30}$ having the identification numbers "6", "14", "22", and "30". The sixth stage uses the rotation factors $W_{64}^3$, $W_{64}^7$, $W_{64}^{11}$, $W_{64}^{15}$, $W_{64}^{19}$, $W_{6427}^{23}$, $W_{64}^{27}$, and $W_{64}^{31}$ having the identification numbers "3", "7", "11", "15", "19", "23", "27", and "31".

Regarding the third, fourth, fifth, and sixth stages of the specified 64-point DFT, it is preferable to provide a memory storing information representative of tables of the rotation factors used for the respective channels. In this case, the butterfly calculations in the third, fourth, fifth, and sixth stages are executed while the tables are referred to and the rotation factors are obtained therefrom. Thus, in this case, the execution of the butterfly calculations is relatively easy.

The butterfly calculations in the third, fourth, fifth, and sixth stages of the specified 64-point DFT may be replaced by the butterfly calculations in the first, second, third, and fourth stages of the specified 16-point DFT's. In this case, it is possible to provide a reduced amount of butterfly calculations in the third, fourth, fifth, and sixth stages of the specified 64-point DFT.

In the case where the decoding of information pieces in designated one of the four channels is required, the table related to the designated channel is referred to and the rotation factors are obtained therefrom. A portion of the butterfly calculations of the specified 64-point DFT which corresponds to the designated channel is executed while the obtained rotation factors are used. As a result, information pieces are recovered from every four carriers assigned to the designated channel.

As previously mentioned, the third, fourth, fifth, and sixth stages of the 64-point DFT are replaced by the first, second, third, and fourth stages of the DFT's (the 16-point DFT's) having points less than 64. Therefore, in the case where the decoding circuit 70 (see FIG. 6) includes an LSI, the scale of the LSI can be relatively small. In the case where the decoding circuit 70 includes a DSP, the number of calculation steps can be relatively small.

Eleventh Embodiment

An eleventh embodiment of this invention is similar to the tenth embodiment thereof except that the decoding circuit 70 (see FIG. 6) is modified to implement DFT different from the DFT in the tenth embodiment.

FIG. 40 shows frequency-thinned 64-point DFT of an input-data serially-arranged type in the eleventh embodiment of this invention. In FIG. 40, the numerals "0", "1", "2", . . . , and "63" at the left-hand side denote the order numbers of time-domain input data pieces separated into groups assigned to four channels respectively. On the other hand, the numerals "0", "32", "16", . . . , and "63" at the right-hand side denote the order numbers of frequency-domain output data pieces which are equal to the carrier order numbers. The frequency-thinned 64-point DFT in FIG. 40 has a sequence of first, second, third, fourth, fifth, and sixth stages. In FIG. 40, the numerals in the regions of the first stage to the sixth stage denote the identification numbers of rotation factors used by butterfly calculations.

The first stage of the frequency-thinned 64-point DFT in FIG. 40 uses the rotation factors $W_{64}^0, W_{64}^1, W_{64}^2, \ldots,$ and $W_{64}^{31}$ having the identification numbers "0", "1", "2", . . . , and "31". Specifically, the first stage uses different sets of rotation factors among the rotation factors $W_{64}^0$, $W_{64}^1$, $W_{64}^2$, . . . , and $W_{64}^{31}$ for the four channels, respectively. The second stage of the frequency-thinned 64-point DFT in FIG. 40 uses the rotation factors $W_{64}^0$, $W_{64}^2$, $W_{64}^4$, . . . , and $W_{64}^{30}$ having the identification numbers "0", "2", "4", . . . , and "30". Specifically, the second stage uses different sets of rotation factors among the rotation factors $W_{64}^0, W_{64}^2, W_{64}^4, \ldots,$ and $W_{64}^{30}$ for the four channels, respectively.

Regarding the first and second stages of the frequency-thinned 64-point DFT in FIG. 40, it is preferable to provide a memory storing information representative of tables of the rotation factors used for the respective channels. In this case, the butterfly calculations in the first and second stages are executed while the tables are referred to and the rotation factors are obtained therefrom. Thus, in this case, the execution of the butterfly calculations is relatively easy.

The frequency-thinned 64-point DFT of FIG. 40 executes butterfly calculations through the sequence of the first, second, third, fourth, fifth, and sixth stages. The previously-mentioned first and second stages are successively followed by the third, fourth, fifth, and sixth stages. The second stage outputs 16 data pieces to the third stage for each of the four channels.

The third stage of the frequency-thinned 64-point DFT in FIG. 40 uses the rotation factors $W_{64}^0, W_{64}^4, W_{64}^8, \ldots,$ and $W_{64}^{28}$ having the identification numbers "0", "4", "8", . . . , and "28". The rotation factors used in the third stage are common to the four channels. The fourth stage of the frequency-thinned 64-point DFT uses the rotation factors $W_{64}^0$, $W_{64}^8$, $W_{64}^{16}$, and $W_{64}^{24}$ having the identification numbers "0", "8", "16", and "24". The rotation factors used in the fourth stage are common to the four channels. The fifth stage of the frequency-thinned 64-point DFT uses the rotation factors $W_{64}^0$ and $W_{64}^{16}$ having the identification numbers "0" and "16". The rotation factors used in the fifth stage are common to the four channels. The sixth stage of the frequency-thinned 64-point DFT uses the rotation factor $W_{64}^0$ having the identification number "0".

The third stage to the sixth stage of the frequency-thinned 64-point DFT in FIG. 40 are divided into four portions (calculation blocks) assigned to the four channels respectively. In FIG. 40, the dotted region corresponds to a portion of the third stage to the sixth stage which is assigned to the fourth channel having the identification number "3". The rotation factors W\A\CO1\HS(0,64), $W_{64}^4$, $W_{64}^8$, $W_{64}^{12}$, $W_{64}^{16}$, $W_{64}^{20}$, $W_{64}^{24}$, and $W_{64}^{28}$ used in each of the four portions of the third stage to the sixth stage of the frequency-thinned 64-point DFT are equal to the rotation factors $W_{16}^0$, $W_{16}^1, W_{16}^2, W_{16}^3, W_{16}^4, W_{16}^5, W_{16}^6,$ and $W_{16}^7$ used in the specified 16-point DFT, respectively. Each of the four portions of the third stage to the sixth stage of the frequency-thinned 64-point DFT is replaced by the specified 16-point DFT.

The frequency-thinned 64-point DFT in FIG. 40 executes the butterfly calculations among 64 input data pieces through the first, second, third, fourth, fifth, and sixth stages, and thereby recovers information pieces from every four carriers for each of the four channels. The third stage to the sixth stage of the frequency-thinned 64-point DFT are replaced by the specified 16-point DFT's.

Twelfth Embodiment

A twelfth embodiment of this invention is similar to the tenth embodiment thereof except that the decoding circuit 70 (see FIG. 6) is modified to implement DFT different from the DFT in the tenth embodiment.

FIG. 41 shows temporally-thinned 64-point DFT of an output-data serially-arranged type in the twelfth embodiment of this invention. In FIG. 41, the numerals "0", "32", "16", . . . , "63" at the left-hand side denote the order numbers of 64 time-domain input data pieces separated into groups assigned to four channels respectively. The order of the input data pieces in FIG. 41 agrees with the bit reverse order. On the other hand, the numerals "0", "1", "2", . . . , and "63" at the right-hand side denote the order numbers of frequency-domain output data pieces which are equal to the carrier order numbers. The temporally-thinned 64-point DFT in FIG. 41 has a sequence of first, second, third, fourth, fifth, and sixth stages. In FIG. 41, the numerals in the regions of the first stage to the sixth stage denote the identification numbers of rotation factors used by butterfly calculations.

The temporally-thinned 64-point DFT in FIG. 41 executes butterfly calculations among input data pieces through the first, second, third, fourth, fifth, and sixth stages while using rotation factors. The first stage uses the rotation factor $W_{64}^{0}$ having the identification number "0". The second stage uses the rotation factors $W_{64}^{0}$ and $W_{64}^{16}$ having the identification numbers "0" and "16". The third stage uses the rotation factors $W_{64}^{0}$, $W_{64}^{8}$, $W_{64}^{16}$, and $W_{64}^{24}$ having the identification numbers "0", "8", "16", and "24". The fourth stage uses the rotation factors $W_{64}^{0}$, $W_{64}^{4}$, $W_{64}^{8}$, ..., and $W_{64}^{28}$ having the identification numbers "0", "4", "8", ..., and "28". The fifth stage uses the rotation factors $W_{64}^{0}$, $W_{64}^{2}$, $W_{64}^{4}$, ..., and $W_{64}^{30}$ having the identification numbers "0", "2", "4", ..., and "30". The sixth stage uses the rotation factors $W_{64}^{0}$, $W_{64}^{1}$, $W_{64}^{2}$, ..., and $W_{64}^{31}$ having the identification numbers "0", "1", "2", ..., and "31".

Figure 42:
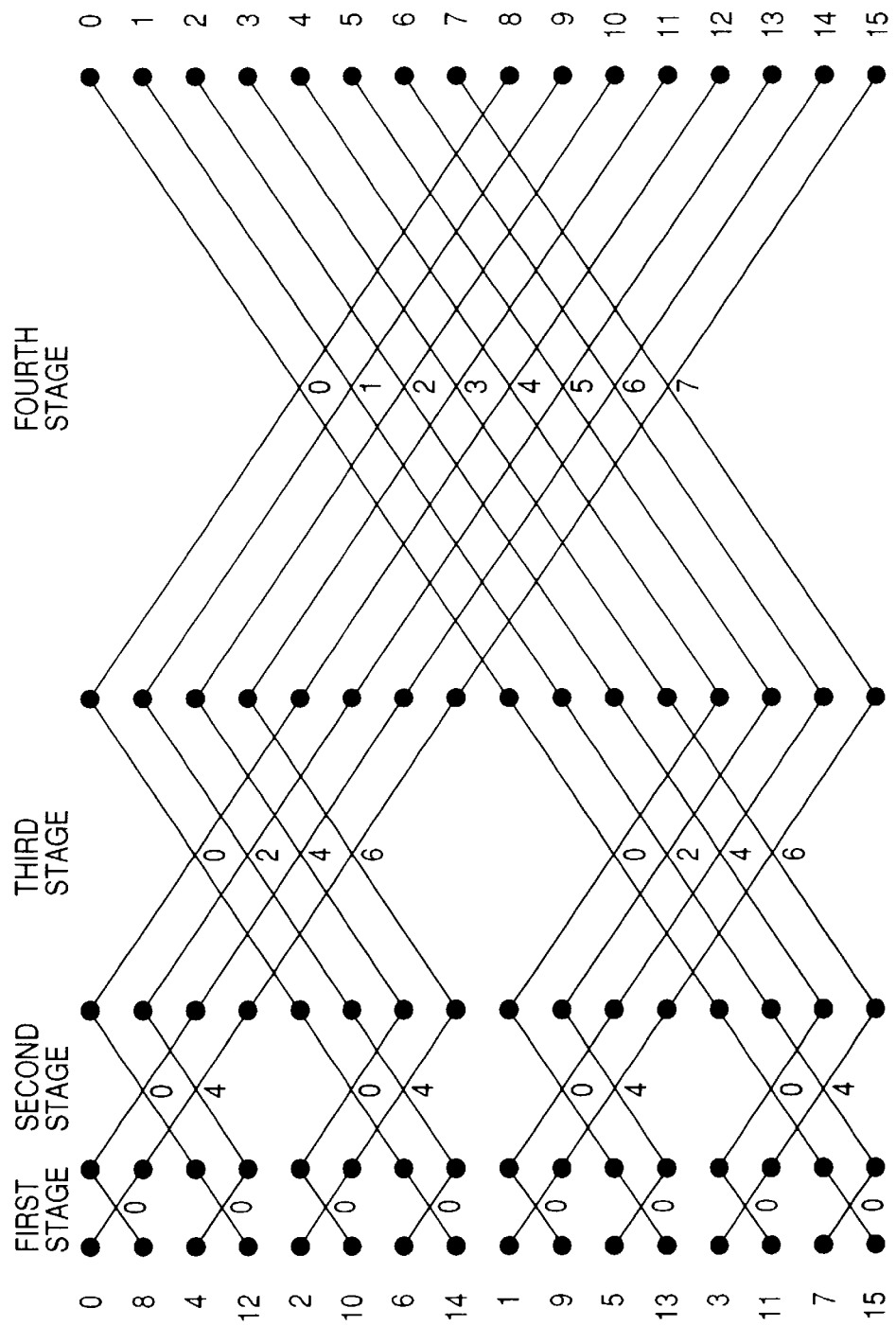
FIG. 42 is a signal flow diagram of temporally-thinned 16-point DFT of an output-data serially-arranged type.

FIG. 42 shows a signal flow of temporally-thinned 16-point DFT of an output-data serially-arranged type. In FIG. 42, the black circles denote signal connection points (nodes) respectively. The signal connection points (the black circles) are located at the vertices of rectangles (not shown). In each rectangle, a pair of intersecting diagonal lines join the 4 signal connection points (the black circles), and denote the execution of butterfly calculations among the 4 signal connection points. In FIG. 42, the numerals "0", "8", "4", "12", ..., and "15" at the left-hand side denote the order numbers of time-domain input signals while the numerals "0", "1", "2", ..., and "15" at the right-hand side denote the order numbers of frequency-domain output signals. In addition, the numerals located at regions near the intersection points among the diagonal lines denote the identification numbers of rotation factors. Here, the eight rotation factors $W_{16}^{0}$, $W_{16}^{1}$, $W_{16}^{2}$, $W_{16}^{3}$, $W_{16}^{4}$, $W_{16}^{5}$, $W_{16}^{6}$, and $W_{16}^{7}$ are used where "0", "1", "2", ..., and "7" indicate the identification numbers.

Figure 43:
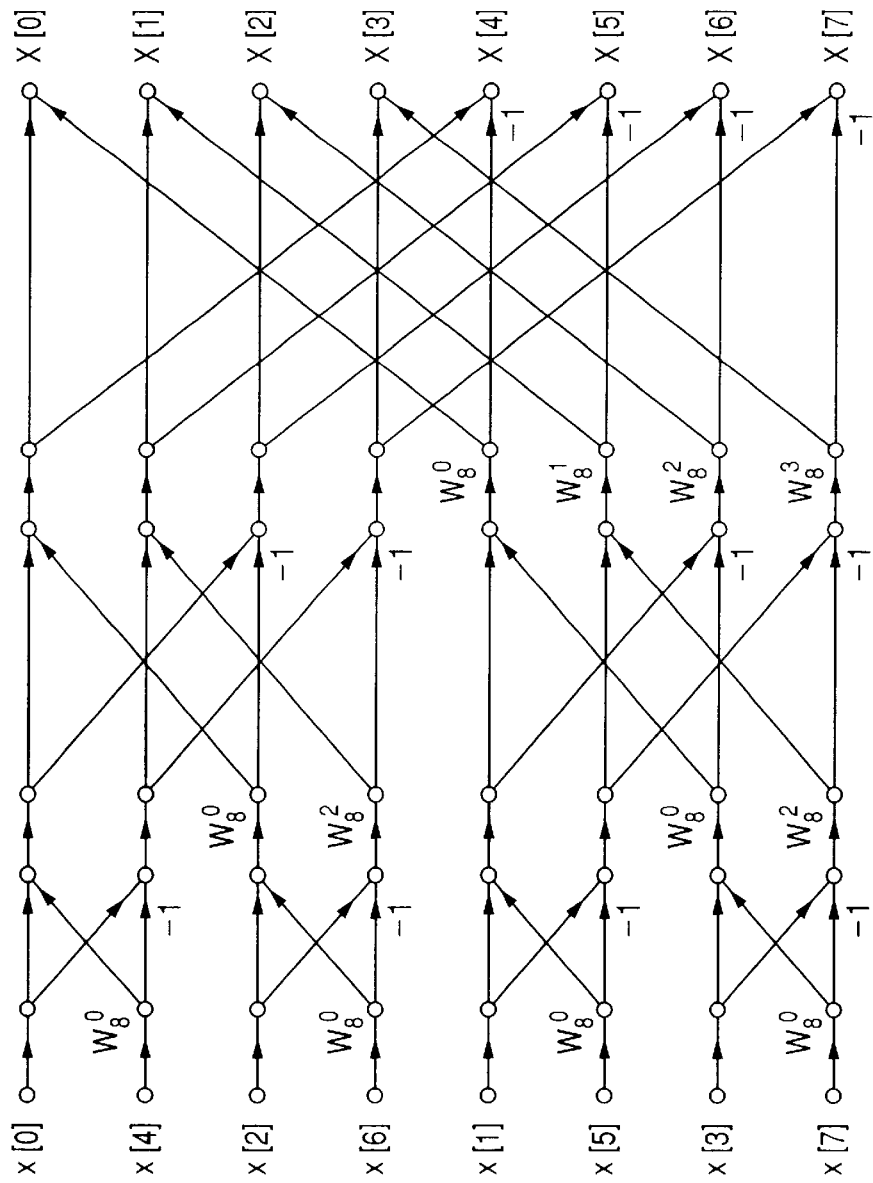
FIG. 43 is a signal flow diagram of temporally-thinned 8-point DFT of an output-data serially-arranged type.

FIG. 43 shows a signal flow of temporally-thinned 8-point DFT of an output-data serially-arranged type. In FIG. 43, x[0], x[4], x[2], x[6], x[1], x[5], x[3], and x[7] at the left-hand side denote terminals fed with time-domain input signals, and X[0], X[1], X[2], ..., and X[7] at the right-hand side denote terminals fed with frequency-domain output signals. In addition, the arrows indicate directions along which signals are fed. Furthermore, characters such as $W_{8}^{0}$ and $W_{8}^{2}$ near arrows indicate rotation factors. The presence of a character of a rotation factor near an arrow means that a related signal is multiplied by the rotation factor before being fed to a later stage. The absence of a character of a rotation factor from a region near an arrow means that a related signal is multiplied by "1" before being fed to a later stage, or that a related signal is fed to a later stage as it is. The presence of a numerical character "−1" near an arrow means that a related signal is multiplied by "−1" before being fed to a later stage. The absence of a numerical character "−1" from a region near an arrow means that a related signal is multiplied by "1" before being fed to a later stage, or that a related signal is fed to a later stage as it is. At each node to which two arrows are directed, related two signals are added. The temporally-thinned 8-point DFT in FIG. 43 uses the rotation factors $W_{8}^{0}$, $W_{8}^{1}$, $W_{8}^{2}$, and $W_{8}^{3}$.

The butterfly calculations in the first and second stages of the temporally-thinned 64-point DFT in FIG. 41 will be further described. FIG. 44 shows a unit of butterfly calculations in temporally-thinned DFT. With reference to FIG. 44, butterfly calculations between time-domain input signals "x" and "y" in response to a rotation factor W generate frequency-domain output signals "X" and "Y" which are given as "X=x+y·W" and "Y=x−y·W".

For each of the four channels, the first and second stages of the temporally-thinned 64-point DFT in FIG. 41 are divided into quarters. In FIG. 41, the dotted region corresponds to the uppermost one of the quarters which is assigned to the input data pieces "0", "32", "16", and "48". FIG. 45 shows butterfly calculations in the uppermost quarter. The first and second stages of the temporally-thinned 64-point DFT use the rotation factors $W_{64}^{0}$ and $W_{64}^{16}$ equal to "1" and "−j" respectively. With reference to FIG. 45, butterfly calculations between input data pieces x1, y1, x2, and y2 in response to the rotation factors "1" and "−j" generate output data pieces z0, z1, z2, and z3 which are given as "z0=(x1+y1)+(x2+y2)", "z1=(x1−y1)−j(x2−y2)", "z2=(x1+y1)−(x2+y2)", "z3=(x1−y1)+j(x2−y2)". The output data pieces z0, z1, z2, and z3 represent signal voltages.

For the decoding of information pieces in the first channel having the identification number "0", butterfly calculations in only a first-channel-corresponding portion of the first and second stages of the temporally-thinned 64-point DFT are executed to generate 16 output data pieces z0, z4, z8, ..., and z60. For the decoding of information pieces in the second channel having the identification number "1", butterfly calculations in only a second-channel-corresponding portion of the first and second stages of the temporally-thinned 64-point DFT are executed to generate 16 output data pieces z2, z6, z10, ..., and z62. For the decoding of information pieces in the third channel having the identification number "2", butterfly calculations in only a third-channel-corresponding portion of the first and second stages of the temporally-thinned 64-point DFT are executed to generate 16 output data pieces z1, z5, z9, ..., and z61. For the decoding of information pieces in the fourth channel having the identification number "3", butterfly calculations in only a fourth-channel-corresponding portion of the first and second stages of the temporally-thinned 64-point DFT are executed to generate 16 output data pieces z3, z7, z11, ..., and z63. Thus, the second stage outputs every four data pieces to the third stage for each of the four channels.

Figure 46:
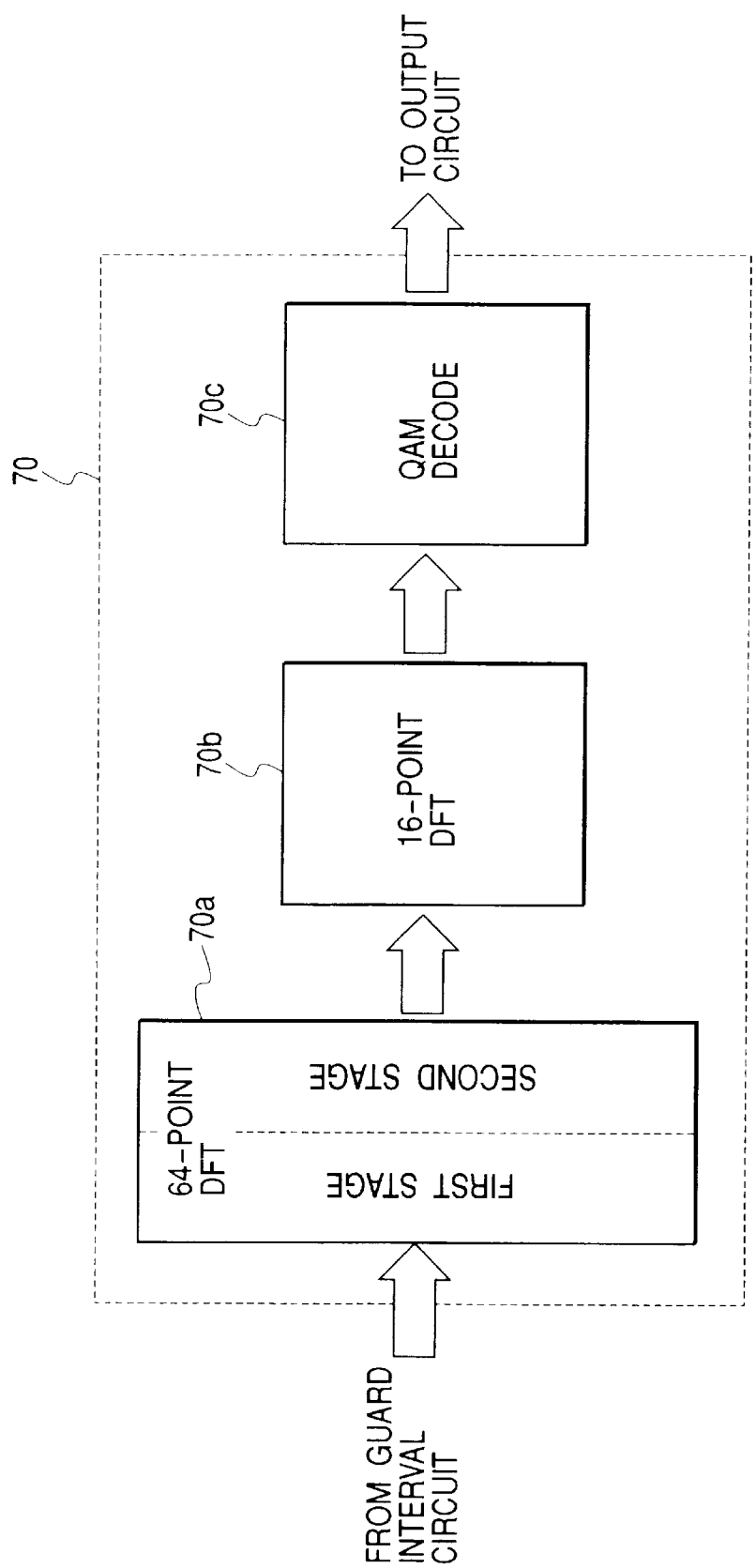
FIG. 46 is a diagram of a decoding circuit in a twelfth embodiment of this invention.

FIG. 46 shows the decoding circuit 70 in the twelfth embodiment of this invention. As shown in FIG. 46, the decoding circuit 70 has a sequence of a front section 70a, an intermediate section 70b, and a rear section 70c. The front section 70a executes the butterfly calculations in the first and second stages of the temporally-thinned 64-point DFT. Thus, the front section 70a outputs 16 data pieces (every four data pieces) to the intermediate section 70b for each of the four channels. The intermediate section 70b implements specified 16-point DFT's while using 64-point IDFT rotation factors for the four channels. The specified 16-point DFT's by the intermediate section 70b have a sequence of first, second, third, and fourth stages which form the third, fourth, fifth, and sixth stages of the temporally-thinned 64-point DFT.

The intermediate section 70b uses different sets of 64-point IDFT rotation factors for the channels respectively. By way of example, for the fourth channel having the identification number "3", the first stage of the specified 16-point DFT's by the intermediate section 70b uses the rotation factor $W_{64}^{24}$ having the identification number "24". The second stage uses $W_{64}^{12}$ and $W_{64}^{28}$ having the identification numbers "12" and "28". The third stage uses the rotation factors $W_{64}^{6}$, $W_{64}^{14}$, $W_{64}^{22}$, and $W_{64}^{30}$ having the identification numbers "6", "14", "22", and "30". The fourth stage uses the rotation factors $W_{64}^{3}$, $W_{64}^{7}$, $W_{64}^{11}$, $W_{64}^{15}$, $W_{64}{}^{19}$, $W_{64}{}^{23}$, $W_{64}{}^{27}$, and $W_{64}{}^{31}$ having the identification numbers "3", "7", "11", "15", "19", "23", "27", and "31".

Regarding the third, fourth, fifth, and sixth stages of the temporally-thinned 64-point DFT, that is, regarding the first, second, third, and fourth stages of the specified 16-point DFT's by the intermediate section 70b, it is preferable to provide a memory storing information representative of tables of the rotation factors used for the respective channels. In this case, the butterfly calculations in the third, fourth, fifth, and sixth stages of the temporally-thinned 64-point DFT (the first, second, third, and fourth stages of the specified 16-point DFT's by the intermediate section 70b) are executed while the tables are referred to and the rotation factors are obtained therefrom. Thus, in this case, the execution of the butterfly calculations is relatively easy.

In the case where the decoding of information pieces in designated one of the four channels is required, the butterfly calculations are executed in only a portion of the first and second stages of the temporally-thinned 64-point DFT which corresponds to the designated channel. Then, the butterfly calculations are executed in a designated-channel-corresponding portion of the third, fourth, fifth, and sixth stages of the temporally-thinned 64-point DFT (that is, the first, second, third, and fourth stages of the specified 16-point DFT corresponding to the designated channel) while the table related to the designated channel is referred to and the rotation factors are obtained therefrom. As a result, information pieces are recovered from every four carriers assigned to the designated channel.

With reference to FIG. 46, the intermediate section 70b outputs 16 data pieces to the rear section 70c for each of the four channels. The rear section 70c subjects the output data pieces from the intermediate section 70b to demodulation (for example, QAM demodulation or PSK demodulation) to recover transmitted information pieces.

Thirteenth Embodiment

A thirteenth embodiment of this invention is similar to the tenth embodiment thereof except that the decoding circuit 70 (see FIG. 6) is modified to implement DFT different from the DFT in the tenth embodiment.

FIG. 47 shows frequency-thinned 64-point DFT of an output-data serially-arranged type in the thirteenth embodiment of this invention. In FIG. 47, the numerals "0", "32", "16", . . . , and "63" at the left-hand side denote the order numbers of time-domain input data pieces separated into groups assigned to four channels respectively. On the other hand, the numerals "0", "1", "2", . . . , and "63" at the right-hand side denote the order numbers of frequency-domain output data pieces which are equal to the carrier order numbers. The frequency-thinned 64-point DFT in FIG. 47 has a sequence of first, second, third, fourth, fifth, and sixth stages. In FIG. 47, the numerals in the regions of the first stage to the sixth stage denote the identification numbers of rotation factors used by butterfly calculations.

The first stage of the frequency-thinned 64-point DFT in FIG. 47 uses the rotation factors $W_{64}{}^{0}$, $W_{64}{}^{1}$, $W_{64}{}^{2}$, . . . , and $W_{64}{}^{31}$ having the identification numbers "0", "1", "2", . . . , and "31". Specifically, the first stage uses different sets of rotation factors among the rotation factors $W_{64}{}^{0}$, $W_{64}{}^{1}$, $W_{64}{}^{2}$, . . . , and $W_{64}{}^{31}$ for the four channels, respectively. The second stage of the frequency-thinned 64-point DFT uses the rotation factors $W_{64}{}^{0}$, $W_{64}{}^{2}$, $W_{64}{}^{4}$, . . . , and $W_{64}{}^{28}$ having the identification numbers "0", "2", "4", . . . , and "28". Specifically, the second stage uses different sets of rotation factors among the rotation factors $W_{64}{}^{0}$, $W_{64}{}^{2}$, $W_{64}{}^{4}$, . . . , and $W_{64}{}^{28}$ for the four channels, respectively. The third stage of the frequency-thinned 64-point DFT uses the rotation factors $W_{64}{}^{0}$, $W_{64}{}^{4}$, $W_{64}{}^{8}$, . . . , and $W_{64}{}^{28}$ having the identification numbers "0", "4", "8", . . . , and "28". Specifically, the third stage uses different sets of rotation factors among the rotation factors $W_{64}{}^{0}$, $W_{64}{}^{2}$, $W_{64}{}^{4}$, . . . , and $W_{64}{}^{28}$ for the four channels, respectively. The fourth stage of the frequency-thinned 64-point DFT uses the rotation factors $W_{64}{}^{0}$, $W_{64}{}^{8}$, $W_{64}{}^{16}$, and $W_{64}{}^{24}$ having the identification numbers "0", "8", "16", and "24". Specifically, the fourth stage uses different rotation factors among the rotation factors $W_{64}{}^{0}$, $W_{64}{}^{8}$, $W_{64}{}^{16}$, and $W_{64}{}^{24}$ for the four channels, respectively. The fifth stage of the frequency-thinned 64-point DFT uses the rotation factor $W_{64}{}^{0}$ for the first and second channels having the identification numbers "0" and "1". The fifth stage uses the rotation factor $W_{64}{}^{16}$ for the third and fourth channels having the identification numbers "2" and "3". The sixth stage of the frequency-thinned 64-point DFT uses the rotation factor $W_{64}{}^{0}$ for the four channels.

Regarding the first, second, third, fourth, and fifth stages of the frequency-thinned 64-point DFT in FIG. 47, it is preferable to provide a memory storing information representative of tables of the rotation factors used for the respective channels. In this case, the butterfly calculations in the first, second, third, fourth, and fifth stages of the frequency-thinned 64-point DFT are executed while the tables are referred to and the rotation factors are obtained therefrom. Thus, in this case, the execution of the butterfly calculations is relatively easy.

In the frequency-thinned 64-point DFT of FIG. 47, the second stage outputs 16 data pieces to the third stage. The third, fourth, fifth, and sixth stages of the frequency-thinned 64-point DFT are formed by the first, second, third, and fourth stages of specified 16-point DFT's. Different sets of rotation factors are used by the specified 16-point DFT's, respectively.

Figure 48:
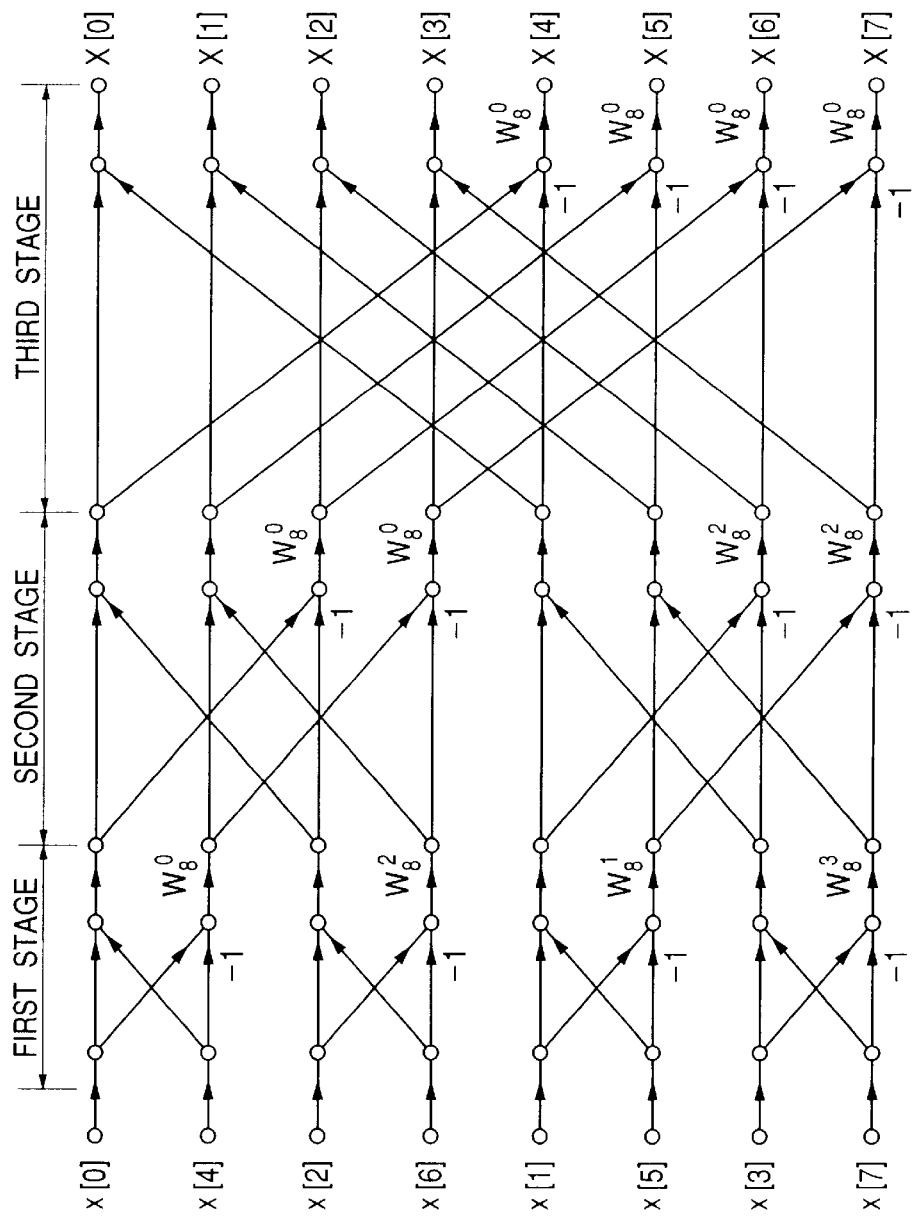
FIG. 48 is a signal flow diagram of frequency-thinned 8-point DFT of an output-data serially-arranged type.

FIG. 48 shows a signal flow of frequency-thinned 8-point DFT of an output-data serially-arranged type which is a base of the specified 16-point DFT. In FIG. 48, x[0], x[4], x[2], x[6], x[1], x[5], x[3], and x[7] at the left-hand side denote terminals fed with time-domain input signals, and X[0], X[1], X[2], . . . , and X[7] at the right-hand side denote terminals fed with frequency-domain output signals. In addition, the arrows indicate directions along which signals are fed. Furthermore, characters such as $W_8{}^{0}$ and $W_8{}^{2}$ near arrows indicate rotation factors. The presence of a character of a rotation factor near an arrow means that a related signal is multiplied by the rotation factor before being fed to a later stage. The absence of a character of a rotation factor from a region near an arrow means that a related signal is multiplied by "1" before being fed to a later stage, or that a related signal is fed to a later stage as it is. The presence of a numerical character "−1" near an arrow means that a related signal is multiplied by "−1" before being fed to a later stage. The absence of a numerical character "−1" from a region near an arrow means that a related signal is multiplied by "1" before being fed to a later stage, or that a related signal is fed to a later stage as it is. At each node to which two arrows are directed, related two signals are added. The frequency-thinned 8-point DFT in FIG. 48 uses the rotation factors $W_8{}^{0}$, $W_8{}^{1}$, $W_8{}^{2}$, and $W_8{}^{3}$.

In the case where the decoding of information pieces in designated one of the four channels is required, the butterfly calculations are executed in only a portion of the first and second stages of the frequency-thinned 64-point DFT which corresponds to the designated channel. Then, the butterfly calculations are executed in a designated-channel-corresponding portion of the third, fourth, fifth, and sixth stages of the frequency-thinned 64-point DFT (that is, the first, second, third, and fourth stages of the specified 16-point DFT corresponding to the designated channel) while the table related to the designated channel is referred to and the rotation factors are obtained therefrom. As a result, information pieces are recovered from every four carriers assigned to the designated channel.

Fourteenth Embodiment

A fourteenth embodiment of this invention is similar to one of the tenth, eleventh, twelfth, and thirteenth embodiments thereof except for the following design change. The fourteenth embodiment of this invention uses a double over-sampling technique and executes 128-point Fourier transform to demodulate an OFDM signal having 64 carriers. The number of carriers may be less than 64.

Fifteenth Embodiment

A fifteenth embodiment of this invention is similar to one of the tenth, eleventh, twelfth, and thirteenth embodiments thereof except for the following design changes. The fifteenth embodiment of this invention executes DFT having a cardinal number of "4" or a combination of cardinal numbers of "2" and "4". The DFT executed in the fifteenth embodiment of this invention has 1024 points, 8096 points, or more.

Sixteenth Embodiment

A sixteenth embodiment of this invention is similar to one of the tenth, eleventh, twelfth, and thirteenth embodiments thereof except for the following design changes. The sixteenth embodiment of this invention is designed to process 2-channel signals. In this case, first alternate ones of orthogonal multiple carriers are assigned to a first channel, and second alternate ones thereof are assigned to a second channel.

Alternatively, the sixteenth embodiment of this invention may be designed to process 8-channel signals. In this case, orthogonal multiple carriers are grouped into a first set of every eight carriers assigned to a first channel, a second set of every eight carriers assigned to a second channel, a third set of every eight carriers assigned to a third channel, a fourth set of every eight carriers assigned to a fourth channel, a fifth set of every eight carriers assigned to a fifth channel, a sixth set of every eight carriers assigned to a sixth channel, a seventh set of every eight carriers assigned to a seventh channel, and an eighth set of every eight carriers assigned to an eighth channel.

The sixteenth embodiment of this invention may be designed to process 16-channel signals. In this case, orthogonal multiple carriers are grouped into 16 sets of every sixteen carriers assigned to 16 channels, respectively.

The sixteenth embodiment of this invention may be designed to vary the number of assigned carriers from channel to channel. In this case, the information transfer rate (the information transmission rate) depends on the channel.

Seventeenth Embodiment

A seventeenth embodiment of this invention is similar to one of the tenth, eleventh, twelfth, and thirteenth embodiments thereof except for the following design changes. In the seventeenth embodiment of this invention, the first and second stages of first one of the 64-point DFT's in the tenth, eleventh, twelfth, and thirteenth embodiments of this invention is combined with the third, fourth, fifth, and sixth stages of second one of the 64-point DFT's in the tenth, eleventh, twelfth, and thirteenth embodiments of this invention.

Eighteenth Embodiment

An eighteenth embodiment of this invention is similar to one of the tenth, eleventh, twelfth, and thirteenth embodiments thereof except for the following design changes. The eighteenth embodiment of this invention receives an infrared OFDM signal instead of an RF OFDM signal.

The eighteenth embodiment of this invention may be designed to transmit and receive an OFDM signal through a coaxial cable, a telephone line, or an optical fiber cable.

What is claimed is:

1. An apparatus for transmitting an orthogonal-multi-carrier signal, comprising:

first means for subjecting an information signal to first inverse discrete Fourier transform to convert the information signal into an orthogonal-multi-carrier signal;

second means for outputting the orthogonal-multi-carrier signal generated by the first means to a transmission line;

third means for receiving the orthogonal-multi-carrier signal from the transmission line;

fourth means for subjecting the orthogonal-multi-carrier signal received by the third means to discrete Fourier transform to recover the information signal from the received orthogonal-multi-carrier signal;

fifth means contained in the first means for subjecting the information signal to M-point inverse discrete Fourier transform and thereby implementing a first stage of the first inverse discrete Fourier transform, and for generating a transform result signal representative of results of the M-point inverse discrete Fourier transform, wherein M denotes a predetermined natural number greater than 2; and sixth means contained in the first means for subjecting the transform result signal generated by the fifth means to N-point inverse discrete Fourier transform and thereby implementing a second stage of the first inverse discrete Fourier transform to generate the orthogonal-multi-carrier signal, the second stage following the first stage, wherein N denotes a predetermined natural number greater than twice M.

2. An apparatus for transmitting an orthogonal-multi-carrier signal, comprising:

first means for subjecting a multi-channel information signal to first inverse discrete Fourier transform to convert the multi-channel information signal into an orthogonal-multi-carrier signal;

second means for outputting the orthogonal-multi-carrier signal generated by the first means to a transmission line;

third means for receiving the orthogonal-multi-carrier signal from the transmission line;

fourth means for subjecting the orthogonal-multi-carrier signal received by the third means to discrete Fourier transform to recover the multi-channel information signal from the received orthogonal-multi-carrier signal;

a plurality of fifth means contained in the first means for subjecting the multi-channel information signal to M-point inverse discrete Fourier transforms and thereby implementing a first stage of the first inverse discrete Fourier transform, and for generating transform result signals representative of results of the M-point inverse discrete Fourier transforms, wherein M denotes a predetermined natural number greater than 2; and sixth means contained in the first means for subjecting the transform result signals generated by the fifth means to N-point inverse discrete Fourier transform and thereby implementing a second stage of the first inverse discrete Fourier transform to generate the orthogonal-multi-carrier signal, the second stage following the first stage, wherein N denotes a predetermined natural number greater than twice M.

3. An apparatus for transmitting an orthogonal-multi-carrier signal, comprising:

first means for subjecting an information signal to first inverse discrete Fourier transform to convert the information signal into an orthogonal-multi-carrier signal;

second means for outputting the orthogonal-multi-carrier signal generated by the first means to a transmission line;

third means for receiving the orthogonal-multi-carrier signal from the transmission line;

fourth means for subjecting the orthogonal-multi-carrier signal received by the third means to discrete Fourier transform to recover the information signal from the received orthogonal-multi-carrier signal;

fifth means contained in the first means for subjecting the information signal to M-point inverse discrete Fourier transform responsive to rotation factors depending on a desired transmission channel and thereby implementing a first stage of the first inverse discrete Fourier transform, and for generating a transform result signal representative of results of the M-point inverse discrete Fourier transform, wherein M denotes a predetermined natural number greater than 2; and sixth means contained in the first means for subjecting the transform result signal generated by the fifth means to N-point inverse discrete Fourier transform and thereby implementing a second stage of the first inverse discrete Fourier transform to generate the orthogonal-multi-carrier signal, the second stage following the first stage, wherein N denotes a predetermined natural number greater than twice M.

4. An apparatus for transmitting an orthogonal-multi-carrier signal, comprising:

first means for subjecting an information signal to first inverse discrete Fourier transform to convert the information signal into an orthogonal-multi-carrier signal;

second means for outputting the orthogonal-multi-carrier signal generated by the first means to a transmission line;

third means for receiving the orthogonal-multi-carrier signal from the transmission line;

fourth means for subjecting the orthogonal-multi-carrier signal received by the third means to discrete Fourier transform to recover the information signal from the received orthogonal-multi-carrier signal;

fifth means contained in the first means for subjecting the information signal to M-point inverse discrete Fourier transform and thereby implementing a first stage of the first inverse discrete Fourier transform, and for generating a transform result signal representative of results of the M-point inverse discrete Fourier transform, wherein M denotes a predetermined natural number greater than 2; and sixth means contained in the first means for feeding the transform result signal from the fifth means to input terminals of N-point inverse discrete Fourier transform and subjecting the transform result signal to the N-point inverse discrete Fourier transform, and thereby implementing a second stage of the first inverse discrete Fourier transform to generate the orthogonal-multi-carrier signal, the second stage following the first stage, the input terminals depending on a desired transmission channel, wherein N denotes a predetermined natural number greater than twice M.

5. A method of transmitting an orthogonal-multi-carrier signal, comprising the steps of:

subjecting an information signal to first inverse discrete Fourier transform to convert the information signal into an orthogonal-multi-carrier signal;

outputting the orthogonal-multi-carrier signal to a transmission line;

receiving the orthogonal-multi-carrier signal from the transmission line; and subjecting the received orthogonal-multi-carrier signal to discrete Fourier transform to recover the information signal from the received orthogonal-multi-carrier signal;

wherein the subjecting step comprises:
1) subjecting the information signal to M-point inverse discrete Fourier transform and thereby implementing a first stage of the first inverse discrete Fourier transform, and generating a transform result signal representative of results of the M-point inverse discrete Fourier transform, wherein M denotes a predetermined natural number greater than 2; and
2) subjecting the transform result signal to N-point inverse discrete Fourier transform and thereby implementing a second stage of the first inverse discrete Fourier transform to generate the orthogonal-multi-carrier signal, the second stage following the first stage, wherein N denotes a predetermined natural number greater than twice M.

6. A method of transmitting an orthogonal-multi-carrier signal, comprising the steps of:

subjecting an information signal to first inverse discrete Fourier transform to convert the information signal into an orthogonal-multi-carrier signal;

outputting the orthogonal-multi-carrier signal to a transmission line;

receiving the orthogonal-multi-carrier signal from the transmission line; and subjecting the received orthogonal-multi-carrier signal to discrete Fourier transform to recover the information signal from the received orthogonal-multi-carrier signal;

wherein the subjecting step comprises:
1) subjecting the information signal to M-point inverse discrete Fourier transform responsive to rotation factors depending on a desired transmission channel and thereby implementing a first stage of the first inverse discrete Fourier transform, and generating a transform result signal representative of results of the M-point inverse discrete Fourier transform, wherein M denotes a predetermined natural number greater than 2; and
2) subjecting the transform result signal to N-point inverse discrete Fourier transform and thereby implementing a second stage of the first inverse discrete Fourier transform to generate the orthogonal-multi-carrier signal, the second stage following the first stage, wherein N denotes a predetermined natural number greater than twice M.

7. An apparatus for transmitting an orthogonal-multi-carrier signal, comprising:

first means for subjecting an information signal to inverse discrete Fourier transform to convert the information signal into an orthogonal-multi-carrier signal;

second means for outputting the orthogonal-multi-carrier signal generated by the first means to a transmission line;

third means for receiving the orthogonal-multi-carrier signal from the transmission line;

fourth means for subjecting the orthogonal-multi-carrier signal received by the third means to first discrete Fourier transform to recover the information signal from the received orthogonal-multi-carrier signal;

fifth means contained in the fourth means for subjecting the orthogonal-multi-carrier signal to N-point discrete Fourier transform and thereby implementing a first stage of the first discrete Fourier transform, and for generating a first transform result signal representative of results of the N-point discrete Fourier transform, wherein N denotes a predetermined natural number greater than 4;

sixth means contained in the fourth means for subjecting the first transform result signal generated by the fifth means to M-point discrete Fourier transform and thereby implementing a second stage of the first discrete Fourier transform, and for generating a second transform result signal representative of results of the M-point discrete Fourier transform, the second stage following the first stage, wherein M denotes a predetermined natural number smaller than a half of N; and seventh means contained in the fourth means for converting the second transform result signal generated by the sixth means into the information signal.

8. An apparatus for transmitting an orthogonal-multi-carrier signal, comprising:

first means for subjecting a multi-channel information signal to inverse discrete Fourier transform to convert the multi-channel information signal into an orthogonal-multi-carrier signal;

second means for outputting the orthogonal-multi-carrier signal generated by the first means to a transmission line;

third means for receiving the orthogonal-multi-carrier signal from the transmission line;

fourth means for subjecting the orthogonal-multi-carrier signal received by the third means to first discrete Fourier transform to recover the multi-channel information signal from the received orthogonal-multi-carrier signal;

fifth means contained in the fourth means for subjecting the orthogonal-multi-carrier signal to N-point discrete Fourier transform and thereby implementing a first stage of the first discrete Fourier transform, and for generating a first transform result signal representative of results of the N-point discrete Fourier transform, wherein N denotes a predetermined natural number greater than 4;

a plurality of sixth means contained in the fourth means for subjecting the first transform result signal generated by the fifth means to M-point discrete Fourier transform and thereby implementing a second stage of the first discrete Fourier transform, and for generating second transform result signals representative of results of the M-point discrete Fourier transform, the second stage following the first stage, wherein M denotes a predetermined natural number smaller than a half of N; and seventh means contained in the fourth means for converting the second transform result signals generated by the sixth means into the multi-channel information signal.

9. An apparatus for transmitting an orthogonal-multi-carrier signal, comprising:

first means for subjecting an information signal to inverse discrete Fourier transform to convert the information signal into an orthogonal-multi-carrier signal;

second means for outputting the orthogonal-multi-carrier signal generated by the first means to a transmission line;

third means for receiving the orthogonal-multi-carrier signal from the transmission line;

fourth means for subjecting the orthogonal-multi-carrier signal received by the third means to first discrete Fourier transform to recover the information signal from the received orthogonal-multi-carrier signal;

fifth means contained in the fourth means for subjecting the orthogonal-multi-carrier signal to N-point discrete Fourier transform and thereby implementing a first stage of the first discrete Fourier transform, and for generating a first transform result signal representative of results of the N-point discrete Fourier transform, wherein N denotes a predetermined natural number greater than 4;

sixth means contained in the fourth means for subjecting the first transform result signal generated by the fifth means to M-point discrete Fourier transform responsive to rotation factors depending on a desired transmission channel and thereby implementing a second stage of the first discrete Fourier transform, and for generating a second transform result signal representative of results of the M-point discrete Fourier transform, the second stage following the first stage, wherein M denotes a predetermined natural number smaller than a half of N; and seventh means contained in the fourth means for converting the second transform result signal generated by the sixth means into the information signal.

10. An apparatus for transmitting an orthogonal-multi-carrier signal, comprising:

first means for subjecting an information signal to inverse discrete Fourier transform to convert the information signal into an orthogonal-multi-carrier signal;

second means for outputting the orthogonal-multi-carrier signal generated by the first means to a transmission line;

third means for receiving the orthogonal-multi-carrier signal from the transmission line;

fourth means for subjecting the orthogonal-multi-carrier signal received by the third means to first discrete Fourier transform to recover the information signal from the received orthogonal-multi-carrier signal;

fifth means contained in the fourth means for subjecting the orthogonal-multi-carrier signal to N-point discrete Fourier transform and thereby implementing a first stage of the first discrete Fourier transform, and for generating a first transform result signal representative of results of the N-point discrete Fourier transform, wherein N denotes a predetermined natural number greater than 4;

sixth means contained in the fourth means for feeding the first transform result signal from the fifth means to input terminals of M-point inverse discrete Fourier transform and subjecting the first transform result signal to the M-point discrete Fourier transform, and thereby implementing a second stage of the first discrete Fourier transform, and for generating a second transform result signal representative of results of the M-point discrete Fourier transform, the second stage following the first stage, the input terminals depending on a desired transmission channel, wherein M denotes a predetermined natural number smaller than a half of N; and seventh means contained in the fourth means for converting the second transform result signal generated by the sixth means into the information signal.

11. A method of transmitting an orthogonal-multi-carrier signal, comprising the steps of:

subjecting an information signal to inverse discrete Fourier transform to convert the information signal into an orthogonal-multi-carrier signal;

outputting the orthogonal-multi-carrier signal to a transmission line;

receiving the orthogonal-multi-carrier signal from the transmission line; and subjecting the received orthogonal-multi-carrier signal to first discrete Fourier transform to recover the information signal from the received orthogonal-multi-carrier signal;

wherein the subjecting step comprises:

1) subjecting the orthogonal-multi-carrier signal to N-point discrete Fourier transform and thereby implementing a first stage of the first discrete Fourier transform, and generating a first transform result signal representative of results of the N-point discrete Fourier transform, wherein N denotes a predetermined natural number greater than 4;

2) subjecting the first transform result signal to M-point discrete Fourier transform and thereby implementing a second stage of the first discrete Fourier transform, and generating a second transform result signal representative of results of the M-point discrete Fourier transform, the second stage following the first stage, wherein M denotes a predetermined natural number smaller than a half of N; and 3) converting the second transform result signal into the information signal.

12. A method of transmitting an orthogonal-multi-carrier signal, comprising the steps of:

subjecting an information signal to inverse discrete Fourier transform to convert the information signal into an orthogonal-multi-carrier signal;

outputting the orthogonal-multi-carrier signal to a transmission line;

receiving the orthogonal-multi-carrier signal from the transmission line; and subjecting the received orthogonal-multi-carrier signal to first discrete Fourier transform to recover the information signal from the received orthogonal-multi-carrier signal;

wherein the subjecting step comprises:

1) subjecting the orthogonal-multi-carrier signal to N-point discrete Fourier transform and thereby implementing a first stage of the first discrete Fourier transform, and generating a first transform result signal representative of results of the N-point discrete Fourier transform, wherein N denotes a predetermined natural number greater than 4;

2) subjecting the first transform result signal to M-point discrete Fourier transform responsive to rotation factors depending on a desired transmission channel and thereby implementing a second stage of the first discrete Fourier transform, and generating a second transform result signal representative of results of the M-point discrete Fourier transform, the second stage following the first stage, wherein M denotes a predetermined natural number smaller than a half of N; and 3) converting the second transform result signal into the information signal.

13. An apparatus comprising:

first means for subjecting an information signal to first inverse discrete Fourier transform to convert the information signal into an orthogonal-multi-carrier signal;

second means contained in the first means for subjecting the information signal to M-point inverse discrete Fourier transform and thereby implementing a first stage of the first inverse discrete Fourier transform, and for generating a transform result signal representative of results of the M-point inverse discrete Fourier transform, wherein M denotes a predetermined natural number greater than 2; and third means contained in the first means for subjecting the transform result signal generated by the second means to N-point inverse discrete Fourier transform and thereby implementing a second stage of the first inverse discrete Fourier transform to generate the orthogonal-multi-carrier signal, the second stage following the first stage, wherein N denotes a predetermined natural number greater than twice M.

14. An apparatus comprising:

first means for subjecting an orthogonal-multi-carrier signal to first discrete Fourier transform to recover an information signal from the orthogonal-multi-carrier signal;

second means contained in the first means for subjecting the orthogonal-multi-carrier signal to N-point discrete Fourier transform and thereby implementing a first stage of the first discrete Fourier transform, and for generating a first transform result signal representative of results of the N-point discrete Fourier transform, wherein N denotes a predetermined natural number greater than 4;

third means contained in the first means for subjecting the first transform result signal generated by the second means to M-point discrete Fourier transform and thereby implementing a second stage of the first discrete Fourier transform, and for generating a second transform result signal representative of results of the M-point discrete Fourier transform, the second stage following the first stage, wherein M denotes a predetermined natural number smaller than a half of N; and fourth means contained in the first means for converting the second transform result signal generated by the third means into the information signal.

* * * * *